United States Patent [19]
Gurr et al.

[11] Patent Number: 4,551,812
[45] Date of Patent: Nov. 5, 1985

[54] ENERGY CONTROLLER AND METHOD FOR DYNAMIC ALLOCATION OF PRIORITIES OF CONTROLLED LOAD CURTAILMENT TO ENSURE ADEQUATE LOAD SHARING

[75] Inventors: George P. Gurr; Frederick A. Matheson, both of Phoenix, Ariz.

[73] Assignee: Cyborex Laboratories, Inc., Phoenix, Ariz.

[21] Appl. No.: 420,563

[22] Filed: Sep. 20, 1982

Related U.S. Application Data

[63] Continuation-in-part of Ser. No. 274,488, Jun. 17, 1981, Pat. No. 4,464,724.

[51] Int. Cl.⁴ .......................... G06F 15/56; H02J 3/14
[52] U.S. Cl. .................................... 364/492; 364/484; 307/35
[58] Field of Search ....................... 364/492, 484, 493; 307/35, 39, 44, 52, 62, 40, 41

[56] References Cited

U.S. PATENT DOCUMENTS

| | | | |
|---|---|---|---|
| 4,136,393 | 1/1979 | Fox | 364/492 |
| 4,146,923 | 3/1979 | Borkan | 364/492 X |
| 4,181,950 | 1/1980 | Carter | 364/492 |
| 4,319,329 | 3/1982 | Girgis et al. | 364/484 |
| 4,324,987 | 4/1982 | Sullivan, II et al. | 364/492 X |
| 4,337,401 | 1/1982 | Olson | 364/492 X |
| 4,349,879 | 9/1982 | Peddie et al. | 364/492 |

*Primary Examiner*—Edward J. Wise
*Attorney, Agent, or Firm*—Cahill, Sutton & Thomas

[57] ABSTRACT

An energy controller maintains the total power delivered to an establishment close to a power limit so as to ensure shared operation of all curtailed loads by computing a cumulative priority value (CPV) for each load. The CPV of a particular load is the positive product of a "user-set priority" for that load and the amount of time that load has been shed, or is the negative product of the user-set priority and the amount of time that load has been restored. A processor makes decisions whether to shed or restore a certain load on the basis of the relation of the CPV of that load to the CPV's of the other loads. Loads with the highest CPV's are restored first and loads with the lowest CPV's are shed first. The power limit is adjusted between upper and lower bounds to reflect recent power usage patterns. A minor average and a major average, each of which is most "weighted" by recent power readings, are computed. Generally, low priority loads are shed when both the minor average and the major average exceed the power limit, and are restored when both the minor and major averages are less than the power limit. If the minor and major average, respectively, exceed and are less than the power limit, the processor performs a "look-ahead" operation to predict the likely effect of a shedding operation before determining whether to perform that shedding operation.

32 Claims, 19 Drawing Figures

| | 401 | 402 | 403 | 404 | 405 | 406 |
|---|---|---|---|---|---|---|
| | S/R DURATION | PRIORITY VALUE | S/R STATUS | ON/OFF TIMERS | IMPACT (SHED VALUE) | SHED DURATION |
| I | | | | | | |
| N | | | | | | |

| LOAD TABLE INDEX (410) | CUMULATIVE PRIORITY VALUE (411) |
|---|---|
| | |
| | |

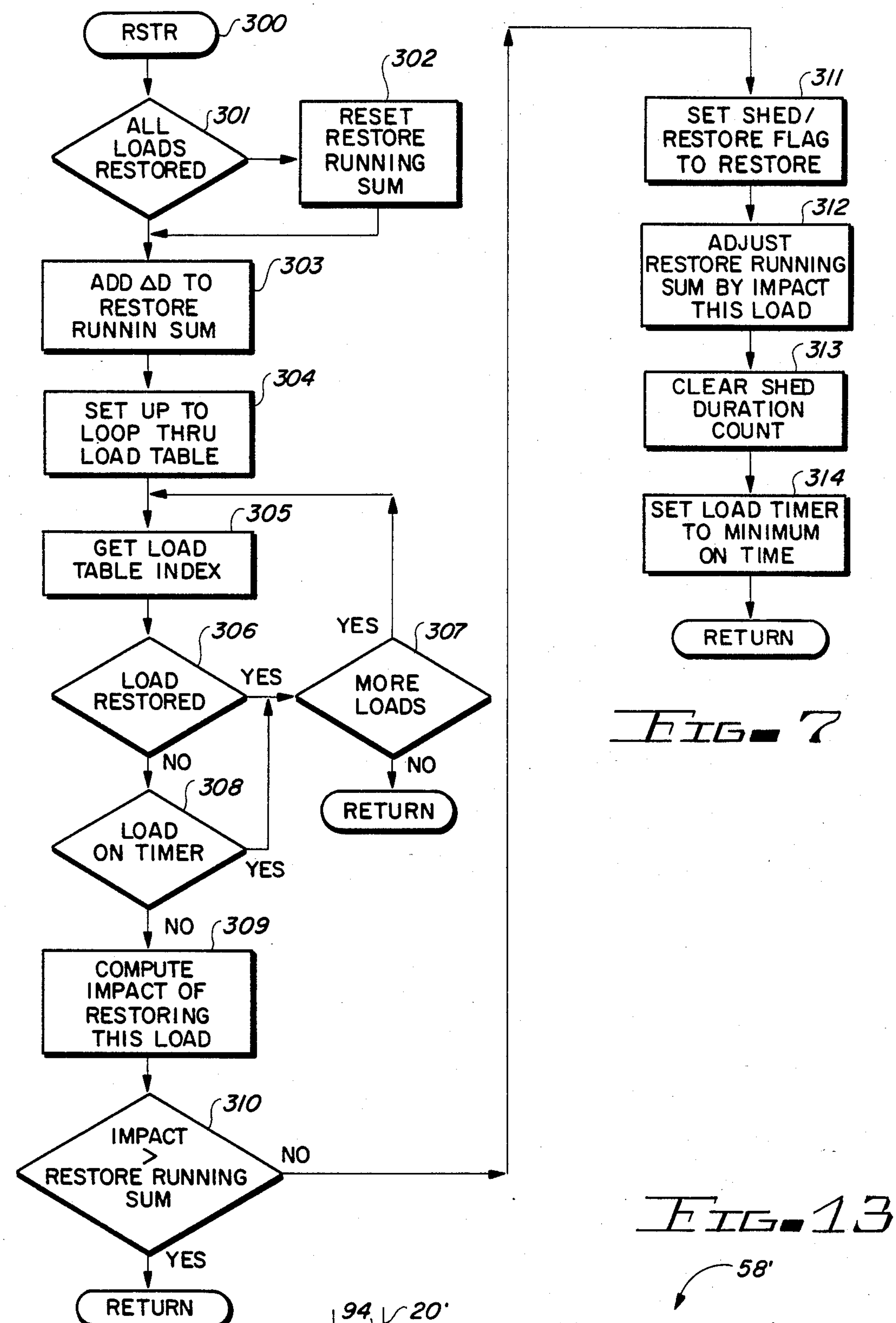
FIG. 7
FIG. 13
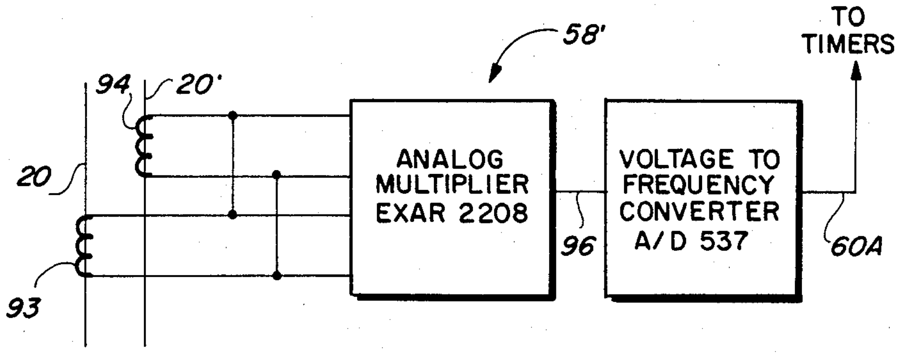

ENERGY CONTROLLER AND METHOD FOR DYNAMIC ALLOCATION OF PRIORITIES OF CONTROLLED LOAD CURTAILMENT TO ENSURE ADEQUATE LOAD SHARING

CROSS-REFERENCE TO RELATED APPLICATIONS

This application is a continuation-in-part of our pending commonly assigned application, Ser. No. 274,488, filed June 17, 1981 and entitled "System and method for optimizing power shed/restore operations"now U.S. Pat. No. 4,464,274, issued Aug. 7, 1984.

BACKGROUND OF THE INVENTION

The invention relates to electrical energy management systems that shed and restore prioritized controlled loads in such a manner as to minimize peaking of power consumption of a residence with minimum impact on the life-style of residential occupants in order to maximize utility company revenue by keeping power consumption close to a level that utilizes as much as possible of the utility company's capacity to generate electrical power from hydroelectric, nuclear, coal-fired and other generating sources that have relatively low operating costs but require very large capital outlays to construct, thereby avoiding the need for the utility company to use oil or gas powered peak load generating sources that sharply increase the rates that must be charged to utility customers.

A number of power controllers or energy controllers useful for shedding and restoring controlled loads in a residence have been proposed, including those disclosed in commonly assigned copending applications "System and method for optimizing shed/restore operations for electrical laods", Ser. No. 191,424, filed Sept. 26, 1980 by Hedges et al. and "System and method for optimizing power shed/restore operations", Ser. No. 274,488 filed June 17, 1981 by Gurr et al. Commonly assigned issued U.S. Pat. No. 4,247,786 is deemed indicative of the state of the art. U.S. Pat. No. 3,652,838; U.S. Pat. No. 3,906,242; U.S. Pat. No. 4,023,043; U.S. Pat. No. 4,059,747; U.S. Pat. No. 4,064,485; U.S. Pat. No. 4,075,699; U.S. Pat. No. 4,146,923; U.S. Pat No. 4,168,491; U.S. Pat. No. 4,181,950; and U.S. Pat. No. 4,216,384 also are believed to be generally indicative of the state of the art for energy controllers.

The various energy controllers disclosed in these references are intended to keep peak power usage by residential customers approximately below a predetermined level while maintaining the total cumulative amount of energy used by customers relatively unchanged, thereby postponing use of certain electrical loads when such postponing does not cause undue inconvenience to the residential customers.

It has been found that energy controllers that make shed and restore decisions based on instantaneous power measurements sometimes cause an excessive number of switching operations turning controlled loads on and off under certain operating circumstances. For example, some energy controllers cause undesirable "cycling" to occur, wherein the system will automatically first shed a number of loads, then recognize within a short time that too many loads were shed, and then restore too many loads. This can result in faulty operation, reduced reliability and reduced useful life of many appliances and other electrical loads.

In some other instances, it has been found that certain high priority controlled loads are rarely switched off by prior controllers, and in other instances, low priority loads are switched off by the controller but are rarely switched back on.

Results of the present assignee's experimentation suggest that a fixed maximum peak load limit that, if exceeded, results in shedding of loads that can cause highly ineffective use of energy controllers during portions of the year when it is unlikely that high peak power consumption will occur even if no energy controller is used. For example, in a home heated by natural gas, excessive peaking of electrical power consumption normally will occur only in the summer. For example, assume that in such a home an energy controller begins shedding controlled loads at a predetermined demand limit of eight kilowatts in the summer when total power consumption with the air conditioning unit is turned on. It is quite likely that the energy controller will never shed any electrical load during the winter months because the five kilowatt air conditioner never turns on in the winter. Consequently, during the winter no benefit is obtained from the energy controller.

Nevertheless, relative peaking of the residence power consumption does occur, albeit at lower levels, in the winter for such a residence, and such relative peaking may occur within a price-sensitive power range. Any time substantial peaking of power consumption by a residence occurs within a price-sensitive power range, there is an opportunity for savings on the energy billing rate if some power usage during the peaking period can be postponed. Therefore, if prioritized load shedding and load restoring operations are performed, a reduced rate for that residential consumer can result, and this reduced rate can be achieved with minimum inconvenience to him if the energy controller is properly designed.

In most residences, there are a number of unpredictable temporary sharp increases in the amount of energy required by that residence. For example, overnight visits by a large number of guests may cause some energy controller programs to operate in a manner that is highly inconvenient to the residential customer.

There are certain situations, especially in commercial building having a large number of air conditioners, that present very difficult problems to any previously known peak power curtailment system. For example, imagine a long, narrow commercial building having its longitudinal axis directed east and west and having air conditioned offices in both the east and west portions of the building. In the morning hours, the offices on the east end of the building receive much more solar heat through their windows, and will need much more air cooling than is the case for offices on the west end of the building. No energy controller that allocates electrical power to the multiple air conditioners on the east and west ends of the building on an equal priority basis or a fixed priority basis is capable of providing substantially equal comfort to workers in both the east offices and west offices both during the morning hours and the afternoon hours. For example, not one of the sequential priority systems in the above-mentioned commonly assigned U.S. Pat. No. 4,211,933 by Hedges et al., the random priority scheme disclosed in U.S. Pat. No. 4,213,058 by Townsend, the rotating priority scheme (in which the first load to be shed is different each time a shed operation is carried out) disclosed in U.S. Pat. No. 4,064,485, or any of the systems disclosed in U.S. Pat.

Nos. 2,714,453 by Delisle, 4,180,744 by Helwig, Jr., and 4,216, 384 by Hurley, can provide adequate load curtailment functions for the air conditioners of the above elongated commercial building without causing considerable discomfort to the occupants of the east and west offices on a hot day that severely taxes the capabilities of the air conditioning united used.

With use of any of the known prior schemes, it is possible to get into an "equilibrium condition". This situation can arise when the loads that are currently turned on actually maintain the average power consumption of the establishment or residence just below the predetermined threshold or power limit. This has the undesired effect of depriving controlled loads that are presently shed any opportunity to be restored at all.

None of the known references provides or suggests any "feedback" from the environment being controlled to the energy controller to affect future shed or restore decisions. Several of the prior art references do recognize the problem, but none provides any satisfactory solution—it is strictly "hit or miss" as to whether the known energy controllers accomplish the desired objectives in any particular environment.

It can be seen that despite all of the research and development that has occurred in the field of residential energy controllers in recent years, there still remains an unfulfilled need for a low cost, highly reliably automatic energy controller that substantially reduces peak power consumption by a residence without substantial inconvenience to certain users, thereby reducing energy billing rates for that user without unacceptable impact upon lifestyle or work environments and yet is flexible enough to allow temporary, relatively sharp transitory increases in power demand by the user without necessarily increasing the user's billing rate for an entire billing period.

Therefore, it is an object of the invention to provide an electrical energy controller for shedding and restoring loads to an establishment or residence to provide maximum use of energy up to a preselected demand limit with less impact on the user's comfort or life-style than is possible with known prior energy shedding and restoring devices and without subjecting the user to excessively high utility billing rates.

It is another object of the invention to provide an energy controller and method that will automatically seasonally adjust peak power consumption limits which, if exceeded by a residence or establishment, causes shedding of controlled loads.

It is another object of the invention to provide a power shed-restore system that avoids rapid "load cycling" that occurs under certain circumstances for certain known prior power shedding and restoring devices.

It is another object of the invention to provide an electrical energy shedding and restoring system that provides maximum energy utilization up approximately to a selected power limit with minimum impact on the lifestyle of an occupant of a residence or establishment, and with a minimum number of load switching operations.

It is another object of the invention to provide an electrical energy shedding and restoring system that dynamically allocates power to controlled loads at least partly on the basis of measurements of the effects that such controlled loads are intended to produce.

It is another object of the invention to provide an electrical energy shedding and restoring system that allows user selection of relative priority weights to be assigned to each controlled load and yet assumes that each load, regardless of its assigned weight, will have the opportunity to operate at least some of the time, at least partially on the basis of how long that controlled load has been shed.

It is another object of the invention to provide an electrical energy shedding and restoring system that avoids becoming stabilized in an undesired equilibrium condition.

SUMMARY OF THE INVENTION

Briefly described, and in accordance with one embodiment thereof, the invention provides a method and apparatus for controlling delievery of electrical energy from a power line to an establishment in order to maintain the total power delivered to the electrical loads close to a power limit by measuring the value of a variable that is associated with a cumulative effect of the operation (or non-operation) of a particular controlled load, computing a cumulative priority value for that controlled load such that the cumulative priority value is a function both of a user selected priority associated with that controlled load and the value of the variable, and making a decision whether or not to shed or restore that controlled load on the basis of the relation of the value of that cumulative priority value to other priority values associated with other respective ones of the controlled loads.

In one described embodiment of the invention, a microprocessor system executes a program in which a load table is stored. The load table includes entries for each controlled load, the entries for each load including the shed or restore duration, a fixed user-selected priority value, the status of being shed or restored, a load timer value, and an impact value of that load. If appropriate, the load table entries are updated. The program also maintains a priority table in which the cumulative priority value of each controlled load is stored and updated, the entries in the priority table being maintained and sorted in order of decreasing cumulative priority value. In one embodiment of the invention, the cumulative priority value for each presently shed controlled load is a positive number equal to the product of the user-selected priority value of that load and the length of the interval of time during which that controlled load has been shed. The cumulative priority value for each presently restored controlled load is a negative number that is equal to the product of the user selected priority of that load and the length of the interval of time during which that controlled load has been restored. Thus, controlled loads that have been shed the longest tend to have the highest cumulative priority values and tend to move to the top of the priority table, and controlled loads that have been restored the longest tend to have the lowest (algebraic) cumulative priority values and tend to move to the bottom of the priority table.

The variable quantity in a particular cumulative priority value can be a "call time", i.e., the amount of time that a thermostat (or other control element) of a particular controlled load has been in an "on" condition while that controlled load has been shed. Or, the variable quantity can be a temperature caused by operation (or non-operation) of a particular controlled load, or any other measurable variable quantity that is affected by operation of that controlled load.

In one described embodiment of the invention, the above method and apparatus are combined with method and apparatus for computing a minor average that represents the average power delivered to the establishment during the past one minute interval and for computing a major average that represents an average of the minor average over the past sixty minutes. A "filtering" process is used for causing the major average to attribute the most weight to the most recent readings of power delievered to the establishment.

In the described embodiment of the invention, the power limit is a floating power limit that has a fixed upper boundary and a fixed lower boundary. The microprocessor gradually adjusts the floating power limit upward, if possible, to reflect somewhat sudden increases in the daily average power usage of the user, if the present major average exceeds the present value of the floating power limit. Similarly, the microprocessor even more gradually adjusts the floating power limit downward, if possible, to reflect slow seasonal reductions in the average daily power usage so that a substantial amount of money-saving load curtailment occurs even during seasons in which power usage is normally so low that load curtailment ordinarily would not occur if the power limit were fixed at a higher level appropriate to summer operation.

In a described embodiment of the invention, the microprocessor system maintains a "shed running sum" of the amounts by which the minor average exceeds the floating power limit over the past sixty minute (for example) interval. The microprocessor system also maintains a "restore running sum" of the amounts by which the minor average is less than the floating power limit over the past sixty minute (for example) interval.

If the minor average is above the floating power limit and the major average also is below the power limit, the microprocessor computes the "impact", i.e., the "shed value" of the lowest priority, presently restored, controlled load multiplied by the time remaining in the sixty minute interval over which the major average is taken. The microprocessor then determines if shedding that lowest priority, presently restored, controlled load would increase the restore running sum enough to allow the minor average to continue at its present level (above the floating power limit) for the rest of that interval without causing the major average to exceed the floating power limit by the end of the present sixty minute interval. If this determination is affirmative, the microprocessor then sheds the subject controlled load having the lowest cumulative priority value.

BRIEF DESCRIPTION OF THE DRAWINGS

FIG. 7 constitutes a flow chart of the program of the restore routine executed in the shed/restore routine.

FIG. 13 is a schematic drawing of the circuitry used to measure present power usage in the preferred embodiment of the energy controller system of FIGS. 1A and 1B.

DESCRIPTION OF THE INVENTION

Figure 1A:
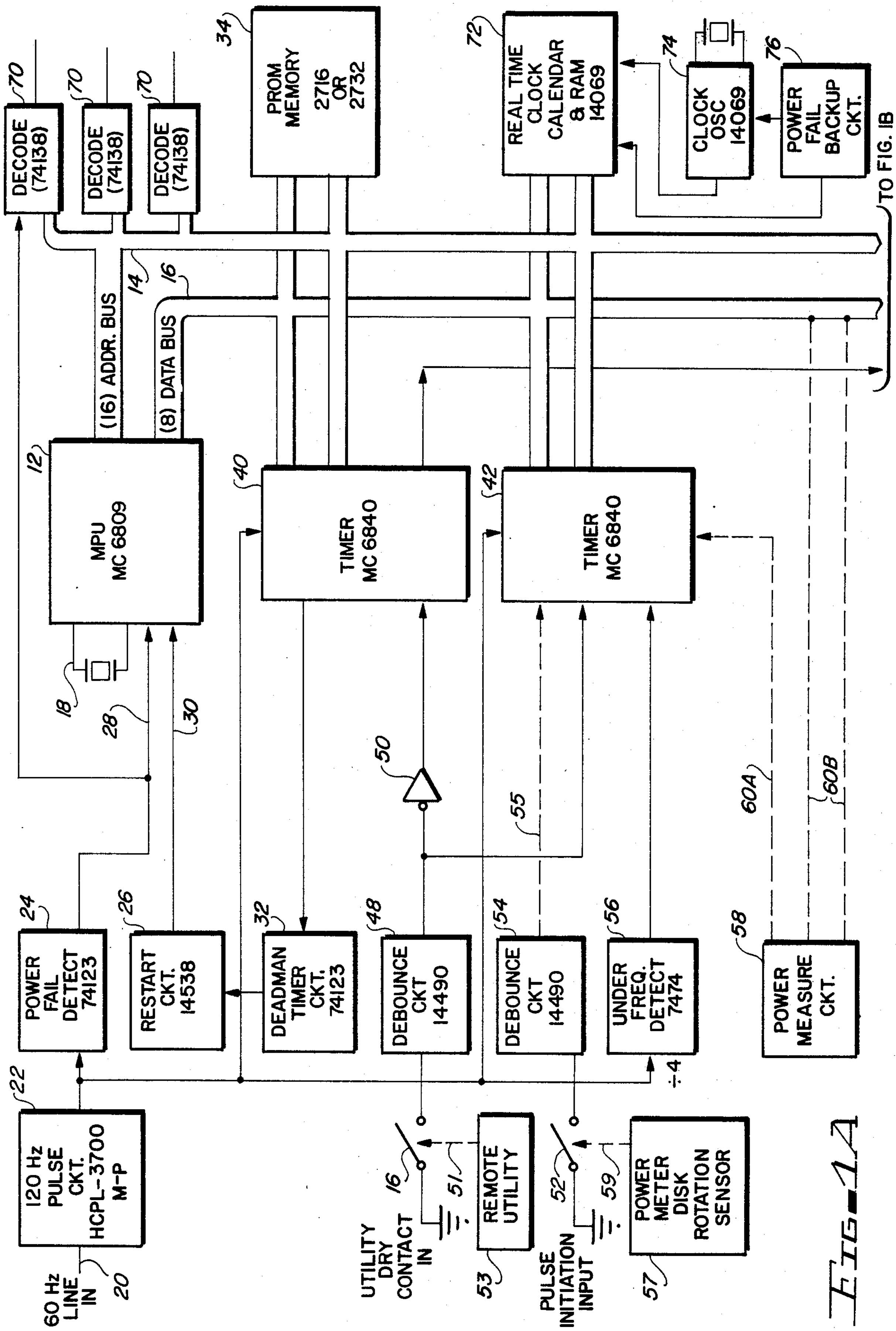
FIGS. 1A and 1B constitute a block diagram of the energy controller of the present invention.
Figure 1B:
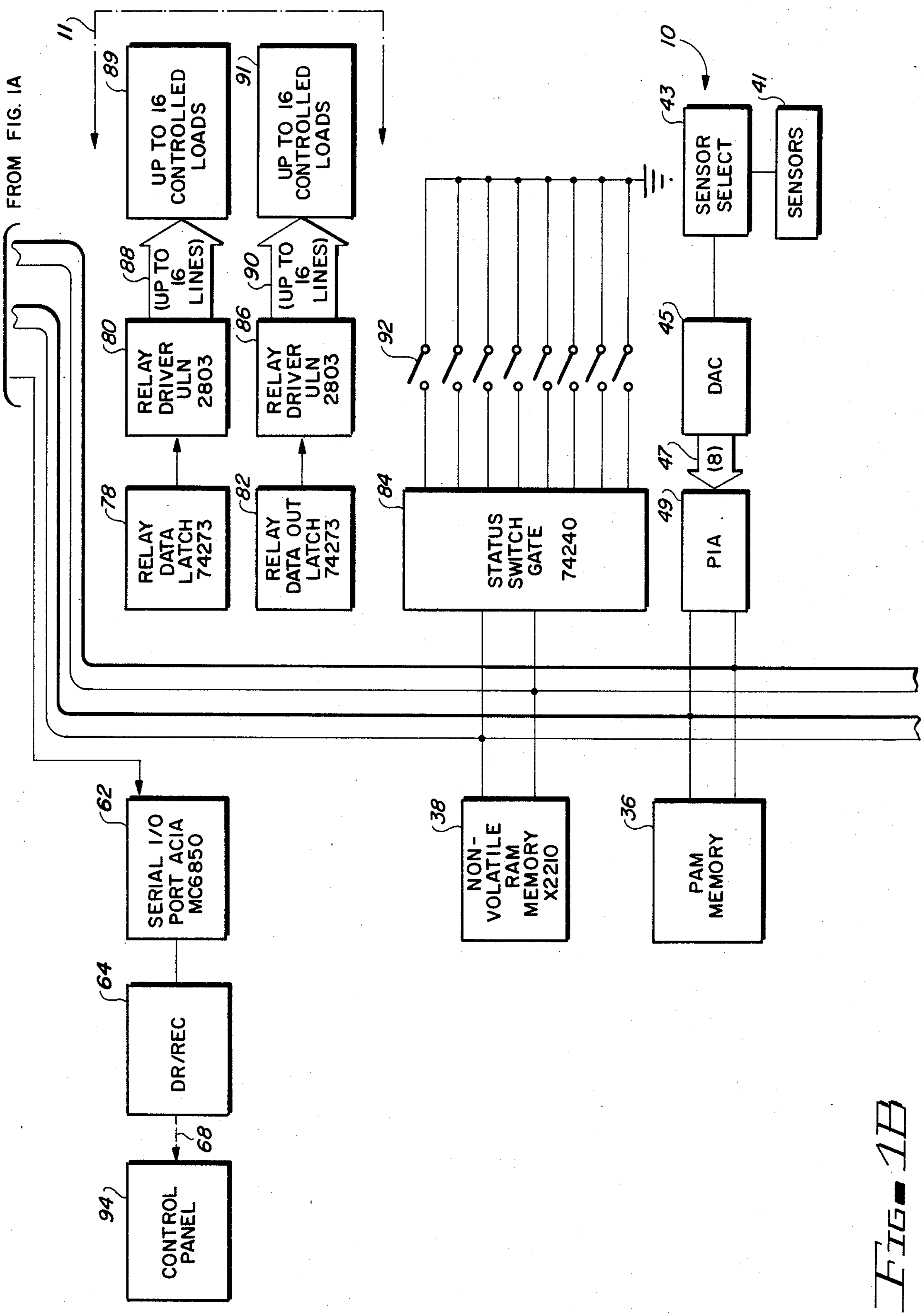

Referring now to FIGS. 1A and 1B, energy controller system 10 includes a microprocessor 12, which can be implemented by means of a Motorola MC6809 microprocessor. Microprocessor 12 is clocked by a crystal 18 which is connected to control the frequency of a internal clock generator in microprocessor 12. The 16 address outputs of microprocessor 12 are respectively connected to 16 lines of address bus 14. The eight data bus terminals of microprocessor 12 are connected to the eight conductors of data bus 16. A fast interrupt request input of microprocessor 12 is connected to conductor 28, which is connected to the output of a "power fail detect" circuit 24. Power fail detect circuit 24 is implemented by means of a 74123 integrated circuit one-shot. The input of power fail detect circuit 24 is connected to the output of a 120 hertz pulse circuit 22, the input of which is connected to one of the 60 hertz power line conductors 20. Circuit 22 is implemented by means of a Hewlett Packard HCPL-3700, which includes an optical coupler with a built-in Shmitt trigger and an integral bridge rectifier. It generates a 120 hertz pulse in response to the 60 hertz line frequency. During ordinary operation, the integrated circuit one-shot and power fail detect circuit 24 is continually re-triggered (in the absence of a power failure) by the 120 hertz signal generated by circuit 22, and thereby keeps one of the decode circuits 70 enabled. A signal on conductor 28 produced by power fail detect circuit 24 also generates a non-maskable interrupt signal which causes microprocessor 12 to execute a power failure routine.

Restart circuit 26 is implemented by means of an MC14538 CMOS integrated circuit one-shot circuit. The output of restart circuit 26 is produced on conductor 30 and is connected to the reset input of microprocessor 12.

"Dead man" timer circuit 32 performs the function of resetting the entire system any time that timer 40 "times out". This is to allow the entire system 10 to be restarted if, for example, something goes wrong in the software and causes microprocessor 12 to get "caught" in a software loop. After a certain amount of time has elapsed, timer 40 "times out" and generates a signal on conductor 44 of dead man timer circuit 32, the output of which is connected to an input of restart circuit 26; this causes restart circuit 26 to reset microprocessor 12. Dead man timer circuit 32 is implemented by means of an integrated circuit 74123 one shot.

Timer 40 is implemented by a Motorola MC6840 programmable integrated circuit timer that is programmable under control of microprocessor 12. Timer 40 performs several functions, including generating the baud rate for the ACIA (asynchronous communication interface adaptor) or serial input/output port 62 (FIG. 1B), which is implemented by means of a Motorola MC6850 integrated circuit. Timer 40 also senses how long utility "contact switch" 46 is closed. Switch 46 is controlled by a remotely generated utility company signal. The amount of time that switch 46 is closed is interpreted by system 10 to set a utility company controlled power threshold level or limit for the establishment whose loads are curtailed by energy control system 10.

The data terminals of timer circuit 40 are connected to data bus 16, and the select inputs of timer 40 are connected to appropriate conductors of address bus 14. A "gate" input of timer 40 is connected to the output of inverter 50, the input of which is connected to a debounce circuit 48. The input of debounce circuit 48 is connected to switch 46. Debounce circuits 48 and 54 are implemented by means of Motorola 14490 bounce eliminator integrated circuits. One of the functions performed by timer 42 is to measure how long utility control switch 46 is open. The output of debounce circuit 48 is also connected to the input of programmable timer 42, which is also implemented by means of a Motorola MC6840 programmable integrated circuit timer. The periodic pulse output of timer 40 is connected by means of conductor 44 to the input of circuit 32.

Reference numeral 53 in FIG. 1A represents a remote electrical utility company plant. Dotted line 51 represents a medium of communication of control signals to cause opening or closing switch 46, thereby communicating power threshold information to system 10. This medium of communication can be implemented (for example) by means of telephone lines and conventional coupling circuitry therefore, by means of digital signals or frequency domain signals superimposed on the power line conductors 20, or by wireless communication.

In one embodiment of the invention, switch 52, which is part of an option available for circuit 10 to measure power delivered to an establishment, is opened and closed in accordance with a power meter disc rotation sensor circuit 57. In that system, a mechanical, optical, or electrical sensor is supported adjacent to the rotating disc (not shown) of a conventional power meter and opens and/or closes switch 52 in response to passing of predetermined points of the disc by the sensor. This information is coupled by means of a link represented by dotted line 59 in FIG. 1A to correspondingly turn switch 52 on and off. Switch 52 is connected to debounce circuit 54. Dotted line 55 represents the optional coupling of the output of debounce circuit 54 to the "gate" input of timer 52.

Since the rate of rotation of the above mentioned power meter disc is directly proportional to the (instantaneous) power consumption of the establishment controlled by energy controller system 10, timer 42 measures the amount of time that elapses between transitions of switch 52. This number represents the instantaneous power. Both timers 40 and 42 have their data terminals connected to data bus 16 and their select terminals connected to address bus 14. Thus, the combination of timer 42, optional switch 52, and optional power meter disc rotation sensor 57 function as a power measuring circuit if the power if the power "measurement" is accomplished by means of timer 42, which is read by microprocessor 12 and then converted into a power reading in one embodiment of the invention.

Timer 42 has one of its gate inputs connected to the output of an "under frequency detect" circuit 56. An input of circuit 46 is connected to the 120 hertz output of circuit 22, described above. Under frequency detect circuit 56 divides this 120 hertz output by 4. Under frequency detect circuit 56 can be implemented by means of a Texas Instruments 7474 divider circuit, which applies the above divided result to timer 42 as a gate signal thereto. The 120 hertz signal produced by circuit 22 also is applied as a clock input to timers 40 and 42. The program (subsequently described) executed by microprocessor 12 compares the readings of timer 42 with predetermined limits to determine if the 60 hertz line frequency is getting "out of specification", and causes execution of a load shedding routine if the 60 hertz line frequency deviates sufficiently from its specified value.

Reference numeral 58 generally represents other power measuring circuitry that can be used in place of the above described power meter disc rotation sensor 57 and switch 52. The power measuring circuit 58 can be implemented in precisely the same manner as the circuitry associated with the analog multiplier 20 shown in FIG. 1A of copending parent application "System and method for optimizing power/shed restore operations", Ser. No. 274,488 filed June 17, 1981, incorporated herein by reference. Alternatively, power measuring circuitry 58' of FIG. 13 can be utilized, wherein an analog multiplier 58" (an EXAR 2208) produces an analog voltage signal on conductor 96 representing the instantaneous power delivered to the establishment. This voltage signal (V) is filtered and converted by an A/D 537 voltage to frequency converter 58''' to a frequency (F) signal on conductor 60A, the frequency of which represents the present instantaneous power being delivered to the establishment 11 (FIG. 1B). This circuitry (of FIG. 13) is referenced to herein as the "V-to-F circuitry", and the frequency signal on conductor 60A is fed into the clock input of timer 42, which then is read by microprocessor 12 and converted to a scaled number representing the present instantaneous power consumption of the establishment 11. Yet, another implementation of power measurement circuit 58 can be accomplished by the circuitry described in commonly assigned allowed application Ser. No. 191,424, filed Sept. 28, 1980 which issued on Apr. 13, 1982, as U.S. Pat. No. 4,324,987, and is incorporated herein by reference.

The above-mentioned ACIA circuit 62 (FIG. 1B) is coupled to an RS232 port to allow serial communications to a remote microprocessor control panel 94. The details of control panel 94 are not part of the present invention, and will not be described in detail. However, those skilled in the art could easily and routinely provide a functional control panel to allow a user to input various kinds of information from the control panel into microprocessor 12.

Reference numeral 38 represents a non-volatile random access memory that is implemented by a pair of XICOR X2210 non-volatile random access memories which, under program control, can transfer information in its static random access memory portion into an electrically programmable non-volatile read only memory portion thereof. This circuit is organized as 64 bytes addressable by means of address bus 14 and accessible by means of data bus 16.

The main random access memory 36 also is coupled to data bus 16 and address bus 14, and is implemented by means of an Intel 2016 static RAM integrated circuit which is organized as 2,048 words by eight bits. The read only memory portion of system 10 is designated by reference numeral 34 (FIG. 1A) and is implemented by means of Intel 2716 or 2732 programmable read only memory integrated circuits.

Reference numeral 72 designates a real time clock/-calendar and RAM integrated circuit chip that is implemented by means of a Motorola MC146818. This chip produces digital outputs representing seconds, minutes, hours, days, months, weeks and years. It also has a battery backup circuit represented by reference numeral 76 and is controlled by a clock oscillator circuit 74 that is implemented by means of a Motorola MC14069 clock oscillator circuit. It is addressable by means of address bus 14 and accessible by microprocessor 12 via data bus 16. Reference numerals 72 and 82 designate relay data latches (implemented by 74273 integrated circuits) that are coupled, respectively, to data bus 16 and are addressable by means of address bus 14. The sixteen outputs of latches 78 and 82, respectively, drive the inputs of relay driver circuits 80, which are implemented by means of ULN2803 relay drivers manufactured by Sprague. The outputs of relay drivers 80 and 86 are coupled to control relays of controlled loads that are represented by reference numerals 89 and 91, respectively.

Reference numeral 84 represents a 74240 integrated circuit having inputs connected to sense the status of eight status switches 92. Circuit 84 is coupled to data bus 16, and includes gate circuits that are selectable by means of address bus 14 to allow microprocessor 12 to test the status of switches 92 under control of the operating program. Status switches 92 are preset to inform the program which "options" are included in the system 10 as it is actually installed in a particular establishment. For example, the status switches 92 indicate which of the above-mentioned three alternative power measuring schemes are used, and whether or not the system 10 includes optional remote control panel 94. (FIG. 1A).

Figure 4:
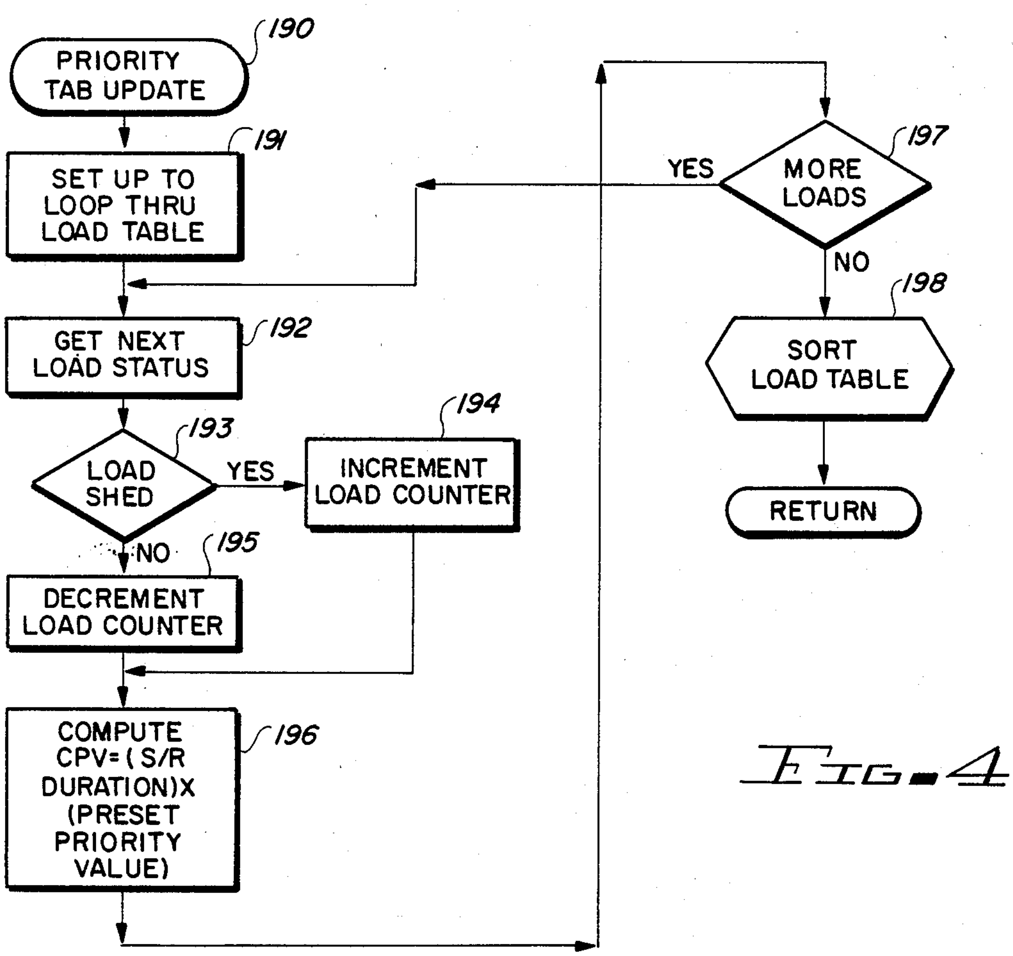
FIG. 4 is a flow chart of the program of the priority table update routine executed in the idle loop.
Figure 5A:
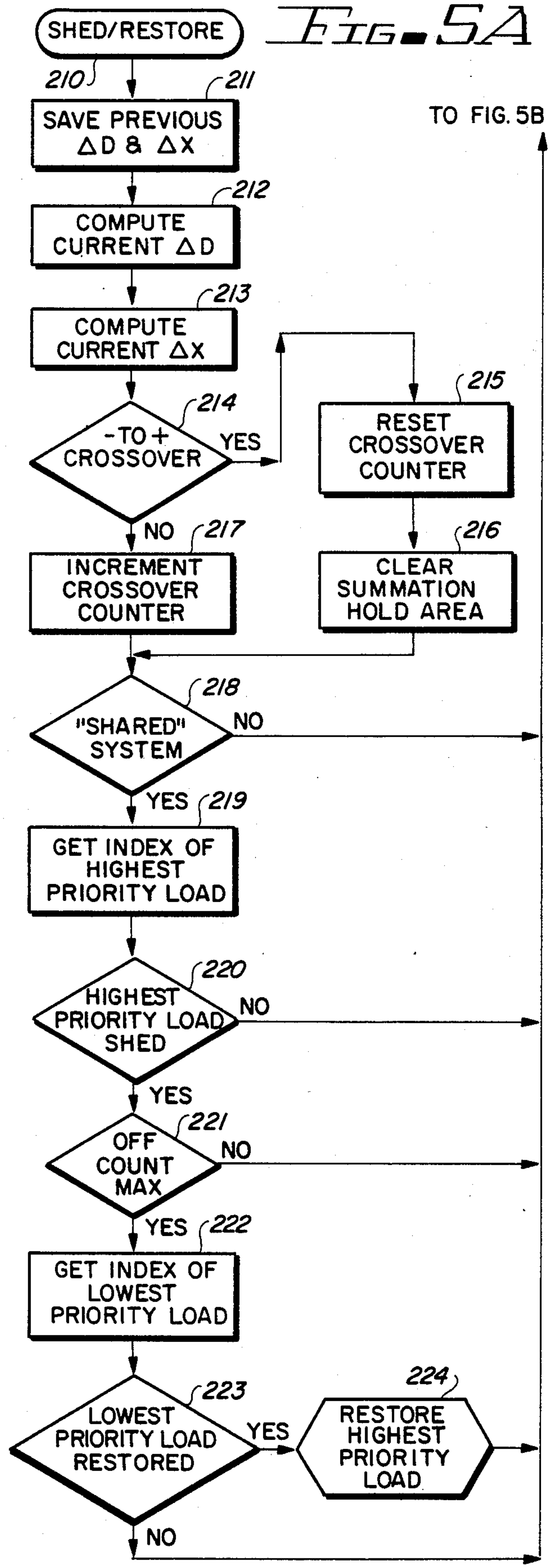
FIGS. 5A and 5B constitute a flow chart of the program of the shed/restore routine executed in the idle loop.
Figures 5B, 12A:
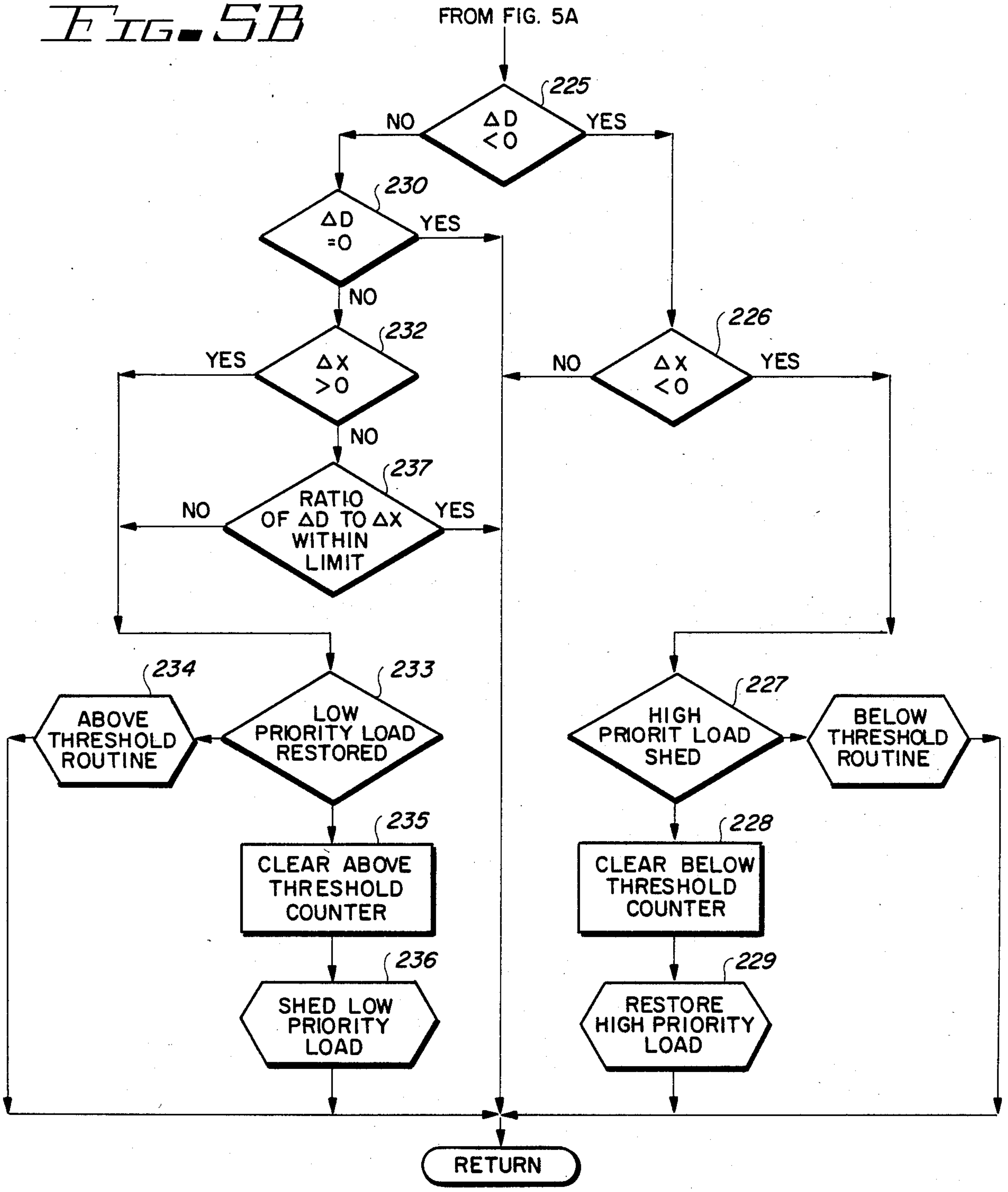
FIG. 12A is a symbolic diagram of the load table maintained and referred to during execution of the operating program by the microprocessor of FIG. 1A.
Figures 6, 12B:
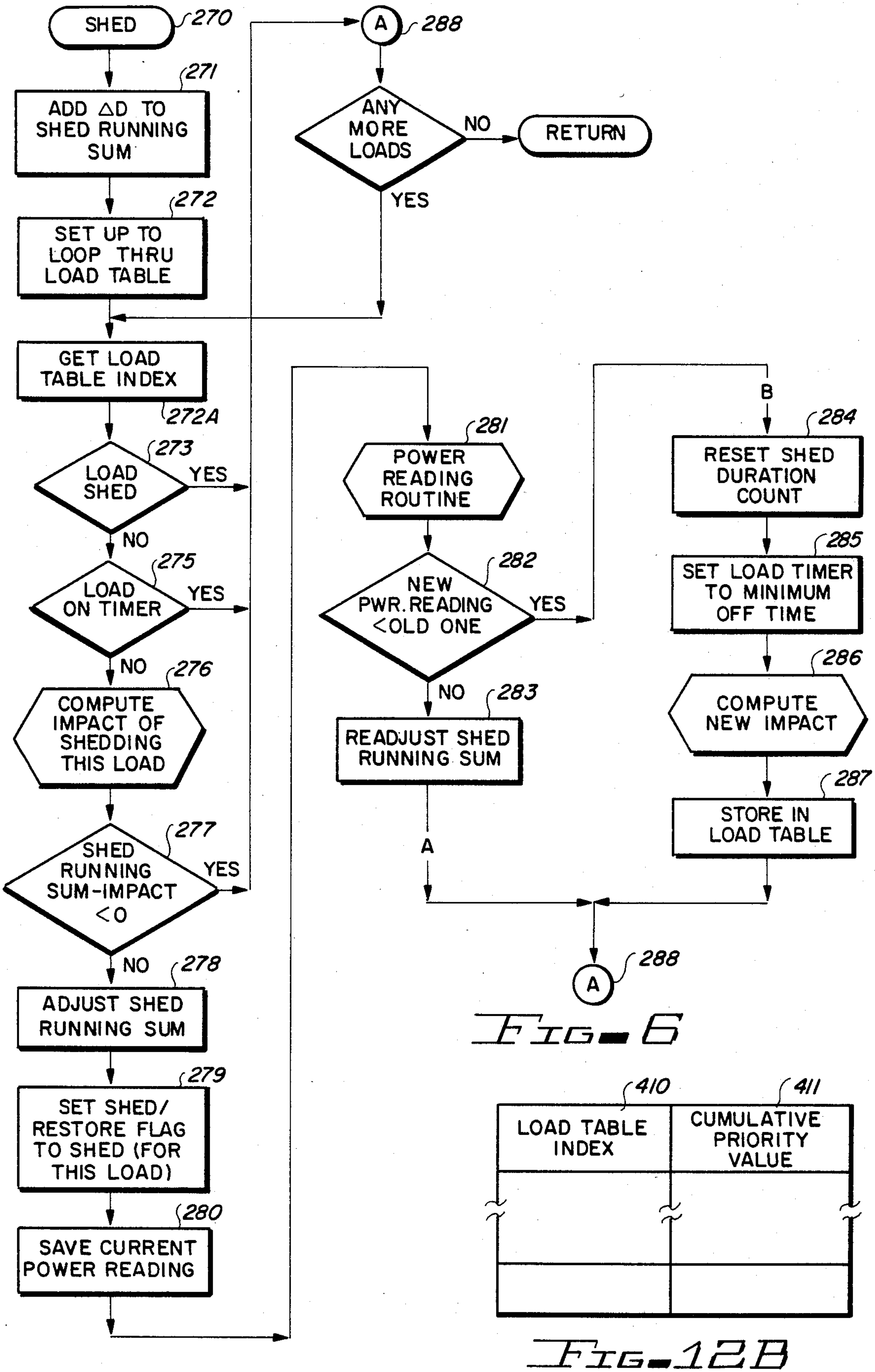
FIG. 6 constitutes a flow chart of the program of the shed routine executed in the shed/restore routine.
FIG. 12B is a priority table updated and referred to in the priority table update routine of FIG. 4.

The operation of system 10 of FIGS. 1A and 1B perhaps can best be described by explaining the operation of the program executed by microprocessor 12 in conjunction with the flow charts of FIG. 2A through FIG. 11 and the load table and priority table diagrams of FIGS. 12A and 12B, respectively. Appendix 1 is a printout including one implementation of the program.

Figure 2A:
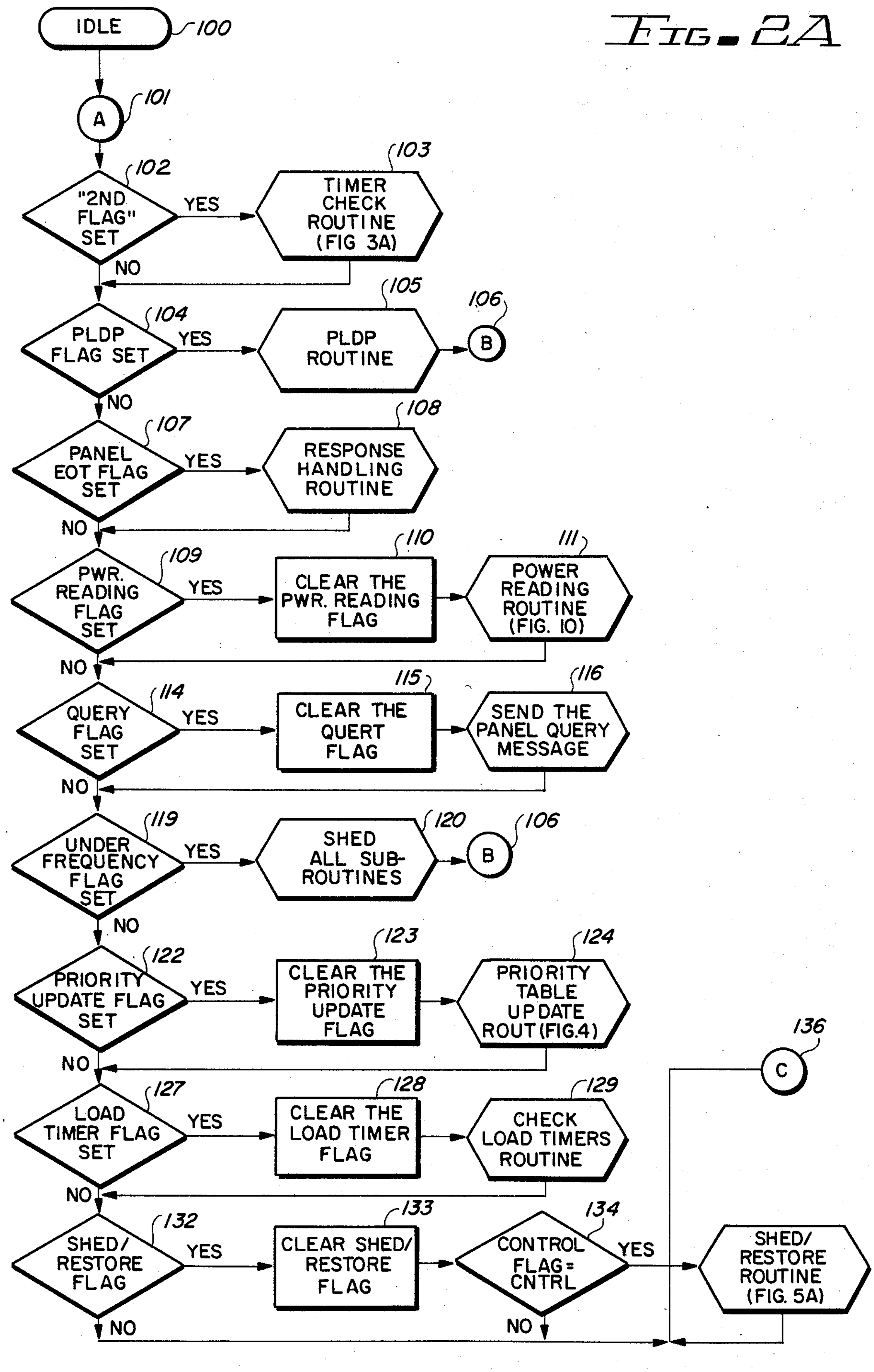
FIGS. 2A and 2B constitute a flow chart of the program of the idle loop executed by the microprocessor in FIG. 1A.
Figure 2B:
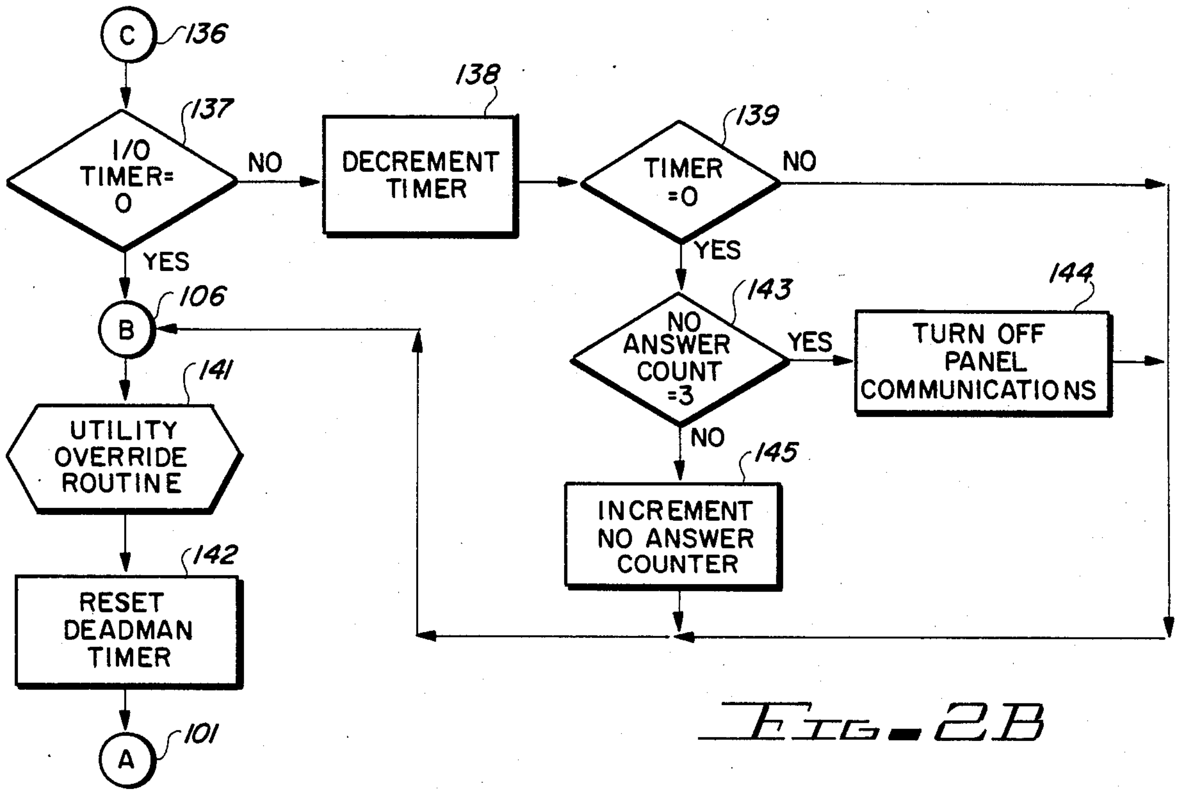

FIGS. 2A–2B constitute the flow chart of an idle loop executed by microprocessor 12. Referring to FIG. 2A, the idle loop is entered via label 100 and enters decision block 102. One of the above-described hardware timers 40 and 42 generates a signal every second to cause a "second flag" to be set every second. If the second flag is set, the program executes a "timer check" routine, as indicated in block 103. The timer check routine of block 103 is subsequently described in detail with reference to FIG. 3, and performs the function of setting various flags and distributing the tasks to be performed by microprocessor 12 during the ensuing minute.

If the "second flag" is not set, the program goes to decision block 104. The program also goes to decision block 104 after execution of the timer check routine. In decision block 104, the program tests a "PLDP" (peak load deferrment program) flag, and if that flag is set, the program executes a "PLDP" routine, as indicated in block 105 and then enters label 106.

It should be noted that the flow charts enclosed and described herein include numerous features which are not essential to the central aspects of the invention, as it is claimed herein, to distinguish over what is presently believed to be the closest prior art. The "non-central" portions of the program are nevertheless briefly described as being helpful in understanding the invention as a whole, but are described in somewhat less detail than the other aspects of the invention.

The PLDP routine is somewhat peripheral to the invention, and is described in detail in the above-mentioned co-pending application "System and method for optimizing power/shed restore operations", Ser. No. 274,488 (which is incorporated herein by reference).

If the PLDP flag is not set, the program goes to decision block 107 and tests an "EOT" (end of transmission) flag to determine if the above mentioned optional remote control panel has sent a message via ACIA circuit 62 of FIG. 1. If this is the case, the program executes a "Response Handling routine" as indicated in block 108, and goes to decision block 109. The details of the response handling routine are quite peripheral to the present invention, and therefore, are not disclosed, but would essentially consist of causing microprocessor 12 to read new data being inputted by the user to system 10 via the optional remote panel. The program would fetch such data, store it in the memory, and use it to replace various parameters being reset by the user, or cause execution of other user selected functions.

If the decision of block 107 is negative, the program goes directly to decision block 109 and tests a "Power Reading Flag".

Figure 9:
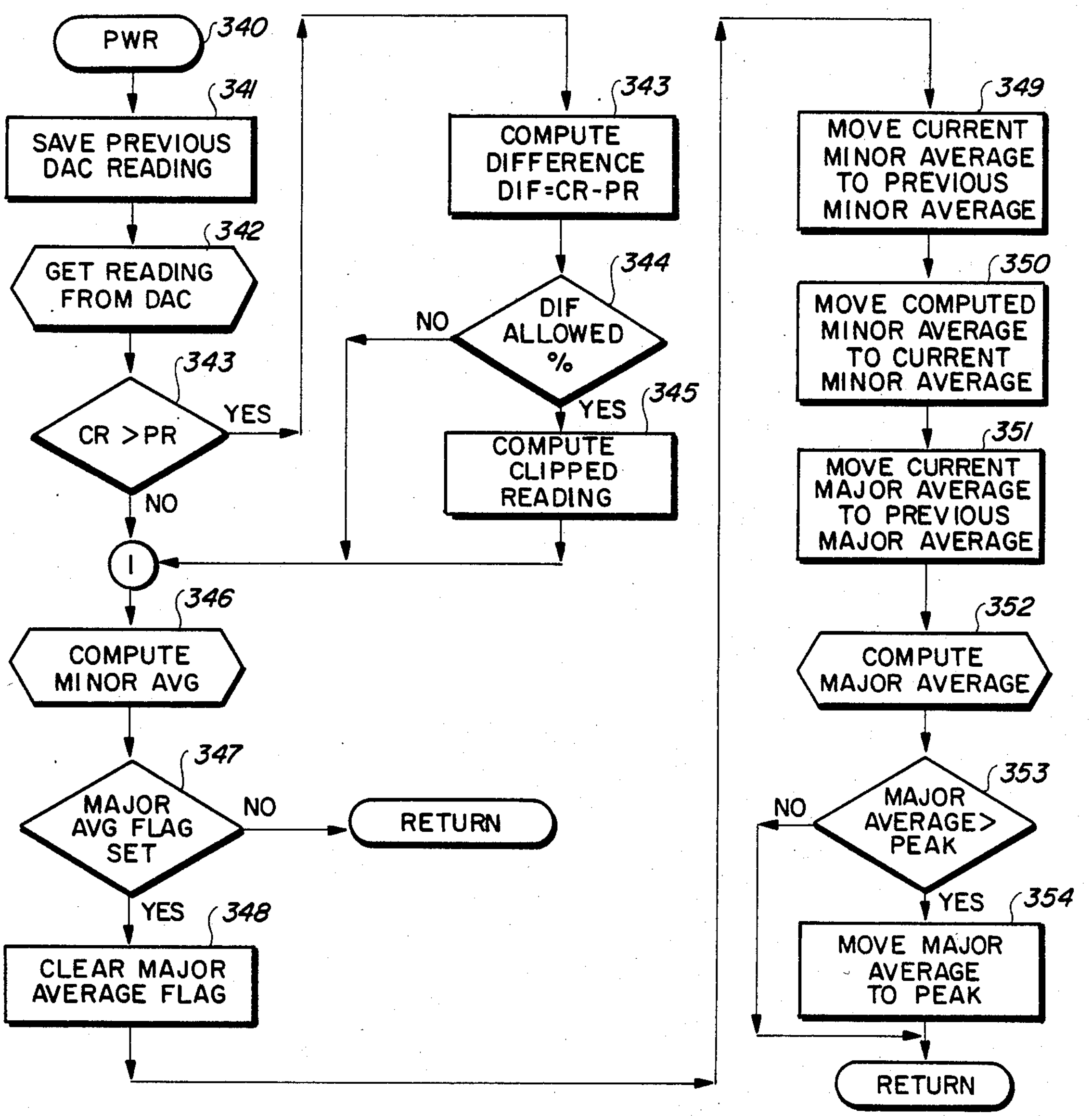
FIG. 9 is a flow chart of the program of the power reading routine executed by the processor in accordance with one embodiment of the invention.

System 10 causes the Power Reading Flag to be set every 15 seconds. If this flag is set, the program enters block 110, clears the Power Reading Flag and then goes to block 111 and executes one of several possible optional power reading routines, depending on which above-mentioned alternative power reading technique is used. Two of the optional power reading routines are subsequently described herein with reference to FIGS. 9 and 10. Further details on a power reading routine very similar to that disclosed by FIG. 9 are disclosed in the above-mentioned Gurr-Matheson application, and details of a third type of power reading routine are disclosed in co-pending, allowed application entitled "System and method for optimizing shed/restore operations for electrical loads", Ser. No. 191,424 filed Sept. 26, 1980, issued on Apr. 13, 1982 as U.S. Pat. No. 4,324,987, by Hedges et al., and assigned to the present Assignee, and incorporated hereby by reference.

After the power reading routine has been executed, the program goes to decision block 114. If the decision of block 109 is negative, the program goes directly to decision block 114.

In decision block 114, the program tests a "query flag" that is related to use of the above-mentioned optional panel to determine whether microprocessor 12 should access the remote panel, which is presumed to include a micrprocessor or other means for presenting data to be read by microprocessor 12. If the query flag is set, the program clears it, as indicated in block 115, and executes a subroutine that causes microprocessor 12 to send a query message to the remote panel via the ACIA device 62 of FIG. 1B. The details of this subroutine are peripheral to the present invention, and, therefore, are not disclosed.

The program then goes to decision block 119. If the query flag is not set, the program goes directly from block 114 to decision block 119. In decision block 119, the program tests an "under frequency flag" that is generated in response to an alarm signal generated by circuit 56 of FIG. 1A. If the under frequency flag is set (due to a very small deviation in the power line frequency), the program executes a subroutine that sheds all loads, in order to avoid any problems that would be associated with recovery from a power failure, if the loads remain connected to the power lines. It should be noted that this capability of automatically shedding controlled loads in response to automatic detection of an under-frequency condition on the main power line could be very helpful to an electric utility company if the system of FIGS. 1A and 1B is widely used by customers of the electric utility company. To appreciate this, it should be noted that a "slight" variation in line frequency of less than one cycle per second is caused by an imbalance between the generator and the load. This, in turn, can cause a blackout. Therefore, when electric utility companies detect a dangerous deviation in line frequency, they begin to reduce the loading on the generating system by shedding entire electrical power lines. But if a critical load, such as a life support system in a hospital, is on a particular power line, the electric utility company cannot shed that line. If critical loads are connected to many of the power lines connected to the power generating system, this puts the electric utility company in the position of having to make very fast, very difficult decisions as to which critical loads would be turned off so that others may remain powered. If the system of FIGS. 1A and 1B is widely used by the electric utility company's customers, this can solve the problem, because the customers can simply use the system to control non-critical loads. Then, if a dangerous under frequency condition occurs, the individual load controllers will automatically detect it and quickly shed as many controlled loads, all of which are non-critical, as is necessary to alleviate the under frequency condition. No blackout occurs, and all critical loads remain powered.

Again, the details of the algorithym of block 120 are peripheral to the invention and are not disclosed. The program then goes to label 106. If the under frequency flag is not set, the program goes directly from block 119 to decision block 122 and tests a "priority update flag". If this flag is set, it means that the program is to update a priority table in which the CPV (cumulative priority value) associated with each controlled load is continually updated partly on the basis of a user selected weight or priority and also partly on the basis of other information, such as how long the present load has been shed.

FIGS. 12A and 12B indicate the nature of a priority table and a load table into which the priority table is an index. The priority table "sorts" all loads, from top to bottom, of the priority table, in order of decreasing cumulative priority valve (CPV). If the priority update flag is set, the program then clears that flag, as indicated in block 123 of FIG. 2A, and then executes a priority table update routine, as indicated by reference numeral 124. The priority table update routine is very relevant to the present invention, and its details are subsequently explained with reference to FIG. 4. If the priority update flag is not set, the program goes directly from block 122 to block 127. The program also goes to decision block 127 after executing the priority table update routine of block 124. In block 127, the program tests a "load timer flag" to determine if any of the controlled loads is "on a timer", i.e., whether that load is to be maintained in its present status (either on or off) for a predetermined amount of time which is being measured by a corresponding load timer. (A "load timer" is simply a software timer that continues to be decremented every minute by the program until it "times out" and resets the load timer flag.) If the load timer flag is set, the program clears that flag, and executes a routine to check the individual load timers, as indicated in block 129. A similar subroutine is described in detail in the above-mentioned Gurr et al. application, and is not described in detail herein.

After this subroutine has been executed, the program goes to decision block 132. If the load timer flag is not set, the program goes directly from block 127 to decision block 132. In decision block 132, the program tests a shed/restore flag, and if that flag is set, the program then clears that flag, as indicated in block 133, and if a "control flag" is set to indicate that system 10 should be controlling the controlled loads as determined in decision block 134, the program then enters block 135 and executes the shed/restore routine, which is described in detail subsequently with respect to FIGS. 5A and 5B. The program then goes to decision block 137 of FIG. 2B via label 136. (As subsequently explained, the control flag is set in block 175 of FIG. 3 to prevent the system 10 from controlling a load that is "on a timer" for a minimum time, as explained above.)

If the load under consideration is "on a timer", the program enters decision block 137. If the shed/restore flag of block 132 is not set, the program goes directly from block 132 to decision block 137. In decision block 137, the program tests a software I/O timer to determine if it has timed out. If it has not, the program decrements that timer and again tests it, as indicated in blocks 138 and 139. If the decision of block 137 is affirmative, the program goes to block 141. If the decision of block 139 is negative, the program goes to block 141 via label 106. If the decision of block 139 is affirmative, the program tests to determine if there have been three affirmative decisions by decision block 139, and if that is the case, the program turns off panel communications from the above-mentioned optional remote panel and assumes that the remote panel no longer exists. These two steps are indicated by blocks 143 and 144. If there have not been three affirmative decisions by decision block 139, as determined by decision block 143, the program stores the present affirmative decision by incrementing a software "no answer" counter and goes to block 141 via label 106.

In block 141, the program executes a "utility override routine" which is not central to the present invention and therefore is not described in detail. This routine, however, performs the function of reading values in timers 40 and 42 to interpret information produced by remote utility 53 in FIG. 1A to open and close switch 46 and thereby cause microprocessor 12 to read information supplied by the remote utility. The program then goes to block 142 and resets a "dead man timer" which corresponds to the circuitry designated by reference numeral 32 in FIG. 1A.

Figure 3:
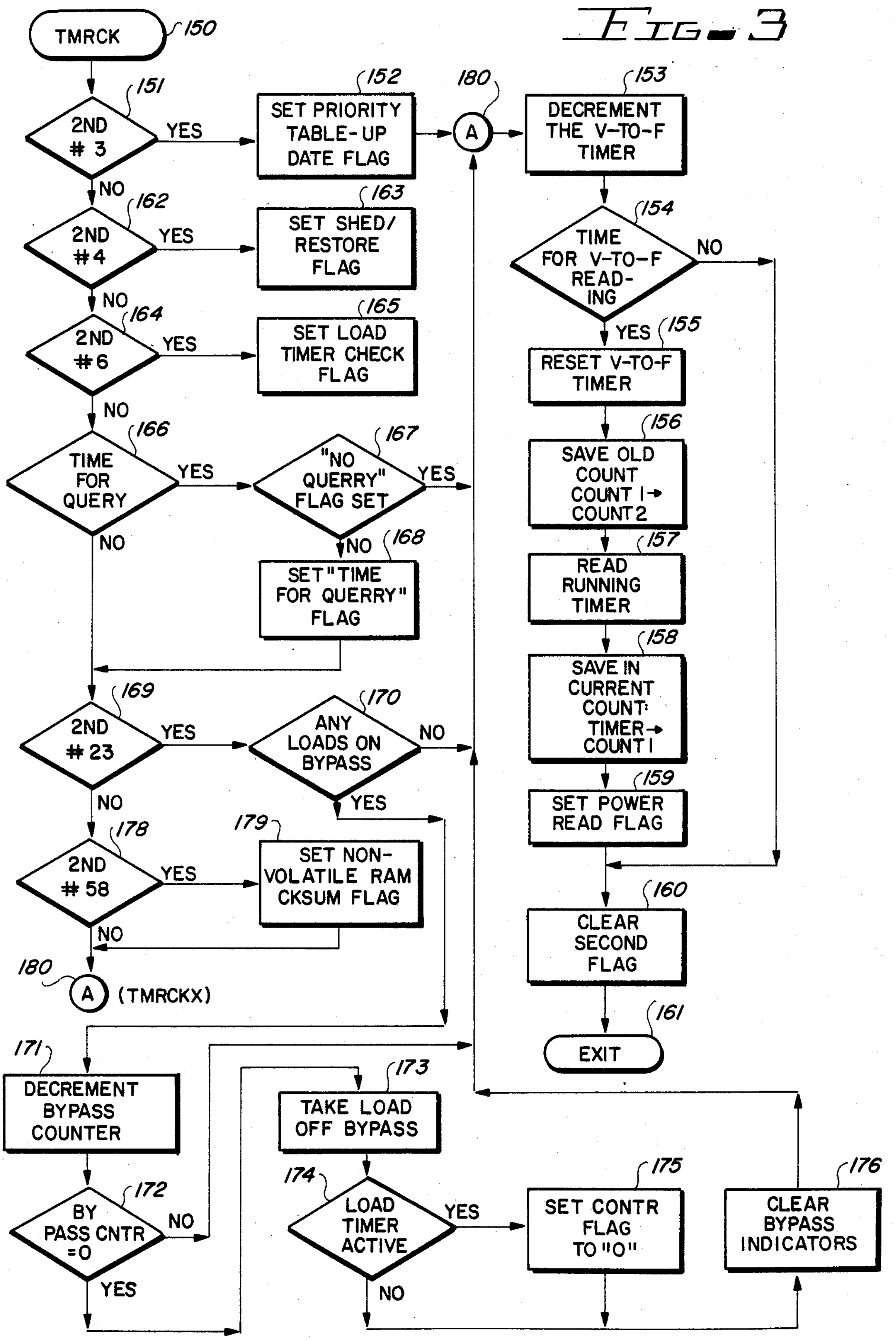
FIG. 3 constitutes a flow chart of the program of the timer check subroutine executed in the idle loop.

Referring now to FIG. 3, the timer check routine referred to in block 103 of FIG. 2A is entered via label 150 and goes into decision block 151 to test whether the number of the present second is the third second of the present minute. If this determination is affirmative, the program goes to block 152 and sets the above-mentioned priority table update flag referred to in block 122 of FIG. 2A. The program then goes to block 153 via label 180 and decrements a "V-to-F timer", which determines when the microprocessor should read the V-to-F pulse accumulation that represents the present power being delivered to the establishment.

The analog multiplier 58' shown in FIG. 13 produces a 120 Hz output which represents the rate of flow of energy into the building. The output of the analog multiplier circuit 58' is filtered, and the voltage to frequency converter then converts the filtered signal to a pulse rate that is proportional to the magnitude of the filtered signal. Those pulses are accumulated in one of the MC6840 timer counters. That accumulation, taken over a particular fixed interval, represents the power delivered to the building. This technique has the advantage of "averaging out" short term fluxuation in power consumption, such as those due to an electric motor starting up. Each of the MC6840 counter timers have three counters. One of the counters accumulates the above counters, and another determines the averaging interval.

Figure 10:
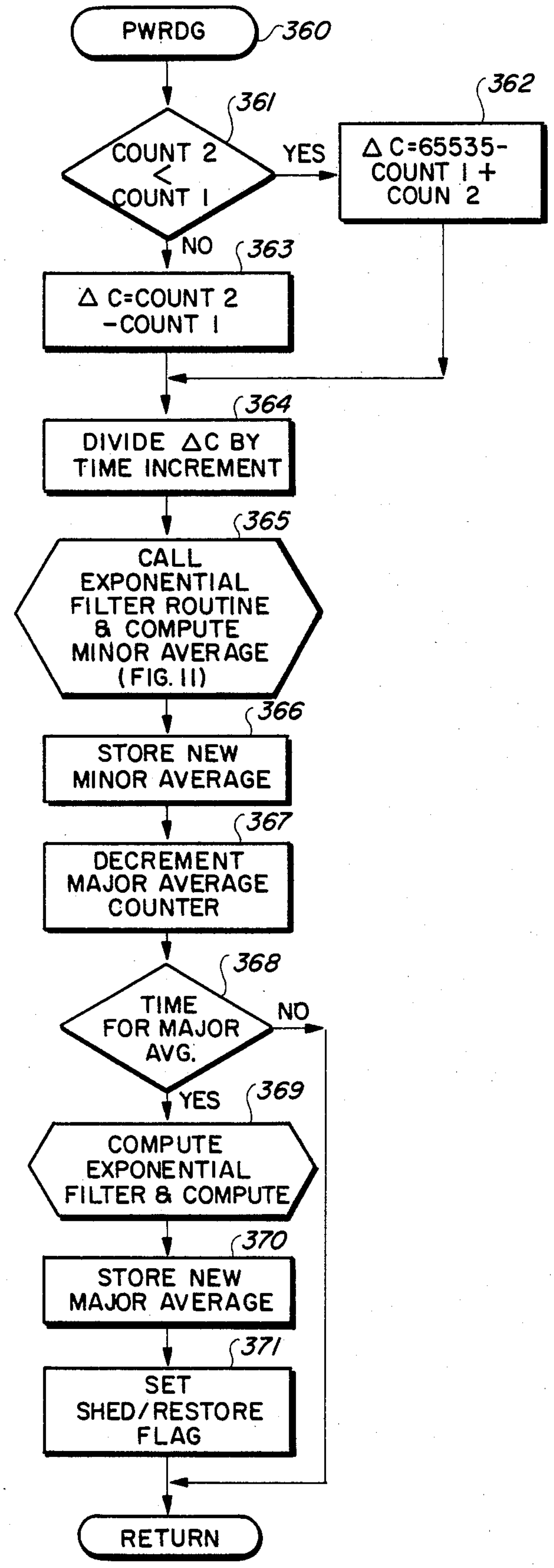
FIG. 10 is a flow chart of the program for the V-to-F power reading subroutine executed in the described embodiment of the invention.

Please note that for the purposes of the present description, it is assumed that the power reading routine referred to in block 111 of FIG. 2A and shown in FIG. 10 is the one utilized. The V-to-F timer is one of the MC6840 timer counters with which the pulse rate produced by a power measuring circuit that is implemented by means of the circuit shown in FIG. 13, previously described.

Then, the program goes to decision block 154 and tests a flag to determine if it is time for microprocessor 12 to obtain a V-to-F difference reading which represents the present power consumption of establishment 11. If this determination is negative, the program clears the "second flag" in block 160 and exits from the timer check routine via label 161. If it is determined in decision block 154 that it is time for another V-to-F reading, then the routine resets the V-to-F timer, saves the previous count, reads a running timer, saves the current count of the running timer, ultimatly computes the difference between the current count and the prior count, and sets the "power read flag", as indicated in blocks 155 through 159. The program then clears the "second flag" in block 160 and exits via label 161.

Returning to decision block 151, if the present second is not the third second of the present minute, the program goes to decision block 162 and determines if the present time is the fourth second of the present minute. If this determination is affirmative, the program sets the above-mentioned shed/restore flag as indicated in block 163 and enters block 153, as previously described.

If the present time is not the fourth second of the present minute, the program enters decision block 164 and determines if the present time is the sixth second of the present minute. If it is, the program sets the above-mentioned "load timer check flag" as indicated in block 165 and then enters previously described block 153.

If the present time is not the sixth second of the present minute, the program enters decision block 166 and tests a query flag to determine if it is time for microprocessor 12 to interrogate any remote panel that might be coupled to data bus 16 of the system 10. This query is made every sixth second. If it is time for such a query, the program goes to decision block 167 and tests a "no query" flag. If this flag is set, the program simply goes to block 153, as previously described. If the "no query" flag is not set, the program then sets it, as indicated in block 168, and goes to decision block 169. If a determination of decision block 166 is negative, the program goes directly to decision block 169.

In decision block 169, the program determines if the present time is second number 23 of the present minute. If it is, the program goes to decision block 170 and determines if any of the controlled loads are on "bypass" condition, wherein the user can deliberately cause certain loads to be "bypassed" from control of system 10. (Further detail on this technique can be found in the above-mentioned Hedges et al. and Gurr et al. applications.) If the determination of decision block 170 is negative, the program goes to block 153, previously described. If the determination of decision block 170 is affirmative, the program goes to block 171 and decrements a bypass counter and then enters decision block 172 to determine if the bypass counter for that load has timed out. If it has not, the program goes to block 153. If the subject bypass counter has timed out, the program goes to block 173 and causes the subject load to be "taken off" of the bypass condition so that it will be controlled by system 10 in accordance with the subsequently described shed and restore routines.

The program then goes to decision block 174 to see if a "load timer" for the present load is active. It makes this determination on the basis of whether a software timer indicated in Column 404 of FIG. 12A for the subject load has timed out or not. If that load timer has not timed out, it is said to be "active". If the load timer is not active, the program goes to block 175 and sets a control flag to "zero" to prevent shedding or restoring of that load while the timer is active. If the load timer is active, or if the program has completed execution of block 175, the program goes to block 176 and clears any indicators which indicate that the subject load is on a bypass condition and then goes to block 153.

Turning to decision block 169, if the present time is not second number twenty-three of the present minute, the program goes to decision block 178 to determine if the present time is second number fifty-eight of the present minute. If it is not, the program goes to block 153. If the present time is second number fifty-eight, the program goes to block 179, and sets a "non-volatile RAM CKSUM" flag, which performs the function of validation of the contents of a non-volatile back-up memory, and enters blocks 153 (via label 180).

The priority table update routine referred to in block 124 of FIG. 2A is shown in FIG. 4. At this point, it would be helpful to refer to the "load table" of FIG. 12A and the "priority table" of FIG. 12B. The load table is simply a software table stored in random access memory 36 and includes a separate entry for each of the N controlled loads such as 89 and 91 of FIG. 2B controlled by system 10. Each such entry includes a quantity in Column 401 indicating the duration or amount of time that load has been in its present status, either shed or restored. Each entry in the load table also includes a user-selected priority value or "weight" associated with each load in Column 402, a shed/restore status for that load in Column 403 indicating whether it is presently shed or presently restored, a "load timer" count in column 404, indicating the amount of time remaining in any "minimum shed time" or "minimum restored time" associated with the present load, and an "impact" or "shed value" in Column 405 indicating the number of kilowatts consumed by the present load when it is restored. The order of the N entries in the priority table of FIG. 12B is updated every time the priority table update routine of FIG. 4 is executed so that the load numbers and associated updated cumulative priority values (CPV's) subsequently explained are listed in order of decreasing value, the loads having the highest CPV being at the top of the priority table, and the loads having the lowest CPV being at the bottom of the priority table. Those loads which presently are shed have positive CPV values and loads which are presently restored have negative CPV values. The priority table of FIG. 12B enables the program to easily select the loads having the highest CPV and lowest CPV, obtain their load numbers from the load table index, and use those load numbers as an index into the load table of FIG. 12A, enabling the program to fetch any information in the load table corresponding to the highest priority loads and lowest pririty loads.

Referring to FIG. 4, the program enters the priority table update routine via label 190 and enters block 191. In block 191, the program sets up various pointers to enable the program to loop through the load table of FIG. 12A. The program then goes to block 192 and fetches the load status from Column 403 of the next load to be considered. The program then goes to decision block 193 and determines if that load is presently shed. If it is, the program increments the load counter in block 194 and goes to decision block 196 to determine if any more loads remain to be examined as the program loops through the load table of FIG. 12A. If the determination of decision block 193 is that the present load being considered is not shed, then it is in a restored state, so the program enters block 195, decrements the load counter, and goes to block 196. In block 196, the program computes the cumulative priority value (CPV) mentioned above by multiplying the present value of the shed/restore duration (in column 401 of FIG. 12A for the load presently being considered) by the present value of the cumulative priority value variable in Column 402 of the priority table of FIG. 12B for the present load. This product is now the new or updated value of CPV for the present load, and is entered in Column 411 of the priority table of FIG. 12B.

It can be seen that decrementing the load counter for presently restored loads, as was done in block 195, causes the "present load" to be the next lower priority load. Incrementing the load counter for presently shed loads, as was done in block 194, causes the "present load" to be the next higher priority load.

As mentioned above, the newly computed value of CPV is entered into the priority table in Column 411 for the present load. The program then goes to decision block 197 in FIG. 4, determines if any more loads of the load table need to be considered, and if this is the case, the program returns to block 192. After all new values of CPV have been computed for each load in the load table, the program enters block 198 and executes a simple subroutine for sorting all of the entries in the priority table of FIG. 12B in order of decreasing values of CPV. The details of this subroutine are not disclosed because anyone skilled in the programming art could readily design a subroutine to accomplish this taks. (However, the code for sorting the priority table is included in the computer print-out in Appendix 1, attached hereto). The program then returns to the idle loop.

The shed/restore routine referred to in block 135 of FIG. 2A is shown in FIGS. 5A and 5B, and is entered via label 210 of FIG. 5A. The program first goes to block 211 and saves the previous value of ΔD, which is defined as the minor average minus the floating power limit or threshold, and ΔX, which is defined as the major average minus the floating power or threshold. The minor average and major average are entirely analogous to the minor average and major average described in detail in the above-mentioned Gurr et al. application, incorporated hereby by reference. The floating threshold, subsequently described in detail, has the same relationship to the minor average and major average as the constant threshold level referred to in the co-pending Gurr et al. application.

The minor average and the major average are computed in the power reading routine block 111 in FIG. 2A for the particular option of power reading system being implemented. Assuming, as stated previously, that the V-to-F power reading system of FIG. 13 is the one being used, it will be convenient at this point to described that routine with reference to FIG. 10. Before the program gets to the shed/restore routine of block 135 of FIG. 2A, the program always first executes the power reading routine, which is subsequently seen, includes as a last step the setting of the shed/restore flag tested in decision block 132 of the idle loop in FIG. 2A.

Referring now to FIG. 10, the power reading subroutine now under consideration is entered via label 360 and goes directly to decision block 361. In decision block 361, the program compares COUNT2 (see block 156 in FIG. 3) with COUNT1, and if COUNT2 is less, computes the quantity $$\alpha C = 65535 - \text{COUNT1} + \text{COUNT2}$$

and goes to block 364. The "running timer" referred to in block 157 of FIG. 3 is implemented by one of the MC6840 timers 41 or 42 of FIG. 1A, and the foregoing procedure is necessary when that timer reaches its maximum value of 65535 and begins over again at 00000.

Figure 11:
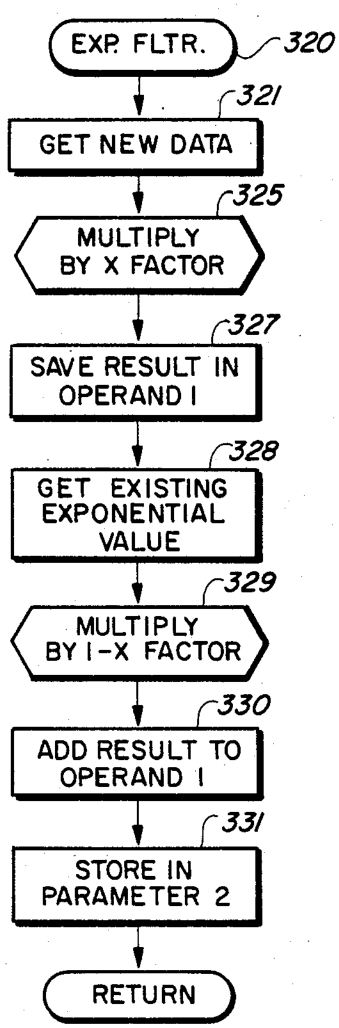
FIG. 11 is a flow chart of the program for computing the major average and the minor average to give increased weight to recent values in the preferred embodiment of the invention.

If the determination of block 361 is negative, the program goes to block 363 and computes the expression $$\Delta C = \text{COUNT2} - \text{COUNT1}$$

and then goes to block 364. In either case, the quantity ΔC represents the present power consumption of establishment 11 (FIG. 1B). In block 364, ΔC is scaled down to a more convenient number by dividing it by a suitable divisor. This can be accomplished simply by binary shifting, as those skilled in the art will readily recognize. The program then goes to block 365 and computes the above-mentioned minor average with the aid of the expotential filter routine of FIG. 11, subsequently described. In essence, the minor average is a suitable average of the last four power readings taken at the end of each of the past four fifteen second intervals. Rather than taking an ordinary average, as explained in the above referenced Gurr et al. application, however, a formula, subsequently explained in the exponential filter routine of FIG. 11 gives greater weight to the most recent power readings and less weight to the power readings which have occurred further in the past.

After the new value of the minor average has been obtained, the program stores this result and goes to block 367. In block 367, the microprocessor 12 decrements a "major average counter". The program then goes to decision block 368 and determines whether is is time to compute a new value of the major average (by testing the major average counter to see if it has "timed out".) If it is not time, the program enters block 369, and calls the expotential filter routine of FIG. 11 to compute the major average. The program then stores the major average, as indicated in block 370, and then sets the shed/restore flag, as indicated in block 371. The program then returns to the idle loop.

At this point, it will be convenient to return to FIG. 5A. In block 211, the previous values of ΔD and ΔX (both defined above) are stored. The program then goes to block 212 and computes the current value of ΔD, based on the most recent computation of the minor average. The program then goes to block 213 and computes the current value of ΔX based upon the most recent computation of the major average. The program then goes to decision block 214 and determines whether the major average has increased from a value less than the threshold or power limit to a value exceeding the threshold or power limit. If this determination is affirmative, the program goes to block 215 and resets a software counter referred to as the crossover counter. The program then goes to block 216 and clears a variable referred to as a "running sum", described in detail later, but which, briefly, is a cumulative product of ΔD and elapsed time in the present sixty minute (for example) averaging interval. The program then goes to decision block 218. If the determination of decision block 214 is negative, the program then goes to block 217 and increments the above-mentioned crossover counter. The program then goes to decision block 218. In decision block 218, the program determines if the present system is of the type that "shares" time with all controlled loads, i.e., guarantees that all controlled loads, regardless of priority, will be energized at least some of the time. If this determination is negative, the program goes to decision block 225 of FIG. 5B, which is the beginning of the "truth table" portion of the program. If the determination of decision block 218 is affirmative, the program goes to block 219 and obtains the index, i.e., load number, of the highest priority load in the priority table in FIG. 12B. The program then goes to decision block 220 and determines if that highest priority load is shed. If this determination is negative, the program goes to decision block 225 of FIG. 5B. If the determination is affirmative, the program goes to decision block 221 and determines if the entry in Column 404 of the load table for the highest priority load is greater than the predetermined maximum therefor. If this determination is negative, the program simply goes to decision block 225. If the determination is affirmative, the program goes to block 222 and obtains the index or load number of the lowest priority load in the priority table of FIG. 12B and then goes to decision block 223. In decision block 223, the program determines, from the entry for that load in Column 403 of FIG. 12A, whether the lowest priority load is restored. If this determination is negative, the program goes to block 225. If the decision is affirmative, the program goes to block 224 and restores the highest priority load in accordance with the restore routine FIG. 7 and then goes to decision block 225 of FIG. 5B.

Referring now to FIG. 5B, in decision block 225 the program determines if ΔD is less than zero. If this determination is affirmative, the program goes to decision block 226 and determines if ΔX is less than zero. If this determination is also affirmative, the program goes to decision block 227 and determines if the highest priority load in the table of FIG. 12B is shed by referring to the status Column 403 in the load table of FIG. 12A. If the highest priority load is shed, the program goes to block 228 and clears a "below threshold counter" and goes to block 229. In block 229, the program executes the restore routine of FIG. 7A to restore the above-mentioned highest priority load. The program then returns to the idle loop of FIGS. 2A and 2B.

If the determination of decision block 227 is negative, i.e., the highest priority load in the priority table is not shed, the program goes to blcok 231 and calls the "below threshold routine" of FIG. 8A. This routine causes the above- mentioned power threshold or power limit, which actually is a "floating" threshold or power limit in the described embodiment of the invention, to be decremented toward a fixed lower bound if it is not already at the fixed lower bound. This subroutine will be subsequently described. After the below threshold routine has been executed, the program returns to the idle loop via label 238. If the determination of decision block 226 is negative, the program returns to the idle loop via label 238.

If the determination of decision block 225 is negative, i.e., if ΔD is not negative, then the program goes to decision block 230 and determines if ΔD is equal to zero. If this determination is affirmative, the program returns to the idle loop via label 238. If this determination is negative, it means that the minor average exceeds the floating threshold, and the program goes to decision block 232 and determines if ΔX, the difference between the major average and the floating threshold, exceeds zero.

If this determination is affirmative, it means that both the minor average and major average exceed the floating threshold, and the program goes to decision block 233. In decision block 233, the program determines if the lowest priority load in the priority table of FIG. 12B is restored by looking at the entry in Column 403 for that load in the load table of FIG. 12A. If this determination is negative, the program goes to block 234 and executes the "above threshold routine" (subsequently described in detail with reference to the flow chart of FIG. 8B), in order to adjust the value of the floating point threshold or power limit. The program then returns to the idle loop via label 238.

If the determination of decision block 233 is affirmative, the program goes to block 235 and clears the "above threshold counter", subsequently described with reference to FIG. 8B. The program then enters block 236 and calls the shed routine of FIG. 6 to accomplish shedding of the above-mentioned lowest priority load. The program then returns to the idle loop via lable 238.

If the determination of decision block 232 of FIG. 5B is negative, this means that the minor average is above the floating threshold point and the major average is below the set point. This situation, if continued long enough, would obviously cause the major average to exceed the floating threshold point, which is a forbidden condition that must be remedied by shedding low priority loads, in appropriate circumstances. In this case, the program goes from block 232 to decision block 237 and determines if the ratio of ΔD to ΔX is less than a predetermined limit which, for example, may be 0.6. This test gives a preliminary indication as to how far above the floating threshold point the minor average is relative to the distance that the major average is below the floating threshold point. The value of the predetermined limit needs to be determined empirically for a given power usage pattern. If the determination of decision block 237 is that the ratio of ΔD to ΔX is lower than the predetermined limit, it is assumed that the major average is sufficiently far below the floating threshold point that the present power consumption can safely continue for a while without shedding any low priority loads, and the program returns to the idle loop via label 238. However, if the ratio of ΔD to ΔX is not within the predetermined limit, the program enters decision block 233, previously described. If the lowest priority load is restored, the program then sheds it to provide excess power consumption capacity below the floating threshold point in order to postpone the time at which the major average would exceed the floating threshold point if the present power consumption continues.

Figure 8A:
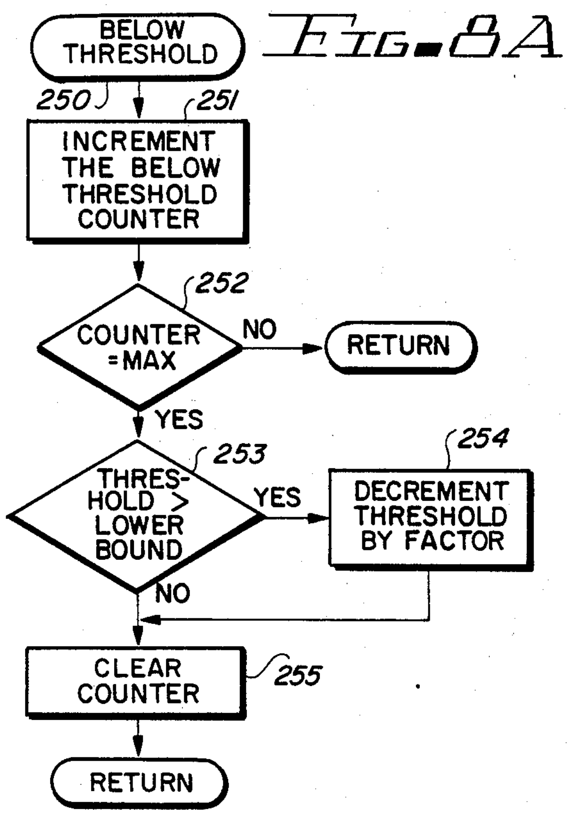
FIG. 8A is a flow chart of the program of the below threshold routine executed in the shed/restore routine.

Next, the below threshold routine of FIG. 8A is described. This subroutine is entered via label 250 and goes to block 251. In block 251, the program increments the above-mentioned "below threshold" counter, which is a software counter. The program then goes to decision block 252 and determines if the below threshold counter is equal to a predetermined maximum value. If this determination is negative, the program returns to the calling point in the shed/restore routine of FIGS. 5A and 5B. If the determination is affirmative, the program enters decision block 253 and determines if the present value of the floating threshold is greater than a fixed lower bound. If this determination is affirmative, the program decrements the value of the floating threshold point by a predetermined amount in block 254 and goes to block 255. If the determination of decision block 253 is negative, the program goes to block 255. In block 255 the program clears the below threshold counter and returns to the calling point in the shed/restore routine.

In essence, the function performed by the below threshold routine is to decrement the floating threshold point by a predetermined amount if the minor average is below the present value of the floating threshold for a sufficiently long predetermined amount of time, so that seasonal decreases in power usage patterns cause a corresponding decrease in the floating threshold point. This ensures that cost-saving load curtailment will continue to be accomplished during low power usage seasons.

Figure 8B:
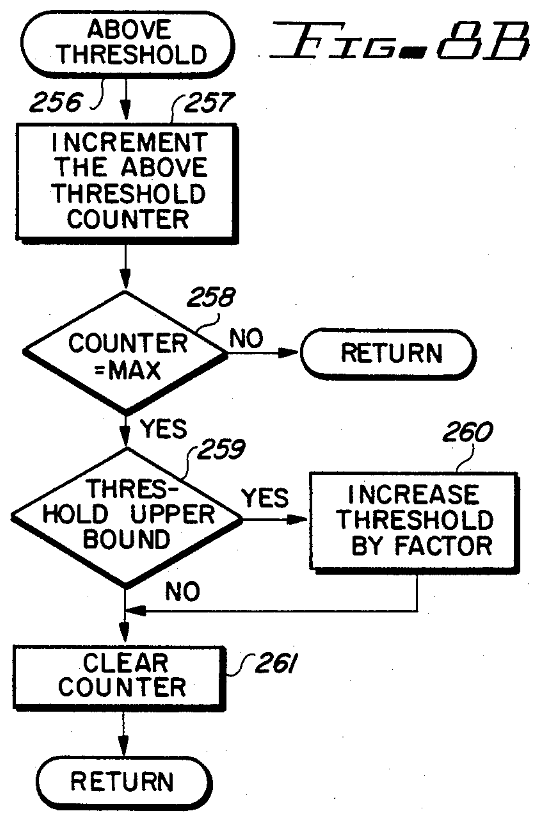
FIG. 8B is a flow chart of the program of the above threshold routine executed in the shed/restore routine.

The above threshold routine of FIG. 8B is entered via label 256, and goes to block 257. In block 257, the program increments the previously mentioned above threshold counter and goes to decision block 258. If the above threshold counter is not equal to its maximum value, the program returns to the calling point. If the above threshold counter is equal to its predetermined maximum value, the program enters decision block 259 and determines if the floating threshold point is less than the predetermined upper bound for the major average. If this determination is affirmative, the program increases the floating threshold value by a predetermined factor in block 260 and goes to block 261. If the determination of decision block 259 is negative, the program goes directly to block 261. In block 261, the program clears the above threshold counter and then returns to the calling point of the program.

In essence, the purpose of the above threshold counter is to increment the value of the floating threshold point to follow sudden or seasonal increases in the energy consumption of the user so that undue inconvenience is not caused by excessive load curtailment during such periods of high energy usage, while at least some cost-saving load curtailment continues to be accomplished.

Referring now to FIG. 11, the previously mentioned exponential filter routine is entered via label 320. The program first goes to block 321 and obtains new data, which is either the accumulated value of the past four power readings obtained (if the routine of FIG. 11 is being called by block 365 of FIG. 10) or the accumulated minor averages of the last sixty minutes (if the routine of FIG. 11 is being called by block 369 of FIG. 10). The program then goes to block 325, wherein the program calls up a routine that multiplies the new data obtained in block 321 by a predetermined factor, which can, for example, be 1/30, for a sixty minute interval. In block 327, this product is stored as a first OPERAND1. The program then obtains the existing value of either the minor average or the major average as computed previously by the routine of FIG. 11.

In block 329, the program multiplies the quantity obtained in block 328 by the quantity (1−XFACTOR), where XFACTOR is the factor referred to in block 325. The program then goes to block 330 and adds the result of block 329 to OPERAND1. The program then stores the result and returns to the calling point of the program.

In essence, what the routine of FIG. 11 has done is to compute the following expression:

$$XF = (\text{NEW DATA})(\text{XFACTOR}) + (XF)(1-\text{XFACTOR})(\text{X-FACTOR})(+)XF(1-\text{XFACTOR}),$$

the value of XF on the left-hand side of the foregoing expression being the "new" value of the minor average or major average (whichever of these two presently is being computed), and the value of XF on the right-hand side of the expression being the previous value of that quantity.

The quantity XFACTOR is a factor chosen to result in the desired weight being given to more recent values of XF than to previous values thereof.

Figure 14:
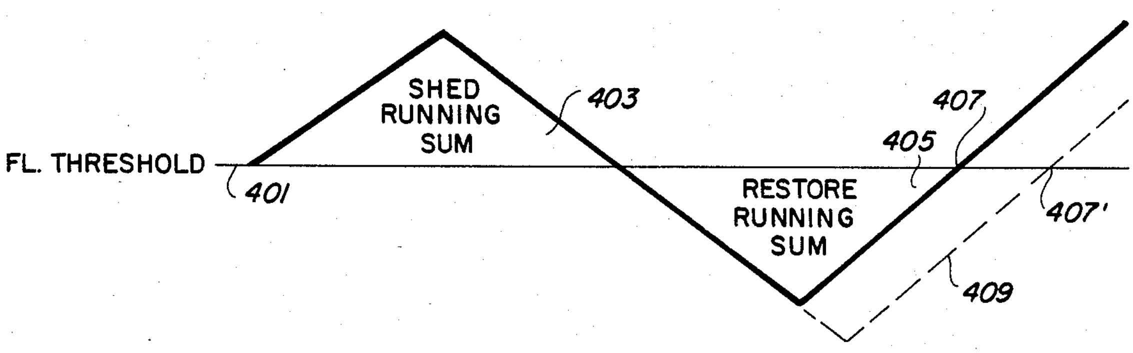
FIG. 14 is a diagram useful in explaining the shed running sum and restore running sum in the shed and restore routines of FIGS. 6 and 7.

Referring now to FIG. 6, the shed routine, which is called at block 236 of FIG. 5B, is entered via label 270 and goes to block 271 and add ΔD to the "shed running sum". The shed running sum is represented in FIG. 14 by the "positive" area 403 above the floating threshold line 401, and is essentially the product of the minor average and the time in the present sixty minute averaging interval during which the minor average exceeds the floating threshold value.

The program then goes to block 272 and 272A and sets up to sequentially index through the load table of FIG. 12B from the bottom (i.e., lowest priority load) to the top thereof. The program then goes to decision block 273 and makes a determination as to whether the load presently "pointed to" in the load table is already shed. If this determination is affirmative, the program goes to decision block 274 to determine if there are any more loads in the load table. If this determination is negative, the shed routine returns to the calling point of the program. If the determination of decision block 274 is affirmative, the program re-enters decision block 273 via block 272A.

If the determination of block 273 is negative, the program enters decision block 275 and determines if the load presently being pointed to is "on a timer" (that requires it to remain shed for a minimum time) by looking at the entry in Column 404 of the load table of FIG. 12A for the presently pointed to load. If the determination of decision block 275 is affirmative, the load pointed to still cannot be shed, and the program enters decision block 274, already described. If the determination of decision block 275 is negative, the program enters block 276 and computes the "impact" or "shed value" of shedding the load presently being pointed to by the program. This value is stored in the appropriate row of Column 405 of the load table of FIG. 12A. The program then enters decision block 277 and determines if the running sum minus the impact would be less than zero. If this is the case, the program returns to the calling point. If this determination is negative, the program then adjusts the shed running sum by the computed impact, i.e., subtracts the computed impact (or shed value) from the shed running sum in block 278 and then sets the shed/restore flag, as indicated in block 279. The program then enters block 280 and saves the most recent power reading. The program then goes to block 281 and calls up the V-to-F power reading routine (already described) of FIG. 10, executes it, and then enters decision block 282 to determine if the power reading is less than the previous power reading. If this determination is affirmative, the program goes to block 284. If this determination is negative, the program enters block 283 and re-adjusts the shed running sum by adding it to the computed impact.

Block 281 involves setting the power reading flag in the case where the voltage-to-frequency power measuring circuit of FIG. 13 is utilized. The shed routine is temporarily exited and the program passes thorugh the idle loop, and gets into the power reading subroutine this way, and then returns to the shed routine and enters block 282.

In block 284, the program resets the shed duration counter in Column 401 for the load presently being pointed to and then goes to block 285. In block 284, the program sets the load timer in Column 404 of the load table for the present load to its minimum off time. The program then goes to block 286 and computes a new value of the impact or shed value of the present load. The new impact is computed in accordance with the expression:

$$\text{IMPACT} = \text{IMPACT} + \frac{(\text{OLD POWER READING}) - (\text{NEW POWER READING})}{2}$$

where the value of IMPACT on the right side of the foregoing expression is the value presently in Column 405 of the load table for the presently pointed to load, OLD POWER READING is the value in block 280 of FIG. 6 and NEW POWER READING is the new value obtained in block 281.

The program then goes to block 287 and stores the new value of the IMPACT in the appropriate row of Column 405 of the load table of FIG. 12A.

The restore routine of FIG. 7 which is called at block 224 of FIG. 5A and block 229 of FIG. 5B entered via label 300 and goes to decision block 301 to determine if all loads are presently restored. If this determination is affirmative, the program enters block 302 and resets the above-mentioned restore running sum. Then, the program goes to block 303. If a determination of decision block 301 is negative, the program goes directly to block 303. In block 303, the program adds ΔD to the restore running sum. The restore running sum is represented in FIG. 14 by the "negative" area 405 below the floating threshold line 401, and is essentially the product of the minor average and the time in the present sixty minute averaging interval during which the minor average is less than the floating threshold.

After adding ΔD to the restore running sum in block 303, the program goes to block 304 and initializes the load table index. The program then goes to decision block 306 and determines if the load presently being pointed to is restored, by referring to the load table of FIG. 12A. If the determination of decision block 306 is affirmative, the program goes to block 307 to determine if more loads need to be checked. If so, the program re-enters block 305, previously described. If there are no more loads to be checked, the restore routine returns to the calling point of the program.

If the determination of decision block 306 is negative, the program goes to decision block 308 and checks to see if the load presently being pointed to is "on a timer". If this determination is affirmative, the program goes to decision block 307, previously described. If the determination of decision block 308 is negative, the program goes to block 309 and computes the "impact" of restoring the load presently pointed to. If the computed impact is greater than the restore running sum, as determined by decision block 310, the restore routine returns to the calling point of the program, because restoring the load presently pointed to would cause the major average to exceed the floating threshold line. If the determination of decision block 310 is negative, the program goes to block 311 and sets the shed/restore flag, which causes the load pointed to to be restored. The program then goes to block 312 and adjusts the restore running sum by adding to it the computed impact of the load being pointed to. The program then goes to block 313 and clears the entry in Column 401 of the load table of FIG. 12A for the load presently pointed to.

Note, with regard to decision block 310, the difference between decision block 377 of the shed routine and decision block 310 of the restore routine. The shed routine will look to more low priority loads, check to see if they are shed or on timer condition, and will compute a cumulative impact, and compare it with the running sum, if possible. In contrast, in the restore routine, the program does not attempt to restore a lower high priority load. This is because if the program waits for a few more minutes, the additional ΔD's added to the restore running sum might increase its area enough to allow restoring the highest priority load at that time. However, if we were to restore the second highest priority load at the present time, it is unlikely that we would be able to restore the highest priority load in a few minutes.

It is not nearly as important that a particular one of the lowest priority loads be shed now as it is that the highest priority load be restored, if not now, at least in the reasonably near future.

Referring to block 313 of FIG. 7, this step is performed because with a "shared" system some means is needed to ensure that any load, regardless of its user-set "weight", that has been shed for a long time will eventually rise to the top of the priority table and be restored, at least for a while. This refers to the off count in block 221 of the shed/restore routine which prevents an excessively long shed duration from occurring. This entry is contained in Column 406 of the load table of FIG. 12A for each load, and is different than the shed/restore duration number in Column 401, which is used for computing the cumulative priority value of each load.

The load timer for the load presently pointed to in Column 404 of the load table is reset to a value representing the minimum amount of time that the load being pointed to can be maintained in a restored status.

While the invention has been described with reference to several particular embodiments thereof, those skilled in the art will be able to make various modifications to the disclosed structures and methods without departing from the true spirit and scope of the invention.

For example, in FIG. 1A, the disclosed embodiment of the invention shows switch 46 that responds to power threshold information from a remote utility. This information is in the form of pulses, the width of which represent information. The widths of these pulses are converted to digital information by timer 40 and/or timer 42, and this digital information is then read and processed by microprocessor 12 to adjust the power limit on the basis of which shed and/or restore decisions are to be now made. However, and quite equivalently, a time of day clock could actuate switch 46 or a similar switch to adjust the foregoing power limit in accordance with the time of day. This can be a useful technique for commercial buildings, in which it may be desirable to turn off air conditioning units during most of the nighttime hours to save energy costs. However, when the air conditioning thermostats are manually turned down at night and then are manually turned up in the morning, as often is the practice, very high peak power demands are the result. The controller of FIGS. 1A and 1B could easily handle the task of gradually cooling the subject commercial building down in the morning by turning on the various shared priority air conditioning loads one at a time to keep the peak power limit or threshold input to the controller by the time of day clock from being exceeded. By controlling the threshold, as a function of the time of day or night, the clock could, in conjunction with the controller, gradually bring the room temperature in the commercial building down to comfortable levels by the time employees begin to arrive in the morning, resulting in both reduced energy usage and avoidance of excessive peak load demands in the early hours of the work day.

APPENDIX

```
        1:S2MAIN.TXT SSB MACRO ASSEMBLER 2.3
DOS690  SYSTEM 2.0  (VTOF)        05/13/82

                     *   SYSTEM 2.0 - MAIN PROCEDURE
                     *                 (S2MAIN.TXT)
                     *      INITIALIZATION ROUTINE
                     *      IDLE LOOP
                     *
                     ******* DATE CREATED 12/15/81
                     ******* DATE LAST MODIFIED 03/31/82
                             OPT     MEX
                             OPT     LLE=120
                             LIBRY   SYSEQU.TXT SSB SYSTEM EQUATES
                             OPT     LIST
          0000     A XXXXXX EQU     0         STE II VERSION SWITCH
          0001     A STEONE EQU     1         STE I COMMUNICATION
                             LIBRY   2:S2ASMC.TXT CONDITIONAL ASSEMBLY FLAGS
                     *       CONDITIONAL ASSEMBLY FLAGS
                     *
          0001     A NVFLAG EQU     1         NON-VOLATILE RAM FLAG
                     *                       (1=NON-VOLATILE RAM BEING USED)
          0001     A CFACIA EQU     1         ACIA INCLUDED FLAG
                     *                       (0 = NO ACIA)
          0001     A CFUTIL EQU     1         UTILTITY OVERRIDE INCLUDED FLAG
                     *                       (0 = NO UTILITY OVERRIDE)
          0001     A CFVTOF EQU     1         VTOF MEASUREMENT INCLUDED FLAG
                     *                       (0 = NO VTOF)
          0000     A CFPI   EQU     0         PULSE INITIATOR MEASUREMENT INCLUDED FLAG
                     *                       (0 = NO PI)
          0001     A CFUNDR EQU     1         UNDERFREQUENCY OPTION
                     *                       (0 = NO UNDERFREQUENCY)
          0000     A CFRTC  EQU     0         REAL-TIME CALENDAR
                     *                       (0 = NO REAL TIME CALENDAR)
                     *
          0000     A BASPNL EQU     0         *BASIC PANEL FLAG
                     *                       (0 = NOT BASIC PANEL)
          0001     A SMRTPN EQU     1         *SMART PANEL FLAG
                     *                       (0 = NOT SMART PANEL)
                     *
          0001     A SHARED EQU     1         *SHARED SYSTEM FLAG
                     *                       (0 = NON-SHARED SYSTEM)
                     *                       (1 = SHARED SYSTEM)
                     *       END OF CONDITIONAL ASSEMBLY FLAGS
                             LIBRY   2:S2EQUS.TXT SYSTEM 2 EQUATES
                     *   SYSTEM 2.0 - EQUATES
                     *              (S2EQUS.TXT)
                     *
                     *
                     ******* DATE LIBRARY CREATED 11/18/81
```

```
                 ******* DATE LAST MODIFIED 02/17/82
                 *
                 *
                 *
                 *      NON-VOLATILE MEMORY SAVE/RECALL COMMANDS
                 *
1800          A RECALL EQU    $1800     RECALL TO RAM
1000          A NVSAVE EQU    $1000     SAVE FROM RAM
                 *
                 *
                 *   BIT SET/RESET EQUATES
                 *
                 * SET BIT
                 *                            *HEX   DEC    OCT     BINARY
0001          A SHEX01 EQU    1           *01H - 001 - 001Q - 00000001B
0002          A SHEX02 EQU    2           *02H - 002 - 002Q - 00000010B
0004          A SHEX04 EQU    4           *04H - 004 - 004Q - 00000100B
0008          A SHEX08 EQU    8           *08H - 008 - 010Q - 00001000B
0010          A SHEX10 EQU    16          *10H - 016 - 020Q - 00010000B
0020          A SHEX20 EQU    32          *20H - 032 - 040Q - 00100000B
0040          A SHEX40 EQU    64          *40H - 064 - 100Q - 01000000B
0080          A SHEX80 EQU    128         *80H - 126 - 200Q - 10000000B
                 *
                 * RESET BIT
                 *
00FE          A RHEX01 EQU    254         *FEH - 254 - 376Q - 11111110B
00FD          A RHEX02 EQU    253         *FDH - 253 - 375Q - 11111101B
00FB          A RHEX04 EQU    251         *FBH - 251 - 373Q - 11111011B
00F7          A RHEX08 EQU    247         *F7H - 247 - 367Q - 11110111B
00EF          A RHEX10 EQU    239         *EFH - 239 - 357Q - 11101111B
00DF          A RHEX20 EQU    223         *DFH - 223 - 337Q - 11011111B
00BF          A RHEX40 EQU    191         *BFH - 191 - 277Q - 10111111B
007F          A RHEX80 EQU    127         *7FH - 127 - 177Q - 01111110B
                 *
                 *
                 *      FLAG SET/CLEAR EQUATES
                 *
                 *         FOR FLAG BYTE #1
                 *
0001          A REPFLG EQU    SHEX01    REPEAT FLAG (SET)
00FE          A REPCLR EQU    RHEX01    REPEAT FLAG (CLEAR)
0002          A CTLFLG EQU    SHEX02    CONTROL FLAG (SET)
00FD          A CTLCLR EQU    RHEX02    CONTROL FLAG (CLEAR)
0004          A PWRFLG EQU    SHEX04    POWER READING FLAG
00FB          A PWRCLR EQU    RHEX04
0008          A EOFFLG EQU    SHEX08    INPUT EOF FLAG
00F7          A EOFCLR EQU    RHEX08
0010          A SECFLG EQU    SHEX10    SECOND FLAG
00EF          A SECCLR EQU    RHEX10
0020          A QRYFLG EQU    SHEX20    QUERY FLAG
00DF          A QRYCLR EQU    RHEX20
0040          A UNDFLG EQU    SHEX40    UNDER-FREQUENCY FLAG
```

```
003F    A UNDCLR EQU    RHEX40
0030    A PUPFLG EQU    SHEX80   PRIORITY TABLE UPDATE FLAG
007F    A PUPCLR EQU    RHEX80
          *
          *          FOR FLAG BYTE #2
          *
0001    A LDTFLG EQU    SHEX01   CHECK LOAD TIMERS FLAG
00FE    A LDTCLR EQU    RHEX01
0002    A SRTFLG EQU    SHEX02   SHED/RESTORE FLAG
00FD    A SRTCLR EQU    RHEX02
0004    A MAVFLG EQU    SHEX04   MAJOR AVERAGE FLAG
00FB    A MAVCLR EQU    RHEX04
0008    A PLDPFG EQU    SHEX08   PLDP FLAG
00F7    A PLDPCL EQU    RHEX08
0010    A DEADFG EQU    SHEX10   DEADMAN TIMER FLAG
00EF    A DEADCL EQU    RHEX10
0020    A NOQURY EQU    SHEX20   NO PANEL QUERY FLAG
00DF    A NOQCLR EQU    RHEX20
0040    A USRMOD EQU    SHEX40
008F    A USRCLR EQU    RHEX40
          *
          *          FOR FLAG BYTE #3
          *
0001    A DRQFLG EQU    SHEX01   DATA TRANSFER FLAG
00FE    A DRQCLR EQU    RHEX01
0002    A BLNKSW EQU    SHEX02   BLINK MODE (ON/OFF) FLAG
00FD    A BLNKCL EQU    RHEX02
0004    A BLKTGL EQU    SHEX04   BLINK TOGGLE ON
00FB    A BLKOFF EQU    RHEX04   BLINK TOGGLE OFF
0008    A ALRMON EQU    SHEX08   ALARM FLAG ON
00F7    A ALRMFF EQU    RHEX08   ALARM FLAG OFF
0010    A OVRPST EQU    SHEX10   OVER SETPOINT PAST
00EF    A OVRCLR EQU    RHEX10
0020    A ENTRFG EQU    SHEX20   ENTER BUTTON PUSHED
00DF    A ENTRCL EQU    RHEX20
0040    A EMODON EQU    SHEX40   ENTER MODE - ON
008F    A EMODFF EQU    RHEX40   ENTER MODE - OFF
          *
          *          FOR FLAG BYTE #4
          *
0001    A SSDFLG EQU    SHEX01   SECOND TIME THRU SHED ROUTINE
00FE    A SSDCLR EQU    RHEX01   FIRST TIME THRU SHED ROUTINE
0002    A RAPFLG EQU    SHEX02   WRAP ARROUND FLAG
00FD    A RAPCLR EQU    RHEX02
0004    A SYSFLG EQU    SHEX04   SYSTEM NO CONTROL FLAG
00FB    A SYRFLG EQU    RHEX04   SYSTEM CONTROL FLAG
0008    A PIMFLG EQU    SHEX08   PI MEASUREMENT FLAG
00F7    A PIMCLR EQU    RHEX08
0010    A NVKFLG EQU    SHEX10   NON-VOLATILE RAM AREA CHECKSUM FLAG
00EF    A NVKCLR EQU    RHEX10
0030    A STRTUP EQU    SHEX80   STARTUP FLAG
```

```
007F    A STRTCL EQU    RHEX80
             *
             *        FOR BIT SWITCHES (BITSWS)
             *
0001    A PNLXT1 EQU    SHEX01    PANEL EXTENSION (BIT 0)
0002    A PNLXT2 EQU    SHEX02    PANEL EXTENSION (BIT 1)
0003    A PNLXT  EQU    3         BOTH
             *
             *        TIMER FLAG BITS
             *
0001    A TIMER1 EQU    SHEX01    TIMER 1 FLAG BIT
0002    A TIMER2 EQU    SHEX02    TIMER 2 FLAG BIT
0004    A TIMER3 EQU    SHEX04    TIMER 3 FLAG BIT
             *
             *        REAL TIME CALENDAR FLAGS
             *
0080    A RTCSET EQU    SHEX80    'SET' FLAG
007F    A RTCCLR EQU    RHEX80    CLEAR THE 'SET' FLAG
0020    A RTCAIE EQU    SHEX20    ALARM INTERRUPT ENABLE FLAG
             *
             *        LOAD TABLE STATUS BIT EQUATES
             *
0001    A LDSSR  EQU    SHEX01    SHED/RESTORE STATUS BIT
             *                      (0=RESTORE/1=SHED)
00FE    A LDCSR  EQU    RHEX01
0020    A LDSTMR EQU    SHEX20    ON TIMER STATUS BIT
00DF    A LDCTMR EQU    RHEX20
0040    A LDSBYP EQU    SHEX40    ON BYPASS STATUS BIT
00BF    A LDCBYP EQU    RHEX40
0080    A LDSCNC EQU    SHEX80    CONTROL/NO CONTROL STATUS BIT
007F    A LDCCNC EQU    RHEX80
             *
             *        ADDRESS EQUATES
             *
0000    A        IFEQ   XXXXXX
0000    A RAMADR EQU    $0        RAM STARTING ADDRESS
                 ENDC
0000    A        IFNE   XXXXXX
          RAMADR EQU    $1000
                 ENDC
03FF    A MAXRAM EQU    RAMADR+$03FF MAX RAM ADDRESS
0000    A        IFEQ   XXXXXX
0001    A        IFNE   NVFLAG
0800    A NOVRAM EQU    $0800
                 ENDC
0001    A        IFEQ   NVFLAG
          NOVRAM EQU    $7E00   NON-VOLATILE RAM
                 ENDC
                 ENDC
6800    A ROMADR EQU    $6800     ROM STARTING ADDRESS
6800    A STADDR EQU    ROMADR    PROGRAM STARTING ADDRESS
```

```
0000   A DATADR EQU    RAMADR   DATA AREA STARTING ADDRESS
03FD   A STACK  EQU    RAMADR+$03FD STACK ADDRESS
         *
         *      MAXIMUM NUMBER OF LOADS
         *
0008   A MAXLDS EQU    8
         *
         *      LOAD TABLE OFFSET
         *
0008   A LDOFST EQU    MAXLDS   SET TO MAXIMUM NUMBER OF LOADS
         *
         *      INTERRUPT VECTORS
         *
7FFE   A IVRSET EQU    $7FFE    RESET INTERRUPT
7FFC   A IVNMI  EQU    $7FFC    NON-MASKABLE INTERRUPT
7FF8   A IVIRQ  EQU    $7FF8    IRQ INTERRUPT
7FF6   A IPFAIL EQU    $7FF6    POWER FAIL INTERRUPT
         *
         *      IRQ INTERRUPT STATUS BYTES
         *
         *         TIMER #0
         *
2000   A TOCR0  EQU    $2000    WRITE CNTRL REG #1 & #3/NO OPERATION
2001   A TOCR1  EQU    $2001    WRITE CNTRL REG #2/READ STATUS REG
         *                     1) BAUDRATE
         *                     2) DEADMAN TIMER
         *                     3) UTILITY OPEN
2002   A TOCR2  EQU    $2002    WRITE MSB BFR REG/READ TIMER #1 CNTR
2003   A TOCR3  EQU    $2003    WRITE TIMER #1 LATCHES/READ LSB BFR REG
2004   A TOCR4  EQU    $2004    WRITE MSB BFR REG/READ TIMER #2 CNTR
2005   A TOCR5  EQU    $2005    WRITE TIMER #2 LATCHES/READ LSB BFR REG
2006   A TOCR6  EQU    $2006    WRITE MSB BFR REG/READ TIMER #3 BFR REG
2007   A TOCR7  EQU    $2007    WRITE TIMER #3 LATCHES/READ LSB BFR REG
         *
         *         TIMER #1
         *
2100   A T1CR0  EQU    $2100    WRITE CNTRL REG #1 & #3/NO OPERATION
2101   A T1CR1  EQU    $2101    WRITE CNTRL REG #2/READ STATUS REG
         *                     1) V TO F (OR PI)
         *                     2) UNDERFREQUENCY  (SECOND CLOCK TIMER)
         *                     3) UTILITY CLOSE
2102   A T1CR2  EQU    $2102    WRITE MSB BFR REG/READ TIMER #1 CNTR
         *                     (COUNT FOR V TO F)
2103   A T1CR3  EQU    $2103    WRITE TIMER #1 LATCHES/READ LSB BFR REG
2104   A T1CR4  EQU    $2104    WRITE MSB BFR REG/READ TIMER #2 CNTR
2105   A T1CR5  EQU    $2105    WRITE TIMER #2 LATCHES/READ LSB BFR REG
2106   A T1CR6  EQU    $2106    WRITE MSB BFR REG/READ TIMER #3 BFR REG
2107   A T1CR7  EQU    $2107    WRITE TIMER #3 LATCHES/READ LSB BFR REG
         *
0000   A        IFEQ   XXXXXX
2200   A ACSTAT EQU    $2200    ACIA CONTROL/STATUS BYTE
```

```
2201     A ACDATA EQU    $2201     ACIA DATA BYTE
                  ENDC
0000     A        IFNE   XXXXXX
           ACSTAT EQU    $EC20    ACIA CONTROL/STATUS BYTE
           ACDATA EQU    $EC21    ACIA DATA BYTE
                  ENDC
           *
           *      BIT SWITCHES
           *
2500     A BITSWS EQU    $2500
           *
           *      TO STE-1 DATA OUT
           *
2600     A STEDAT EQU    $2600     DATA OUT REGISTER
2700     A STESTB EQU    $2700     DATA OUT STROBE
           *
           *      RELAY LOAD LATCH PORT
           *
2800     A RLYPRT EQU    $2800
           *
           *      REAL TIME CALENDER RAM MAP
           *
3000     A RTC00  EQU    $3000     RTC SECONDS
300A     A RTREGA EQU    $300A     RTC REGISTER A
300B     A RTREGB EQU    $300B     RTC REGISTER B
300C     A RTREGC EQU    $300C     RTC REGISTER C
300D     A RTREGD EQU    $300D     RTC REGISTER D
           *
           *      REAL TIME CALENDER - REG-A INITIAL VALUE
           *
002F     A RTCRGA EQU    $2F
           *
           *      I/O EQUATES
           *
000A     A INLEN  EQU    10        INPUT MSG LENGTH
000A     A OUTLEN EQU    10        OUTPUT MSG LENGTH
           *      (1000000/4)/(1200*16*2)  BAUD COMPUTATION FACTOR
001A     A BAUD   EQU    $1A
           *
           *      QUERY MESSAGE EQUATES
           *
0000     A QRYFC  EQU    0         FAMILY CODE
0001     A QRYDC  EQU    1         DEVICE CODE
0002     A QRYOPC EQU    2         OP CODE
0003     A QRYDXF EQU    3         DATA TRANSFER
0003     A QRYLDN EQU    3         LOAD NUMBER
0004     A QRYSTC EQU    4         STATUS CODE
0005     A QRYDAT EQU    5         DATA (2 BYTES)
0007     A QRYNU  EQU    7         NOT USED
0008     A QRYCKS EQU    8         CHECKSUM
           *
```

```
                *       RESPONSE MESSAGE EQUATES
                *
0003    A RSPSET EQU    3         UPDATED SETPOINT
0003    A RSPADR EQU    3         DATA ADDRESS
0005    A RSPBP  EQU    5         BYPASS INDICATOR
0006    A RSPPKR EQU    6         PEAK RESET INDICATOR
                *
                *       RESET PEAK INDICATOR
                *
0055    A RSETPK EQU    $55
                *
                *       MESSAGE OPCODES
                *
00F1    A OPCDUP EQU    $F1       LMM DATA UPDATE
00A0    A OPCSPR EQU    $A0       DATA REQUEST - SINGLE PRECISION
00A1    A OPCDPR EQU    $A1       DATA REQUEST - DOUBLE PRECISION
00A2    A OPCXFR EQU    $A2       DATA TRANSFER - CP TO LMM
                *
                *       FAMILY AND DEVICES CODES
                *
0046    A FMCODE EQU    'F
0043    A DVCCTL EQU    'C
0050    A DVCPNL EQU    'P
                *
                *       ARITHMETIC SYSTEM CONSTANTS
                *
003C    A BYPCNT EQU    60        ON-TIMER FOR ACTIVATED BYPASS NUMBER
0006    A PLDPOF EQU    6         PLDP SECOND OFFSET (SAME OFFSET AS SHED/RESTORE)
000F    A MAXOFF EQU    15        MAX # MINUTES HPL IS SHED
001E    A MXOFCT EQU    30        MAX OFF CNT FOR ZERO CROSSOVER
0001    A DDTODX EQU    1         LIMIT RATIO FACTOR FOR DELTAD TO DELTAX
                *
                *       MAJOR AVERAGE COUNTER RESET
                *
001E    A MAJSET EQU    30
                *
                *       DEADMAN TIMER CONSTANT
                *
00F0    A DEADMX EQU    120*2     120*NMBR OF SECONDS
0001    A               IFNE    CFVTOF
                *
                *       V TO F EQUATES
                *
0002    A VTOFMX EQU    2         MAX TO 2 SECONDS
                        ENDC
0000    A               IFNE    CFPI
                *
                *       PULSE INITIATOR EQUATES
                *
                KH      EQU     5
                PICNST  EQU     3600*KH*2
```

```
                 . PIFREQ EQU    120/4          CLOCK FREQUENCY
                          ENDC
                   * SYSTEM 2.0 - DATA DEFINITIONS
                   *
                   *        DATA DEFINITIONS
                   *
      0000       A FLAG0  EQU    DATADR   DUMMY FLAG WORD
      0001       A FLAG1  EQU    FLAG0+1  FLAG WORD 1
      0002       A FLAG2  EQU    FLAG1+1  FLAG WORD 2
      0003       A FLAG3  EQU    FLAG2+1  FLAG WORD 3
      0004       A FLAG4  EQU    FLAG3+1  FLAG WORD 4
                   *
                   *       NUMBER OF ACTIVE LOADS
                   *
      0005       A NBRLDS EQU    FLAG4+1
      0006       A NBRPLS EQU    NBRLDS+1 NUMBER OF LOADS PLUS ONE
                   *
                   *       LOAD TABLE
                   *
      0007       A LDTBL  EQU    NBRPLS+1
                   *
                   *       SECOND COUNTER
                   *
      0057       A SECNTR EQU    LDTBL+LDOFST*10
                   *
                   *       MINUTE COUNTER
                   *
      0058       A MINCTR EQU    SECNTR+1
                   *
                   *       BYPASS LOAD NUMBER
                   *
      0059       A BYPSAV EQU    MINCTR+1
                   *
                   *       BYPASS COUNTER
                   *
      005A       A BPCNTR EQU    BYPSAV+1
                   *
                   *       ENTER COUNTER
                   *
      005B       A ENTRCT EQU    BPCNTR+1
                   *
                   *       TEMPORARY STORAGE FOR CHECKSUM ROUTINE
                   *
      005C       A WRKBF  EQU    ENTRCT+1
      005C       A CNT    EQU    WRKBF
      005D       A CNT2   EQU    CNT+1
      005E       A TEMP   EQU    CNT2+1
      005F       A TEMP1  EQU    TEMP+1
      0060       A TEMP2  EQU    TEMP1+1
      0061       A TEMP3  EQU    TEMP2+1
      0062       A TEMP4  EQU    TEMP3+1
```

```
0063     A TEMP5  EQU    TEMP4+1
0064     A TEMP6  EQU    TEMP5+1
0065     A SHFTRG EQU    TEMP6+1  SHIFT REGISTER
           *
           *      TEMPORARY STORAGE FOR BINARY TO DECIMAL CONVERSION ROUTINE
           *            AND MULIPLICATION ROUTINE
           *
0067     A OPRND1 EQU    SHFTRG+2
0067     A SAVEX  EQU    OPRND1
0069     A OPRND2 EQU    SAVEX+2
0069     A SAVEX1 EQU    OPRND2
006B     A RSULT1 EQU    SAVEX1+2
006F     A SAVEA  EQU    RSULT1+4
0071     A SAVEB  EQU    SAVEA+2
           *
           ********** LEAVE THE NEXT FOUR ITEMS IN THIS ORDER ******
           *                SHORT AVERAGE
           *                MAJOR AVERAGE
           *                PEAK AVERAGE
           *                SETPOINT (LIMIT BIAS)
           *                RUNNING SUM (FOR AVERAGE) TRIPLE PRECISION
           ***********************************************************
0073     A SHRTAV EQU    SAVEB+2
0075     A MAJAVG EQU    SHRTAV+2
0077     A PEAKAV EQU    MAJAVG+2
0079     A SETPT  EQU    PEAKAV+2 EFFECTIVE SETPOINT
007B     A RUNSUM EQU    SETPT+2
           *
           *      SYSTEM AVERAGE VARIABLES
           *
007E     A DELTAX EQU    RUNSUM+3 SHORT AVERAGE - SETPOINT
0081     A DELTAD EQU    DELTAX+3 MAJOR AVERAGE - SETPOINT
           *
           *      TEMPORARY SYSTEM AVERAGE VARIABLES
           *
0084     A OLDDLX EQU    DELTAD+3 PREVIOUS DELTAX
0087     A OLDDLD EQU    OLDDLX+3 PREVIOUS DELTAD
           *
           *      ZERO CROSSOVER VARIABLES
           *
008A     A ZCXCNT EQU    OLDDLD+3
           *
           *      SHED/RESTORE LOAD # VARIABLE
           *
008C     A SRLOAD EQU    ZCXCNT+2
           *
           *      TEMP LOC FOR SRLOAD
           *
008D     A SRSAVE EQU    SRLOAD+1
           *
           *      USER SETPOINT
```

```
                   *
008E     A USRSET EQU    SRSAVE+1
                   *
                   *       UTILITY PROVIDED SETPOINT LIMIT
                   *
0090     A CLIMIT EQU    USRSET+2
                   *
                   *       SYSTEM PRESENT DAC (V/F) READING
                   *
0092     A NOWRDG EQU    CLIMIT+2
                   *
                   *       SNAP SHOT OF PAST DAC (V/F) READING
                   *
0094     A SNAP   EQU    NOWRDG+2
                   *
                   *       RELAY MASK VARIABLE
                   *
0096     A RELMAS EQU    SNAP+2
                   *
                   *       DIVISION ROUTINE RAM AREA
                   *
0097     A DIVEND EQU    RELMAS+1 DIVIDEND
009A     A DIVSOR EQU    DIVEND+3 DIVISOR
009D     A DRESLT EQU    DIVSOR+3 QUOTIENT
00A0     A DCNT   EQU    DRESLT+3 BIT COUNTER
                   *
                   *       I/O COUNTERS AND BUFFERS
                   *
00A1     A IOTMOT EQU    DCNT+1   TIMEOUT COUNTER
00A2     A NOANSW EQU    IOTMOT+1 NO ANSWER COUNTER
                   *
                   *       QUERY LOAD INDEX
                   *
00A3     A QRYLIX EQU    NOANSW+1
                   *
                   *       QUERY MODE
                   *
00A4     A QRYMOD EQU    QRYLIX+1
                   *
                   *       DATA TRANSFER CONTROL INFO
                   *
00A5     A LENHLD EQU    QRYMOD+1 LENGTH FACTOR (1 OR 2 BYTES)
00A6     A ADDRHD EQU    LENHLD+1 ADDR OF DATA HOLD
                   *
                   *       INPUT MESSAGE BUFFER
                   *
00A7     A INBUF  EQU    ADDRHD+1
                   *
                   *       INPUT DATA COUNTER
                   *
00B1     A INCTR  EQU    INBUF+INLEN
```

```
                    *
                    *       OUTPUT MESSAGE BUFFER
                    *
        00B2      A QRYMSG EQU    INCTR+1
        00B2      A OUTBUF EQU    QRYMSG
                    *
                    *       OUTPUT COUNTER AND INDEX
                    *
        00BC      A OUTCTR EQU    OUTBUF+OUTLEN
        00BD      A OUTIX  EQU    OUTCTR+1
                    *
                    *       V TO F COUNTERS
                    *
        00BF      A COUNT1 EQU    OUTIX+2
        00C1      A COUNT2 EQU    COUNT1+2
        00C1      A WRAPS  EQU    COUNT2
        00C3      A DELTAC EQU    COUNT2+2 DELTA C
        00C5      A MAJCTR EQU    DELTAC+2 MAJOR AVERAGE COUNTER
        00C7      A VTOFCT EQU    MAJCTR+2 TIME FOR VTOF UPDATE
                    *
                    *       IMAGE BYTE - TIMER 0
                    *
        00C8      A IMOCR0 EQU    VTOFCT+1 CONTROL REGISTER 1
        00C9      A IMOCR1 EQU    IMOCR0+1 CONTROL REGISTER 2
        00CA      A IMOCR2 EQU    IMOCR1+1 CONTROL REGISTER 3
                    *
                    *       IMAGE BYTE - TIMER 1
                    *
        00CB      A IM1CR0 EQU    IMOCR2+1
        00CC      A IM1CR1 EQU    IM1CR0+1
        00CD      A IM1CR2 EQU    IM1CR1+1
        0000      A        IFNE   BASPNL
                    *
                    *       BASIC PANEL INPUT DATA HOLD AREA
                    *
                    BPHOLD EQU    IM1CR2+1        BYPASS LOAD HOLD
                    STPHLD EQU    BPHOLD+1        SETPOINT HOLD
                    BPLOLD EQU    STPHLD+1        OLD BYPASS LOAD
                    STPOLD EQU    BPLOLD+1        OLD SETPOINT
                           ENDC
                    *
                    *       LOAD TABLE EQUATES
                    *
        0007      A PTNMBR EQU    LDTBL     LOAD NUMBER (BY PRIORITY)
        000F      A PTACCV EQU    LDTBL+LDOFST ACCUMULATED PRIORITY VALUE  (2-BYTES)
        001F      A LTVAL  EQU    LDTBL+LDOFST*3 LOAD VALUE                 (2-BYTE)
        002F      A LTSTAT EQU    LDTBL+LDOFST*5 LOAD STATUS                (1-BYTE)
                    *
                    *       BIT 0 = SHED/RESTORE STATUS BIT
                    *       BIT 1 = *NOT USED*
                    *       BIT 2 = *NOT USED*
```

```
                      *       BIT 3 = *NOT USED*
                      *       BIT 4 = *NOT USED*
                      *       BIT 5 = ON TIMER STATUS BIT
                      *       BIT 6 = ON BYPASS STATUS BIT
                      *       BIT 7 = CONTROL/NO CONTROL STATUS BIT
                      *
           0037     A LTIMPT EQU    LDTBL+LDOFST*6 LOAD IMPACT (ACT LD/TIME   (2-BYTE)
           0047     A LTTIMR EQU    LDTBL+LDOFST*8 LOAD TIMER                 (1-BYTE)
           004F     A MXSHTB EQU    LDTBL+LDOFST*9 SHED TIME COUNT TABLE      (1-BYTE)
                      * END OF EQUATES
                             LIBRY  2:S2DATA.TXT SYSTEM 2 DATA DEFINITIONS
                      * SYSTEM 2.0 - DATA DEFINITIONS
                      *                (S2DATA.TXT)
                      *
                      ******* DATE LIBRARY CREATED 11/10/81
                      ******* DATA LAST MODIFIED 02/18/82
                      *
                      *        DATA DEFINITION AREA
                      *
      0000                   ORG    DATADR
      0000 0100     A        RMB    255
                      *
                      *       STACK SAVE AREA FOR DEBUGGER
                      *
      03FE                   ORG    STACK+1
      03FE 0002     A STKSAV RMB    2
                      *
                      *       NON-VOLATILE DATA AREA
                      *
           0000     A        IFEQ   XXXXXX
      0800                   ORG    NOVRAM
                             ENDC
           0800     A NVCODE EQU    *
      0800 59       A        FCC    'Y'
           0801     A SCLOAD EQU    *
      0801 02       A        FCB    2,2,2,2,2,2,0,0
      0809 02       A        FCB    2,2,2,2,2,2,0,0
      0811 01       A        FCB    1,1,1,1,1,1,-1,-1
                      *
                      *       SYSTEM CONSTANT AREA
                      *
           0801     A SCNTMR EQU    SCLOAD    ON TIMER AMOUNT
           0809     A SCFTMR EQU    SCLOAD+LDOFST OFF TIMER AMOUNT
           0811     A SCPRTY EQU    SCLOAD+LDOFST*2 PRIORITY VALUE
           0811     A LTPRTY EQU    SCPRTY
                      *
                      *       FULL SCALE
                      *
      0819 18       A FULLSC FCB    24
                      *
                      *       MAX SETPOINT LIMIT
```

```
899                          *
900A 081A        5DC0      A MAXLIM FDB     24000     MAX LIMIT
901                          *
902                          *       EXPONENTIAL FILTER FACTORS
903                          *
904A 081C        0021      A XFCTRS FDB     33         SHORT AVERAGE FACTOR
905A 081E        0008      A XFCTRL FDB     8          LONG AVERAGE FACTOR
906                          *
907                          *       TIME FACTOR FOR CALULATION NEEDING IT (EARAM)
908                          *
909A 0820        3C        A TFACTR FCB     60
910                          *
911                          *       NON-VOLATILE CHECKSUM
912                          *
913              0821      A NVCKSM EQU     *
914A 0821        0002      A        RMB     2
915              0021      A NVLEN  EQU     NVCKSM-NVCODE
916                          * END OF DATA DEFINITIONS
917                                  LIBRY  2:S2MACR.TXT SYSTEM 2 MACRO DEFINITIONS
919                          *    SYSTEM 2.0 - MACRO DEFINITIONS
920                          *
921                          *
922                          ******* DATE LIBRARY CREATED 11/20/81
923                          ******* DATE LAST MODIFIED 12/07/81
924                          *
925                          *        SET FLAG MACRO
926                          *          PARAMETERS
927                          *             1ST = BIT MASK
928                          *             2ND = FLAG WORD  OR OFFSET
929                          *             3RD = REGISTER X OR Y (IF USED)
930                          *
931                          SETFLG MACR
932                                  PSHS A
933                                  IFEQ   NARG-2
934                                  LDA A  \1
935                                  ORA    #\0
936                                  STA A  \1
937                                  ENDC
938                                  IFEQ   NARG-3
939                                  LDA    \1,\2
940                                  ORA    #\0
941                                  STA    \1,\2
942                                  ENDC
943                                  PULS A
944                                  ENDM
945                          *
946                          *       CLEAR FLAG MACRO
947                          *          PARAMETERS
948                          *             1ST = BIT MASK
949                          *             2ND = FLAG WORD
950                          *             3RD = REGISTER X OR Y (IF USED)
```

```
*
CLRFLG MACR
       PSHS A
       IFEQ   NARG-2
       LDA A  \1
       ANDA   #\0
       STA A  \1
       ENDC
       IFEQ   NARG-3
       LDA    \1,\2
       ANDA   #\0
       STA    \1,\2
       ENDC
       PULS A
       ENDM
*
*      TEST FLAG MACRO
*         PARAMETERS
*            1ST = BIT MASK
*            2ND = FLAG WORD  OR OFFSET
*            3RD = REGISTER X OR Y (IF USED)
*
TSTFLG MACR
       PSHS A
       LDA A  #\0
       IFEQ   NARG-2
       BIT A  \1
       ENDC
       IFEQ   NARG-3
       BIT A  \1,\2
       ENDC
       PULS A
       ENDM
*
*      TEST BIT MACRO
*         PARAMETERS
*            1ST = BIT MASK
*            2ND = ADDRESS OF OFFSET
*            3RD = REGISTER X OR Y
*
TSTBIT MACR
       LDB    \1
       ABX
       LDA A  #\0
       BIT A  0,\2
       ENDM
*
*      ROL DOUBLE
*
ROLD   MACR
       ROL B
```

```
                                ROL A
                                ENDM
                        *
                        *       ROR DOUBLE
                        *
                        RORD    MACR
                                ROR A
                                ROR B
                                ENDM
                        * END OF MACROS
                        *        INITIALIZATION ROUTINE
6800                            ORG     STADDR
                                LIBRY   2:S2INIT.TXT INITIALIZATION ROUTINE
                        * SYSTEM 2.C - INITIALIZATION ROUTINE
                        *                (S2INIT.TXT)
                        *
                        *
                        ******** DATE LIBRARY CREATED 11/19/81
                        ******** DATE LAST MODIFIED 04/06/82
                        *
                        *       INITIALIZATION ROUTINE
                        *
6800                            ORG     STADDR
                        *       START POINT FOR DEBUG BOARD ON SYS 2.C
              6800    A RESET   EQU     *
6800 1A       10                SEI
                        *
                        *       INITIALIZE STACK POINTER
                        *
6802 10CE 03FD        A         LDS     #STACK
6806 CE   03FD        A         LDU     #STACK   NOT USED IN SYS 2.C (4/6/82)
6809 20   FE    6809            BRA     *
                        *
                        *       START FOR SYSTEM TEST
                        *
              680B    A START   EQU     *
680B 1A       10                SEI
                        *
                        *       INITIALIZE STACK POINTER
                        *
680D 10CE 03FD        A         LDS     #STACK
6811 CE   03FD        A         LDU     #STACK   NOT USED IN SYS 2.0 (4/6/82)
                        *
                        *       INITIALIZE THE FLAG BYTES
                        *
6814 0F   01          A         CLR     FLAG1
6816 0F   02          A         CLR     FLAG2
6818 0F   03          A         CLR     FLAG3
681A 0F   04          A         CLR     FLAG4
                        *
                        *       CLEAR MEMORY ROUTINE
```

```
1054                               *
1055A 631C 8E   0000      A              LDX    #RAMADR
1056A 631F 108E 0000      A              LDY    #0
1057            6823      A CLRMEM EQU    *
1058A 6823 10AF 61        A              STY    0,X++
1059A 6826 8C   03FF      A              CPX    #MAXRAM
1060A 6829 2B   F8   6823                BMI    CLRMEM
1061                               *
1062                               *     INITIALIZE ALL SYSTEM CONTROL LOAD RELAY STATUS TO SHED
1063                               *
1064A 682B 0F   96        A              CLR    RELMAS
1065A 682D 0F   8C        A              CLR    SRLOAD
1066A 682F 8E   7343      A RLYINT LDX    #STABL"-1
1067A 6832 0C   3C        A              INC    SRLOAD
1068A 6834 D6   8C        A              LDB    SPLOAD
1069A 6836 3A                            ABX
1070A 6837 96   96        A              LDA    RELMAS
1071A 6839 AA   84        A              ORA    0,X
1072A 683B 97   96        A              STA    RELMAS
1073A 683D BD   7493      A              JSR    RLYSHD
1074A 6840 D6   8C        A              LDB    SPLOAD
1075A 6842 C1   08        A              CMPB   #MAXLDS
1076A 6844 2D   E9   682F                BLT    RLYINT    BRANCH IF NOT FINISHED
1077A 6846 96   96        A              LDA    RELMAS    RELAY MASK
1078A 6848 B7   2800      A              STA    RLYPRT    SET RELAY STATUS BITS TO SHED MODE
1079                               *
1080                               *     SET MODE TO USER CONTROL
1081                               *
1082A 684B                               SETFLG USRMOD,FLAG2
    A 684B 34   02        A              PSHS   A
                0000      A              IFEQ   NARG-2
    A 684D 96   02        A              LDAA   FLAG2
    A 684F 8A   40        A              ORA    #USRMOD
    A 6851 97   02        A              STAA   FLAG2
                                         ENDC
                FFFF      A              IFEQ   NARG-3
                                         LDA    FLAG2,
                                         ORA    #USRMOD
                                         STA    FLAG2,
                                         ENDC
    A 6853 35   02        A              PULS   A
1083                               ******************************************
1084                               *
1085                               *     INITIALIZE NON-VOLATILE RAM
1086                               *
1087            0001      A              IFNE   NVFLAG
1088A 6855 B6   1800      A              LDA    RECALL    REQUEST NON-VOLATILE DATA
1089A 6858 86   59        A              LDA    #'Y       NON-VOLATILE MEMORY OK CODE SET
1090A 685A B1   0800      A              CMPA   NVCODE
1091A 685D 26   0F   686E                BNE    INITNV    WRONG CODE - INITIALIZE NV AREA
1092                               *
```

```
                               *       COMPUTE CHECKSUM ON NON-VOLATILE RAM
                               *
635F 8E     0800      A               LDX     #NVCODE   ADDRESS OF NON-VOLATILE RAM AREA
6362 86     21        A               LDA     #NVLEN    LENGTH OF NON-VOLATILE RAM AREA
6964 BD     71AD      A               JSR     CHKSUM
6867 BC     0821      A               CMPX    NVCKSM    MATCH CHECKSUM IN NON-VOLATILE RAM AREA
686A 27.    51   688D                 BEQ     INITN3    YES
686C 86     59        A               LDA     #'Y       NON-VOLATILE MEMORY OK CODE SET
            686E      A  INITNV       EQU     *
686E B7     0800      A               STA     NVCODE    STORE CODE
                                      ENDC
6871 C6     10        A               LDB     #MAXLDS*2
6873 86     02        A               LDA     #2
6875 8E     0801      A               LDX     #SCLOAD
            6878      A  INITNO       EQU     *
6878 A7     30        A               STA     0,X+
687A 5A                               DECB
687B 26     FB   6878                 BNE     INITNO
687D C6     06        A               LDB     #MAXLDS-2
687F 86     01        A               LDA     #1
            6881      A  INITN1       EQU     *
6881 A7     30        A               STA     0,X+
6883 5A                               DECB
6884 26     FB   6881                 BNE     INITN1
                               *
                               *       TURN OFF LAST TWO LOADS
                               *
6886 86     FF        A               LDA     #-1
6888 A7     30        A               STA     0,X+
688A A7     30        A               STA     0,X+
688C 86     18        A               LDA     #24       SETUP FULL SCALE CONSTANT
688E B7     0819      A               STA     FULLSC
6891 8E     5DC0      A               LDX     #24000    SETUP MAXIMUM LIMIT
6894 BF     081A      A               STX     MAXLIM
6897 8E     0021      A               LDX     #33       SETUP EXPONENTIAL FILTER CONSTANTS
689A BF     081C      A               STX     XFCTRS
689D 8E     0008      A               LDX     #8
68A0 BF     081E      A               STX     XFCTRL
68A3 86     3C        A               LDA     #60
68A5 B7     0820      A               STA     TFACTR
                               *
                               *       COMPUTE CHECKSUM ON NON-VOLATILE RAM AREA
                               *
68A8 8E     0800      A               LDX     #NVCODE   ADDRESS OF NON-VOLATILE RAM AREA
68AB 86     21        A               LDA     #NVLEN    LENGTH OF NON-VOLATILE RAM AREA
68AD BD     71AD      A               JSR     CHKSUM
68B0 BF     0821      A               STX     NVCKSM
            0001      A               IFNE    NVFLAG
68B3 86     1000      A               LDA     NVSAVE    ISSUE COMMAND TO SAVE NON-VOLATILE DATA
68B6 8E     05DC      A               LDX     #1500     DELAY FOR 10 MILLISECONDS
            6889      A  INITN2       EQU     *
```

```
1144A 6339 30    1F                 DEX
1145A 633B 26    FC    6889         BNE    INITN2
1146             6880     A INITN3  EQU    *
1147                                ENDC
1148                        ************************************************
1149                        *
1150                        *       INITIALIZE INITIAL PRIORITY FOR LOADS
1151                        *
1152A 683D 0F    05       A          CLR    NBRLDS    CLEAR NUMBER OF ACTIVE LOADS
1153A 683F C6    01       A          LDB    #1
1154A 68C1 8E    0007     A          LDX    #PTNMBR
1155A 68C4 108E  0811     A          LDY    #SCPRTY
1156             68C8     A TBINIT  EQU    *
1157A 68C8 A6    A0       A          LDA    0,Y+      GET LOAD PRIORITY
1158A 68CA 23    04    68D0          BMI    TBINT1    NO LOAD EXISTS
1159A 68CC E7    80       A          STB    0,X+
1160A 68CF 0C    05       A          INC    NBRLDS    INCREMENT NUMBER OF ACTIVE LOADS
1161             68D0     A TBINT1  EQU    *
1162A 68D0 5C                        INCB
1163A 68D1 C1    08       A          CMPB   #MAXLDS
1164A 68D3 23    F3    68C8          BLS    TBINIT
1165                        *
1166                        *       SET PLOP FLAG
1167                        *
1168A 68D5 96    02       A          LDA    FLAG2
1169A 68D7 9A    08       A          ORA    PLOPFG
1170A 68D9 97    02       A          STA    FLAG2
1171                        *
1172                        *       COMPUTE NUMBER OF LOADS PLUS ONE
1173                        *
1174A 68DB 96    05       A          LDA    NBRLDS
1175A 68DD 4C                        INCA
1176A 68DE 97    06       A          STA    NBRPLS
1177                        *
1178                        *       INITIALIZE SECOND AND MINUTE COUNTERS
1179                        *
1180A 68E0 86    01       A          LDA    #1
1181A 68E2 97    57       A          STA    SECNTR
1182A 68E4 97    58       A          STA    MINCTR
1183                        *
1184                        *       INITIALIZE TIMERS
1185                        *
1186             0000     A          IFNE   CERTC
1187                        *
1188                        *       INITIALIZE REAL TIME CALENDAR TIMER
1189                        *
1190                        INRTC   EQU    *
1191                                 LDA A  RTREGA    CHECK UPDATE IN PROGRESS FLAG
1192                                 BMI    INRTC        YES - WAIT
1193                                 CLR    RTREGB    CLEAR RTC REGISTER B
1194                                 SETFLG RTCSET,RTREGB  SET THE RTC SET FLAG
```

```
                              CLRA
                              STA    RTC00          CLEAR SECOND
                              STA    RTC00+1          SECOND ALARM
                              STA    RTC00+2          MINUTE
                              STAA   RTC00+3          MINUTE ALARM
                              INCA                  SET TO ONE
                              STA    RTC00+1          THE SECOND ALARM
                              STA    RTC00+4          THE HOUR
                              STAA   RTC00+5          AND THE HOUR ALARM
                              LDA    #RTCRGA        RTC REG-A INIT VALUE
                              STA    RTREGA
                              SETFLG RTCAIE,RTREGB  SET ALARM INTERRUPT ENABLE FLAG
                              CLRFLG RTCCLR,RTREGB  CLEAR THE RTC SET FLAG
                              ENDC
                          *
                          *   INITIALIZE BYPASS VARIABLES
                          *
 68E6 0F    59     A          CLR    BYPSAV
 68E8 0F    5A     A          CLR    BPCNTR
                          *
                          *   INITIALIZE PLDP INITIAL LOAD #
                          *
 68EA 86    01     A          LDA    #1
 68EC 97    8C     A          STA    SRLOAD
            0001   A          IFNE   CFVTOF
                          *
                          *   INITIALIZE V TO F COUNTERS
                          *
 68EE 8E    FFFF   A          LDX    #$FFFF
 68F1 9F    3F     A          STX    CCUNT1
 68F3 9F    C1     A          STX    CCUNT2
 68F5 86    02     A          LDA    #VTOFMX  SET VTOF COUNTER
 68F7 97    C7     A          STA    VTOFCT
 68F9 35    1E     A          LDA    #MAJSET  SET MAJOR AVERAGE COUNTER
 68FB 97    C5     A          STA    MAJCTR
                              ENDC
            0000   A          IFNE   CFPI
                              CLR    DELTAC
                              CLR    WRAPS     CLEAR WRAP ARROUND COUNTER
                              ENDC
                          *
                          *   INITIALIZE CLIMIT TO DEFAULT VALUE IF NOT SET IN NOVRAM
                          *
 68FD DC    90     A          LDD    CLIMIT
 68FF 26    05  6906          BNE    INITIA   BRANCH IF CLIMIT SET
 6901 8E    5DC0   A          LDX    #24000   DEFAULT VALUE
 6904 9F    90     A          STX    CLIMIT
                          *
                          *   INITIALIZE MAJOR/MINOR AVERAGE TO SETPOINT
                          *
 6906 9E    79     A INITIA   LDX    SETPT
```

```
6908 26     05   690F          BNE    INIT1B    BRANCH IF SETPT SET
690A 8E     5DC0    A          LDX    #24000    DEFAULT VALUE
690D 9F     79      A          STX    SETPT
690F 9F     75      A  INIT1B  STX    MAJAVG
6911 9F     73      A          STX    SHRTAV
            0001    A          IFNE   SMRTPN
                       *
                       *       INITIALIZE COMMUNICATIONS INDICES
                       *
6913 0F     A3      A          CLR    QRYLIX
6915 0F     A4      A          CLR    QRYMOD
                               ENDC
                       *
                       *       INITIALIZE I/O STUFF
                       *
            0000    A          IFNE   XXXXXX
                               IFEQ   DUMPXX
                               LDA    #$24
                               STA    $EC22
                               ENDC
                               ENDC
6917 86     17      A          LDA    #$17
6919 B7     2200    A          STA    ACSTAT
691C 86     15      A          LDAA   #$15      SET ACIA CONTROL BYTE
691E B7     2200    A          STAA   ACSTAT    TO NO OUTPUT INTERRUPT
                       *
                       *       CLEAR THE QUERY BUFFER
                       *
6921 86     0A      A          LDAA   #OUTLEN   LENGTH OF QUERY MESSAGE
6923 8E     0082    A          LDX    #OUTBUF
            6926    A  INIT1   EQU    *
6926 6F     00      A          CLR    0,X+
6928 4A                        DECA
6929 26     FB   6926          BNE    INIT1
                       *
                       *       INITIALIZE TIMER IMAGE BYTES
                       *
692B 86     32      A          LDA    #$32      BAUD RATE TIMER
692D 97     C8      A          STA    IMOCR0
            0001    A          IFNE   CFVTOF
692F 0F     C3      A          CLR    IMICR0    V TO F TIMER
                               ENDC
            0000    A          IFNE   CFPI
                               STA    IMICR0          PI TIMER
                               ENDC
6931 86     A1      A          LDA    #$A1
6933 97     C9      A          STA    IMOCR1    DEADMAN TIMER
6935 97     CC      A          STA    IMICR1    UNDER FREQUENCY TIMER
6937 86     DB      A          LDA    #$DB
6939 97     CA      A          STA    IMOCR2    UTILITY OPEN TIMER
693B 97     CD      A          STA    IMICR2    UTILITY CLOSE TIMER
```

```
                         *
                         *      SETUP UTILITY OPEN TIMER
                         *
6930 7F    2001    A            CLR     TOCR1      SETUP FOR WRITE TO CNTRL REG 3
6940 96    CA      A            LDA     IMOCR2     SETUP CNTRL REG 3
6942 B7    2000    A            STA     TOCR0
6945 8E    FFFF    A            LDX     #$FFFF     SET COUNTER TO MAX
6948 BF    2006    A            STX     TOCR6
                         *
                         *      SETUP BAUD RATE TIMER
                         *
694B 86    01      A            LDA     #1         SETUP FOR WRITE TO CNTRL REG 1
694D B7    2001    A            STA     TOCR1
6950 96    C8      A            LDA     IMOCR0     SETUP BAUDRATE TIMER
6952 B7    2000    A            STA     TOCR0
6955 8E    001A    A            LDX     #BAUD
6958 BF    2002    A            STX     TOCR2
                         *
                         *      SETUP DEADMAN TIMER
                         *
695B 96    C9      A            LDA     IMOCR1
695D B7    2001    A            STA     TOCR1
6960 8E    00F0    A            LDX     #DEADMX
6963 BF    2004    A            STX     TOCR4
                         *
                         *      SETUP UTILITY CLOSE TIMER
                         *
6966 7F    2101    A            CLR     T1CR1      SETUP FOR WRITE TO CNTRL REG 3
6969 96    CD      A            LDA     IM1CR2
696B B7    2100    A            STA     T1CR0
696E 8E    FFFF    A            LDX     #$FFFF
6971 BF    2106    A            STX     T1CR6
           0001    A            IFNE    CFVTOF!+CFPI
                         *
                         *      SETUP V TO F (OR PI) TIMER
                         *
6974 86    01      A            LDA     #1         SETUP TO WRITE CNTRL REG 1
6976 B7    2101    A            STA     T1CR1
6979 96    CB      A            LDA     IM1CR0
697B B7    2100    A            STA     T1CR0
697E 8E    FFFF    A            LDX     #$FFFF     SET TIMER TO MAXIMUM
6981 BF    2102    A            STX     T1CR2
                                ENDC
           0000    A            IFNE    CFRTC
                         *
                         *      SETUP UNDER FREQUENCY TIMER
                         *
                                LDA     IM1CR1
                                STA     T1CR1
                                LDX     #$FFFF
                                STX     T1CR4
```

```
1348                                ENDC
1349                0000     A      IFEQ    CFRTC
1350                         *
1351                         *      SETUP 1 SECOND CLOCK TIMER
1352                         *
1353A 6984 86       F1       A      LDA     #$F1
1354A 6986 B7       2101     A      STA     T1CR1
1355A 6989 8E       0077     A      LDX     #119
1356A 698C BF       2104     A      STX     T1CR4
1357                                ENDC
1358                0000     A      IFNE    XXXXXX
1359                         ****************************************
1360                         *      SETUP DUMMY CLOCK
1361                         ****************************************
1362                                LDA     #36
1363                                STA     CLOCKX
1364                         ****************************************
1365                                IFEQ    DUMPXX
1366                         *****************************************
1367                         *      SETUP COMMUNICATIONS INTERRUPT VECTOR
1368                         *
1369                                LDX     #IRQINT
1370                                STX     $E0C8
1371                         *****************************************
1372                                ENDC
1373                                ENDC
1374                         *
1375                         *      CLEAR INTERRUPT MASK
1376                         *
1377A 698F 1C       AF              CLIF
1378                         *
1379                         * END OF INITIALIZATION ROUTINE
1380                                LIBRY  2:S2IDLE.TXT IDLE LOOP ROUTINE
1382                         * SYSTEM 2.0 - IDLE LOOP
1383                         *                (S2IDLE.TXT)
1384                         *      (TEST ROUTINE FOR NOW)
1385                         *
1386                         ******* DATE LIBRARY CREATED 11/18/81
1387                         ******* DATE LAST MODIFIED 01/04/82
1388                         *
1389                         * IDLE LOOP
1390                         *
1391                6991     A IDLOOP EQU    *
1392                0000     A      IFNE    XXXXXX
1393                         ******************************************************
1394                                JSR     TMRXX      SIMULATED TIMER INTERRUPT ROUTINE
1395                         ******************************************************
1396                                ENDC
1397A 6991                          TSTFLG SECFLG,FLAG1
    A 6991 34       02       A      PSHS    A
    A 6993 86       10       A      LDAA    #SECFLG
```

```
                 0000     A       IFEQ   NARG-2
   A 6995 95     01       A       BITA   FLAG1
                                  ENDC
                 FFFF     A       IFEQ   NARG-3
                                  BIT A  FLAG1,
                                  ENDC
   A 6997 35     02       A       PULS   A
1398A 6999 27    03   699E        BEQ    IDL001   SECOND FLAG NOT SET
1399A 699B BD    6A88     A       JSR    TMRCHK   CALL THE TIMER CHECK ROUTINE
1400                        *
1401                        *     CHECK THE PLDP FLAG
1402                        *
1403             699E     A IDL001 EQU   *
1404             0000     A       IFNE   XXXXXX
1405                              IFNE   DUMPXX
1406                        ******************************************************
1407                              JSR      DMPFLG     DUMP THE FLAGS ROUTINE
1408                        ******************************************************
1409                              ENDC
1410                              ENDC
1411A 699E                        TSTFLG PLDPFG,FLAG2
   A 699E 34     02       A       PSHS   A
   A 69A0 86     08       A       LDAA   #PLDPFG
                 0000     A       IFEQ   NARG-2
   A 69A2 95     02       A       BITA   FLAG2
                                  ENDC
                 FFFF     A       IFEQ   NARG-3
                                  BIT A  FLAG2,
                                  ENDC
   A 69A4 35     02       A       PULS   A
1412A 69A6 27    06   69AE        BEQ    IDL002
1413A 69A8 BD    6B5B     A       JSR    PLDP     CALL THE PLDP ROUTINE
1414A 69AB 7E    6A78     A       JMP    IDL012
1415                        *
1416                        *
1417                        *     CHECK THE INPUT EOF FLAG
1418                        *
1419             69AE     A IDL002 EQU   *
1420A 69AE                        TSTFLG EOFFLG,FLAG1
    A 69AE 34     02       A        PSHS   A
    A 69B0 86     08       A        LDAA   #EOFFLG
                  0000     A        IFEQ   NARG-2
    A 69B2 95     01       A        BITA   FLAG1
                                    ENDC
                  FFFF     A        IFEQ   NARG-3
                                    BIT A  FLAG1,
                                    ENDC
    A 69B4 35     02       A        PULS   A
 1421A 69B6 27    03   69BB         BEQ    IDL003   INPUT EOF FLAG NOT SET
 1422A 69B8 BD    6B34     A        JSR    RSPHND   CALL RESPONSE HANDLING ROUTINE
 1423                        *
```

```
1424                          *       CHECK POWER READING FLAG  ET
1425                          *
1426             698B     A IDL003 EQU     *
1427A 698B                          TSTFLG PWRFLG,FLAG1
      A 698B 34   02       A         PSHS    A
      A 698D 86   04       A         LDAA    #PWRFLG
                  0000     A         IFEQ    NARG-2
      A 698F 95   01       A         BITA .  FLAG1
                                     ENDC
                  FFFF     A         IFEQ    NARG-3
                                     BIT A   FLAG1,
                                     ENDC
      A 69C1 35   02       A         PULS    A
1428A 69C3 27     0D   69D2          BEQ     IDL004    POWER READING FLAG NOT SET
1429A 69C5 BD     6C77     A         JSR     PWRDG     CALL THE POWER READING SUBROUTINE
1430              0000     A         IFNE    XXXXXX
1431                                 IFNE    DUMPXX
1432                          ****************************************************************
1433                                 JSR .   DMPDLC      CALL THE DUMP DELTA C ROUTINE
1434                          ****************************************************************
1435                                 ENDC
1436                                 ENDC
1437                          *
1438                          *       CLEAR THE POWER READING FLAG
1439                          *
1440A 69C8                            CLRFLG PWRCLR,FLAG1
      A 69C8 34   02       A         PSHS    A
                  0000     A         IFEQ    NARG-2
      A 69CA 96   01       A         LDAA    FLAG1
      A 69CC 84   FB       A         ANDA    #PWRCLR
      A 69CE 97   01       A         STAA    FLAG1
                                     ENDC
                  FFFF     A         IFEQ    NARG-3
                                     LDA     FLAG1,
                                     ANDA    #PWRCLR
                                     STA     FLAG1,
                                     ENDC
      A 69D0 35   02       A         PULS    A
1441                          *
1442                          *       CHECK THE PANEL QUERY FLAG SET
1443                          *
1444             69D2     A IDL004 EQU     *
1445A 69D2                          TSTFLG QRYFLG,FLAG1
      A 69D2 34   02       A         PSHS    A
      A 69D4 86   20       A         LDAA    #QRYFLG
                  0000     A         IFEQ    NARG-2
      A 69D6 95   01       A         BITA    FLAG1
                                     ENDC
                  FFFF     A         IFEQ    NARG-3
                                     BIT A   FLAG1,
                                     ENDC
```

```
     A 69D8 35    02       A          PULS   A
1446A 69DA 27    0D    69E9          BEQ    IDL005   PANEL QUERY FLAG NOT SET
1447A 69DC BD    6CF2     A          JSR    PNLQRY   CALL THE PANEL QUERY ROUTINE
1448                          *
1449                          *       CLEAR THE PANEL QUERY FLAG
1450                          *
1451A 69DF                           CLRFLG QRYCLR,FLAG1
     A 69DF 34    02       A          PSHS   A
                  0000     A          IFEQ   NARG-2
     A 69E1 96    01       A          LDAA   FLAG1
     A 69E3 84    DF       A          ANDA   #QRYCLR
     A 69E5 97    01       A          STAA   FLAG1
                                      ENDC
                  FFFF     A          IFEQ   NARG-3
                                      LDA    FLAG1,
                                      ANDA   #QRYCLR
                                      STA    FLAG1,
                                      ENDC
     A 69E7 35    02       A          PULS   A
1452                          *
1453                          *       CHECK THE UNDERFREQUENCY FLAG SET
1454                          *
1455              69E9     A IDL005  EQU    *
1456              0001     A          IFNE   CFUNDR
1457A 69E9                           TSTFLG UNDFLG,FLAG1
     A 69E9 34    02       A          PSHS   A
     A 69EB 86    40       A          LDAA   #UNDFLG
                  0000     A          IFEQ   NARG-2
     A 69ED 95    01       A          BITA   FLAG1
                                      ENDC
                  FFFF     A          IFEQ   NARG-3
                                      BIT A  FLAG1,
                                      ENDC
     A 69EF 35    02       A          PULS   A
1458A 69F1 27    06    69F9          BEQ    IDL006   UNDERFREQUENCY FLAG NOT SET
1459A 69F3 BD    6DAC     A          JSR    SHDALL   CALL THE SHED ALL ROUTINE
1460A 69F6 7E    6A78     A          JMP    IDL012
1461                                 ENDC
1462                          *
1463                          *       CHECK THE PRIORITY UPDATE FLAG SET
1464                          *
1465              69F9     A IDL006  EQU    *
1466A 69F9                           TSTFLG PUPFLG,FLAG1
     A 69F9 34    02       A          PSHS   A
     A 69FB 86    80       A          LDAA   #PUPFLG
                  0000     A          IFEQ   NARG-2
     A 69FD 95    01       A          BITA   FLAG1
                                      ENDC
                  FFFF     A          IFEQ   NARG-3
                                      BIT A  FLAG1,
                                      ENDC
```

```
     A 69FF 35    02        A         PULS   A
14674 6A01 27     0D   6A10           BEQ    IDL007   PRIORITY UPDATE FLAG NOT SET
14684 6A03 BD     5DF2      A         JSR    PTBLUP   CALL THE PRIORITY TABLE UPDATE ROUTINE
1469                            *
1470                            *     CLEAR THE PRIORITY UPDATE FLAG
1471                            *
1472A 6A06                            CLRFLG PUPCLR,FLAG1
     A 6A06 34    02        A         PSHS   A
                  0000      A         IFEQ   NARG-2
     A 6A08 96    01        A         LDAA   FLAG1
     A 6A0A 84    7F        A         ANDA   #PUPCLR
     A 6A0C 97    01        A         STAA   FLAG1
                                      ENDC
                  FFFF      A         IFEQ   NARG-3
                                      LDA    FLAG1,
                                      ANDA   #PUPCLR
                                      STA    FLAG1,
                                      ENDC
     A 6A0E 35    02        A         PULS   A
1473                            *
1474                            *     CHECK THE LOAD TIMER CHECK FLAG
1475                            *
1476              6A10      A IDL007 EQU    *
1477A 6A10                            TSTFLG LDTFLG,FLAG2
     A 6A10 34    02        A         PSHS   A
     A 6A12 86    01        A         LDAA   #LDTFLG
                  0000      A         IFEQ   NARG-2
     A 6A14 95    02        A         BITA   FLAG2
                                      ENDC
                  FFFF      A         IFEQ   NARG-3
                                      BIT A  FLAG2,
                                      ENDC
     A 6A16 35    02        A         PULS   A
1478A 6A18 27     0D   6A27           BEQ    IDL008   LOAD TIMER CHECK FLAG NOT SET
1479A 6A1A BD     6E99      A         JSR    LDTMCK   CALL THE LOAD TIMER CHECK ROUTINE
1480                            *
1481                            *     CLEAR THE LOAD TIMER CHECK FLAG
1482                            *
1483A 6A1D                            CLRFLG LDTCLR,FLAG2
     A 6A1D 34    02        A         PSHS   A
                  0000      A         IFEQ   NARG-2
     A 6A1F 96    02        A         LDAA   FLAG2
     A 6A21 84    FE        A         ANDA   #LDTCLR
     A 6A23 97    02        A         STAA   FLAG2
                                      ENDC
                  FFFF      A         IFEQ   NARG-3
                                      LDA    FLAG2,
                                      ANDA   #LDTCLR
                                      STA    FLAG2,
                                      ENDC
     A 6A25 35    02        A         PULS   A
```

```
1484                             *
1485                             *       CHECK THE SHED/RESTORE FLAG
1486                             *
1487               6A27     A IDL008 EQU     *
1488A 6A27                           TSTFLG SRTFLG,FLAG2
    A 6A27 34      02       A        PSHS    A
    A 6A29 86      02       A        LDAA    #SRTFLG
                   0000     A        IFEQ    NARG-2
    A 6A2B 95      02       A        BITA    FLAG2
                                     ENDC
                   FFFF     A        IFEQ    NARG-3
                                     BIT A   FLAG2,
                                     ENDC
    A 6A2D 35      02       A        PULS    A
1489A 6A2F 27      0D   6A3E         BEQ     IDL009   SHED/RESTORE FLAG NOT SET
1490A 6A31 BD      6F3E     A        JSR     SHDRST   CALL THE SHED/RESTORE ROUTINE
1491                             *
1492                             *       CLEAR THE SHED/RESTORE FLAG
1493                             *
1494A 6A34                           CLRFLG SRTCLR,FLAG2
    A 6A34 34      02       A        PSHS    A
                   0000     A        IFEQ    NARG-2
    A 6A36 96      02       A        LDAA    FLAG2
    A 6A38 84      FD       A        ANDA    #SRTCLR
    A 6A3A 97      02       A        STAA    FLAG2
                                     ENDC
                   FFFF     A        IFEQ    NARG-3
                                     LDA     FLAG2,
                                     ANDA    #SRTCLR
                                     STA     FLAG2,
                                     ENDC
    A 6A3C 35      02       A        PULS    A
1495                             *
1496                             *       CHECK FOR NON-VOLATILE RAM AREA CHECKSUM FLAG SET
1497                             *
1498               6A3E     A IDL009 EQU     *
1499A 6A3E                           TSTFLG NVKFLG,FLAG4
    A 6A3E 34      02       A        PSHS    A
    A 6A40 86      10       A        LDAA    #NVKFLG
                   0000     A        IFEQ    NARG-2
    A 6A42 95      04       A        BITA    FLAG4
                                     ENDC
                   FFFF     A        IFEQ    NARG-3
                                     BIT A   FLAG4,
                                     ENDC
    A 6A44 35      02       A        PULS    A
1500A 6A46 27      1A   6A62         BEQ     IDL011   NOT SET
1501A 6A48 8E      0800     A        LDX     #NVCODE  ADDRESS OF NON-VOLATILE RAM AREA
1502A 6A4B 86      21       A        LDA     #NVLEN   LENGTH OF NON-VOLATILE RAM AREA
1503A 6A4D BD      71AD     A        JSR     CHKSUM
1504A 6A50 BC      0821     A        CPX     NVCKSM   CHECKSUM'S MATCH
```

```
1505A 6A53 27    03   6A58          BEQ    IDL010    YES
1506A 6A55 B6    1800    A          LDA    RECALL    RECALL NON-VOLATILE DATA
1507             6A53    A IDL010 EQU    *
1508A 6A58                          CLRFLG NVKCLR,FLAG4
    A 6A58 34    02      A          PSHS   A
                 0000    A          IFEQ   NARG-2
    A 6A5A 96    04      A          LDAA   FLAG4
    A 6A5C 84    EF      A          ANDA   #NVKCLR
    A 6A5E 97    04      A          STAA   FLAG4
                                    ENDC
                 FFFF    A          IFEQ   NARG-3
                                    LDA    FLAG4,
                                    ANDA   #NVKCLR
                                    STA    FLAG4,
                                    ENDC
    A 6A60 35    02      A          PULS   A
1509                     *
1510                     *          CHECK I/O TIMEOUT COUNTER
1511                     *
1512             6A62    A IDL011 EQU    *
1513A 6A62 0D    A1      A          TST    IOTMOT    TIMEOUT COUNTER NOT ACTIVE
1514A 6A64 2B    12   6A78          BMI    IDL012    YES
1515A 6A66 0A    A1      A          DEC    IOTMOT    DECREMENT COUNTER
1516A 6A68 26    0E   6A78          BNE    IDL012    COUNTER NOT ZERO YET
1517                     *
1518                     *          CHECK NO ANSWER COUNT
1519                     *
1520
1521A 6A6A 0A    A2      A          DEC    NOANSW
1522A 6A6C 26    0A   6A78          BNE    IDL012    NO ANSWER COUNT NOT ZERO
1523                     *
1524                     *          SET NO QUERY FLAG
1525                     *
1526A 6A6E                          SETFLG NOQURY,FLAG2
    A 6A6E 34    02      A          PSHS   A
                 0000    A          IFEQ   NARG-2
    A 6A70 96    02      A          LDAA   FLAG2
    A 6A72 8A    20      A          ORA    #NOQURY
    A 6A74 97    02      A          STAA   FLAG2
                                    ENDC
                 FFFF    A          IFEQ   NARG-3
                                    LDA    FLAG2,
                                    ORA    #NOQURY
                                    STA    FLAG2,
                                    ENDC
    A 6A76 35    02      A          PULS   A
1527                     *
1528                     *          CALL THE UTILITY OVERRIDE ROUTINE
1529                     *
1530             6A78    A IDL012 EQU    *
1531A 6A78 BD    71AC    A          JSR    UTLOVR    UTILITY OVERRIDE ROUTINE
```

```
1532              0000   A        IFNE   CFPI
1533                     *
1534                     *
1535                     *        CHECK FOR PI MEASUREMENT FLAG SET
1536                     *
1537                              TSTFLG PIMFLG,FLAG4
1538                              BNE    IDLEND
1539                              JSR    PIMSMT    PI MEASUREMENT ROUTINE
1540                              CLRFLG PIMCLR,FLAG4
1541                              ENDC
1542                     *        SET DEADMAN TIMER FLAG
1543                     *
1544              6A7B   A IDLEND EQU    *
1545A 6A7B                        SETFLG DEADFG,FLAG2
    A 6A7B 34     02     A        PSHS   A
                  0000   A        IFEQ   NARG-2
    A 6A7D 96     02     A        LDAA   FLAG2
    A 6A7F 8A     10     A        ORA    #DEADFG
    A 6A81 97     02     A        STAA   FLAG2
                                  ENDC
                  FFFF   A        IFEQ   NARG-3
                                  LDA    FLAG2,
                                  ORA    #DEADFG
                                  STA    FLAG2,
                                  ENDC
    A 6A83 35     02     A        PULS   A
1546A 6A85 7E     6991   A        JMP    IDLOOP
1547                     *** END
1548                              LIBRY  2:S2TMR.TXT TIMER CHECK ROUTINE
1550                     * SYSTEM 2.0 - TIMER CHECK ROUTINE
1551                     *               (S2TMR.TXT)
1552                     *
1553                     *
1554                     ******* DATE LIBRARY CREATED 11/18/81
1555                     ******* DATE LAST MODIFIED 04/20/82
1556                     *
1557                     *  TIMER CHECK ROUTINE
1558                     *
1559              6A88   A TMRCHK EQU    *
1560A 6A88 96     57     A        LDAA   SECNTR    GET THE SECOND COUNTER
1561A 6A8A 81     01     A        CMPA   #1        SECOND = 1
1562A 6A8C 26     00  6A8E        BNE    TMRCK3    NO
1563              0001   A        IFEQ   CFVTOF
1564                     *
1565                     *        SET THE MAJOR AVERAGE FLAG
1566                     *
1567                              SETFLG MAVFLG,FLAG2
1568                     *
1569                     *        SET THE POWER READING FLAG
1570                     *
1571                     TMRCK1 EQU    *
```

```
                                     SETFLG PWRFLG,FLAG1
                                     BRA    TMRCKX
                                     IFEQ   CFPI
                             *
                             *       SECOND COUNTER = 16, 31 OR 46
                             *
                             TMRCK3  EQU    *
                                     CMP A  #16
                                     BEQ    TMRCK1
                                     CMP A  #31
                                     BEQ    TMRCK1
                                     CMP A  #46
                                     BEQ    TMRCK1
                                     ENDC
                                     ENDC
                  0001     A         IFNE   CFVTOF!+CFPI
                  6A8E     A TMRCK3  EQU    *
                                     ENDC
                             *
                             *       SECOND COUNTER = 3
                             *
A  6A8E 81        03       A         CMPA   #3
A  6A90 25        33   6AC5          BNE    TMRCK4    NO
                             *
                             *       SET THE PRIORITY TABLE UPDATE FLAG
                             *
A  6A92                              SETFLG PUPFLG,FLAG1
   A 6A92 36      02       A         PSHS   A
                  0000     A         IFEQ   NARG-2
   A 6A94 96      01       A         LDAA   FLAG1
   A 6A96 8A      80       A         ORA    #PUPFLG
   A 6A98 97      01       A         STAA   FLAG1
                                     ENDC
                  FFFF     A         IFEQ   NARG-3
                                     LDA    FLAG1,
                                     ORA    #PUPFLG
                                     STA    FLAG1,
                                     ENDC
   A 6A9A 35      02       A         PULS   A
                  6A9C     A TMRCKX  EQU    *
                  0001     A         IFNE   CFVTOF
                             *
                             *       CHECK VTOF COUNTER
                             *
A  6A9C 0A        C7       A         DEC    VTOFCT
A  6A9E 26        1A   6ABA          BNE    TMCKX1    NOT ZERO YET
A  6AA0 86        02       A         LDA    #VTOFMX   RESET COUNTER
A  6AA2 97        C7       A         STA    VTOFCT
                             *
                             *       UPDATE COUNTERS
                             *
```

```
1611A 6AA4 9F    3F     A        LDX    CCUNT1
1612A 6AA6 9F    C1     A        STX    CCUNT2
1613A 6AA8 B6    2101   A        LDA    T1CR1     READ STATUS BYTE
1614A 6AAB BE    2102   A        LDX    T1CR2     READ TIMER
1615A 6AAE 9F    3F     A        STX    CCUNT1
1616                           *
1617                           *        SET POWER READING FLAG
1618                           *
1619A 6A30                              SETFLG PWRFLG,FLAG1
    A 6A30 34    02     A        PSHS   A
                 0000   A        IFEQ   NARG-2
    A 6A32 96    01     A        LDAA   FLAG1
    A 6A34 8A    04     A        ORA    #PWRFLG
    A 6A36 97    01     A        STAA   FLAG1
                                 ENDC
                 FFFF   A        IFEQ   NARG-3
                                 LDA    FLAG1,
                                 ORA    #PWRFLG
                                 STA    FLAG1,
                                 ENDC
    A 6A38 35    02     A        PULS   A
1620                             ENDC
1621             0000   A        IFNE   CFPI
1622                           *
1623                           *        CHECK FOR PI TIMER WRAP ARROUND
1624                           *
1625                             TST    T1CR2   TEST PI TIMER
1626                             BGE    TMCKX0
1627                             TSTFLG RAPFLG,FLAG4  WRAP ARROUND FLAG SET
1628                             BEQ    TMCKX1           NO
1629                             INC    WRAPS   INCREMENT WRAP ARROUND COUNTER
1630                             CLRFLG RAPCLR,FLAG4  CLEAR THE WRAP ARROUND FLAG
1631                             BRA    TMCKX1
1632                    TMCKX0 EQU    *
1633                             SETFLG RAPFLG,FLAG4  SET THE WRAP ARROUND FLAG
1634                             ENDC
1635             6A3A   A TMCKX1 EQU    *
1636                           *
1637                           *        CLEAR THE SECOND FLAG
1638                           *
1639A 6A3A                              CLRFLG SECCLR,FLAG1
    A 6A3A 34    02     A        PSHS   A
                 0000   A        IFEQ   NARG-2
    A 6A3C 96    01     A        LDAA   FLAG1
    A 6A3E 84    BF     A        ANDA   #SECCLR
    A 6A40 97    01     A        STAA   FLAG1
                                 ENDC
                 FFFF   A        IFEQ   NARG-3
                                 LDA    FLAG1,
                                 ANDA   #SECCLR
                                 STA    FLAG1,
```

```
                                        ENDC
A 6AC2 35   02       A                  PULS   A
A 6AC4 39                               RTS
                       *
                       *                SECOND COUNTER = 4
                       *
            6AC5     A TMRCK4           EQU    *
A 6AC5 81   04       A                  CMPA   #4
A 6AC7 26   0C   6AD5                   BNE    TMRCK5   NO
                       *
                       *                SET THE SHED-RESTORE FLAG
                       *
A 6AC9                                  SETFLG SRTFLG,FLAG2
A 6AC9 34   02       A                  PSHS   A
            0000     A                  IFEQ   NARG-2
A 6ACB 96   02       A                  LDAA   FLAG2
A 6ACD 8A   02       A                  ORA    #SRTFLG
A 6ACF 97   02       A                  STAA   FLAG2
                                        ENDC
            FFFF     A                  IFEQ   NARG-3
                                        LDA    FLAG2,
                                        ORA    #SRTFLG
                                        STA    FLAG2,
                                        ENDC
A 6AD1 35   02       A                  PULS   A
A 6AD3 20   C7   6A9C                   BRA    TMRCKX
                       *
                       *                SECOND COUNTER = 6
                       *
            6AD5     A TMRCK5           EQU    *
A 6AD5 81   06       A                  CMPA   #6
A 6AD7 26   0C   6AE5                   BNE    TMRCK6   NO
                       *
                       *                SET THE LOAD TIMER CHECK FLAG
                       *
A 6AD9                                  SETFLG LDTFLG,FLAG2
A 6AD9 34   02       A                  PSHS   A
            0000     A                  IFEQ   NARG-2
A 6ADB 96   02       A                  LDAA   FLAG2
A 6ADD 8A   01       A                  ORA    #LDTFLG
A 6ADF 97   02       A                  STAA   FLAG2
                                        ENDC
            FFFF     A                  IFEQ   NARG-3
                                        LDA    FLAG2,
                                        ORA    #LDTFLG
                                        STA    FLAG2,
                                        ENDC
A 6AE1 35   02       A                  PULS   A
A 6AE3 20   37   6A9C                   BRA    TMRCKX
            0001     A                  IFNE   CFACIA
                       *
```

```
1665                         *      SECOND COUNTER = TIME FOR QUERY
1666                         *
1667              6AE5     A TMRCK6 EQU    *
1668A 6AE5 81     05       A        CMPA   #5
1669A 6AE7 27     24   680D         BEQ    TMRCK7    YES
1670A 6AE9 81     0B       A        CMPA   #11
1671A 6AEB 27     20   680D         BEQ    TMRCK7    YES
1672A 6AED 81     11       A        CMPA   #17
1673A 6AEF 27     1C   680D         BEQ    TMRCK7    YES
1674A 6AF1 81     16       A        CMPA   #22       OFFSET TO BYPASS COUNTER
1675A 6AF3 27     18   680D         BEQ    TMRCK7    YES
1676A 6AF5 81     1D       A        CMPA   #29
1677A 6AF7 27     14   680D         BEQ    TMRCK7    YES
1678A 6AF9 81     23       A        CMPA   #35
1679A 6AFB 27     10   680D         BEQ    TMRCK7    YES
1680A 6AFD 81     29       A        CMPA   #41
1681A 6AFF 27     0C   680D         BEQ    TMRCK7    YES
1682A 6B01 81     2F       A        CMPA   #47
1683A 6B03 27     08   680D         BEQ    TMRCK7    YES
1684A 6B05 81     35       A        CMPA   #53
1685A 6B07 27     04   680D         BEQ    TMRCK7    YES
1686A 6B09 81     3C       A        CMPA   #60
1687A 6B0B 26     19   6B26         BNE    TMRCK8    NO
1688                         *
1689                         *      SET THE REMOTE PANEL QUERY FLAG
1690                         *
1691              680D     A TMRCK7 EQU    *
1692                         *
1693                         *      TEST THE NO QUERY FLAG
1694                         *
1695A 680D                          TSTFLG NOQURY,FLAG2
    A 680D 34     02       A        PSHS   A
    A 680F 86     20       A        LDAA   #NOQURY
                  0000     A        IFEQ   NARG-2
    A 6811 95     02       A        BITA   FLAG2
                                    ENDC
                  FFFF     A        IFEQ   NARG-3
                                    BIT A  FLAG2,
                                    ENDC
    A 6813 35     02       A        PULS   A
---> Warning #1    about following line.
1696A 6815 1026 FF33 6A9C           LBNE   TMRCKX
1697A 6319                          SETFLG QRYFLG,FLAG1
    A 6319 34     02       A        PSHS   A
                  0000     A        IFEQ   NARG-2
    A 631B 96     01       A        LDAA   FLAG1
    A 631D 8A     20       A        ORA    #QRYFLG
    A 631F 97     01       A        STAA   FLAG1
                                    ENDC
                  FFFF     A        IFEQ   NARG-3
                                    LDA    FLAG1,
```

```
                                    ORA     #ORYFLG
                                    STA     FLAG1,
                                    ENDC
  A 6321 35   02        A           PULS    A
A   6323 16   FF76 6A9C             LBRA    TMRCKX
                                    ENDC
              0001      A           IFEQ    CFACIA
                          TMRCK6    EQU     *
                                    ENDC
                          *
                          *         SECOND COUNTER = 23
              6326      A TMRCK3    EQU     *
A   6326 81   17        A           CMPA    #23
A   6328 26   2E   6859             BNE     TMRC11    NO
                          *
                          *         DECREMENT THE BYPASS COUNTER
                          *
A   682A 0D   59        A           TST     BYPSAV    ANY LOADS ON BYPASS
A   632C 26   03   6831             BNE     TMRC10    YES
              682E      A TMRCK9    EQU     *
A   682E 7E   6A9C      A           JMP     TMRCKX
              6831      A TMRC10    EQU     *
A   6331 0A   5A        A           DEC     BPCNTR    DECREMENT THE BYPASS COUNTER
A   6833 26   F9   682E             BNE     TMRCK9    STILL NON-ZERO
                          *
                          *         TAKE LOAD OFF BYPASS
                          *
A   6335 D6   59        A           LDAB    BYPSAV
A   6337 3E   002E      A           LDX     #LTSTAT-1 ADDR OF LOAD TABLE
A   683A 3A                         ABX
A   683B A6   84        A           LDAA    0,X       LOAD STATUS BYTE
A   6330 84   3F        A           ANDA    #LDCBYP   BYPASS FLAG TO OFF
A   633F A7   84        A           STAA    0,X
A   6841                            TSTFLG  LDSTMR,X
  A 6341 34   02        A           PSHS    A
  A 6043 36   20        A           LDAA    #LDSTMR
              0000      A           IFEQ    NARG-2
  A 6345 A5   84        A           BITA    X
                                    ENDC
              FFFF      A           IFEQ    NARG-3
                                    BIT A   X,
                                    ENDC
  A 6347 35   02        A           PULS    A
A   6849 26   06   6851             BNE     TMRC12    BRANCH IF TIMER STILL ACTIVE
A   684B A6   84        A           LDA     0,X
A   684D 84   7F        A           ANDA    #LDCCNC   SET TC NO CONTROL
A   684F A7   84        A           STA     0,X
A   6851 0F   59        A TMRC12    CLR     BYPSAV    CLEAR BYPASS LOAD INDICATOR
A   6853 0F   5A        A           CLR     BPCNTR    CLEAR BYPASS COUNTER
A   6855 7E   6A9C      A           JMP     TMRCKX
                          *
```

```
1736                            *       SECOND CCUNTER = 58
1737                            *
1738             6B58     A TMRC11 EQU     *
1739A 6358 81    3A       A        CMPA    #58
1740A 685A 1026 FF3E 6A9C          LBNE    TMRCKX    NO
1741                            *
1742                            *       SET CHECK NON-VOLATILE RAM AREA CHECKSUM FLAG
1743                            *
1744A 635E                             SETFLG NVKFLG,FLAG4
    A 635E 34    02       A            PSHS    A
                 0000     A            IFEQ    NARG-2
    A 6360 96    04       A            LDAA    FLAG4
    A 6362 8A    10       A            ORA     #NVKFLG
    A 6364 97    04       A            STAA    FLAG4
                                       ENDC
                 FFFF     A            IFEQ    NARG-3
                                       LDA     FLAG4,
                                       ORA     #NVKFLG
                                       STA     FLAG4,
                                       ENDC
    A 6366 35    02       A            PULS    A
1745A 6868 7E    6A9C     A            JMP     TMRCKX
1746                            *** END OF TIMER CHECK ROUTINE
1747             0000     A            IFNE    XXXXXX
1748                                    LIBRY  1:S2XXXX.TXT    SIMULATION ROUTINES
1749                                    ENDC
1750                                   LIBRY  2:S2PLDP.TXT PLDP ROUTINE
1752                            *
1753                            * SYSTEM 2.0 - PLDP CPEAK LOAD DEFERMENT ROUTINE
1754                            *               (S2PLDP.TXT)
1755                            *
1756                            ************** DATE CREATED 12/4/81
1757                            ************** DATE LAST MOTIFIED 02/17/82
1758                            *
1759             6868     A PLDP   EQU     *
1760                            *  IS IT TIME TO PERFORM A PLDP FUNCTION
1761A 686B 96    57       A        LDA     SECNTR
1762A 686D 81    06       A        CMPA    #PLDPOF
1763A 686F 27    01   6872         BEQ     PLDP1     BRANCH IF TIME FOR PLDP FUNCTION
1764A 6371 39                      RTS
1765                            * CAN A LOAD BE RESTORED
1766A 6372 DC    79       A PLDP1  LDD     SETPT
1767A 6374 93    75       A        SUBD    MAJAVG    IS MAJOR AVERAGE >= THRESHOLD?
1768A 6376 2F    31   63A9         BLE     PLDP5     YES, BRANCH
1769                            * SHOULD LOAD BE RESTORED?
1770A 6078 8E    0808     A        LDX     #SCFTMR-1
1771A 637B D6    8C       A        LDB     SRLOAD
1772A 637D 3A                      ABX
1773A 687E A6    84       A        LDA     0,X
1774A 6880 26    22   68A4         BNE     PLDP4     BRANCH IF LOAD IS A TIMED SHED LOAD
1775                            * IS PRESENT LOAD # A BYPASS #
```

```
1776A 6B82 96    8C          A          LDAA    SRLOAD
1777A 6B84 91    59          A          CMPA    BYPSAV
1778A 6B86 26    10    6B98             BNE     PLDP2     BRANCH IF NOT A BYPASS #
1779                           *RESTORE LOAD & SET CORRECT FLAGS
1780A 6B88 8E    002E        A          LDX     #LTSTAT-1
1781A 6B8B D6    8C          A          LDB     SRLOAD
1782A 6B8D 3A                           ABX
1783A 6B8E A6    84          A          LDA     0,X
1784A 6B90 8A    40          A          ORA     #LDSBYP   SET BYPASS FLAG
1785A 6B92 A7    84          A          STA     0,X
1786                           * SET ON TIME FOR BYPASS # TIMER COUNT
1787A 6B94 86    3C          A          LDA     #BYPCNT
1788A 6B96 97    5A          A          STA     BPCNTR
1789                           *RESTORE LOAD
1790A 6B98 BD    74D3        A PLDP2    JSR     RLYRST
1791                           * SET LOAD # POINTER TO NEXT LOAD #
1792A 6B9B 0C    8C          A PLDP3    INC     SRLOAD
1793A 6B9D 96    8C          A          LDAA    SRLOAD
1794A 6B9F 91    95          A          CMPA    NBRLDS
1795A 6BA1 2E    06    6BA9             BGT     PLDP5     BRANCH IF FINISHED CHECKING LOAD
1796A 6BA3 39                           RTS
1797                           * SHED LOAD ON TIMER
1798A 6BA4 BD    7019        A PLDP4    JSR     LDSHED
1799A 6BA7 20    F2    6B9B             BRA     PLDP3     CONTINUE PLDP
1800                           * CLEAR PLDP FLAG
1801A 6BA9                     PLDP5    CLRFLG  PLDPCL,FLAG2
    A 6BA9 34    02          A          PSHS    A
                 0000        A          IFEQ    NARG-2
    A 6BAB 96    02          A          LDAA    FLAG2
    A 6BAD 84    F7          A          ANDA    #PLDPCL
    A 6BAF 97    02          A          STAA    FLAG2
                                        ENDC
                 FFFF        A          IFEQ    NARG-3
                                        LDA     FLAG2,
                                        ANDA    #PLDPCL
                                        STA     FLAG2,
                                        ENDC
    A 6BB1 35    02          A          PULS    A
1802A 6BB3 39                           RTS
1803                           *** END OF PLDP ROUTINE
1804                                    LIBRY   2:S2RESP.TXT RESPONSE HANDLING ROUTINE
1806                           * SYSTEM 2.C - RESPONSE HANDLING ROUTINE
1807                           *                (S2RESP.TXT)
1808                           *
1809                           *****DATE LIBRARY CREATED 11/18/81
1810                           *****DATE LAST MODIFIED 04/22/82
1811                           *
1812                           *      RESPONSE HANDLING ROUTINE
1813                           *
1814             6BB4        A RSPHND EQU     *
1815                           *
```

```
                                 *        CLEAR INPUT EOF FLAG
                                 *
A 6BB4                                   CLRFLG EOFCLR,FLAG1
  A 6BB4 34     02        A              PSHS   A
                0000      A              IFEQ   NARG-2
  A 6BB6 96     01        A              LDAA   FLAG1
  A 6BB8 84     F7        A              ANDA   #EOFCLR
  A 6BBA 97     01        A              STAA   FLAG1
                                         ENDC
                FFFF      A              IFEQ   NARG-3
                                         LDA    FLAG1,
                                         ANDA   #EOFCLR
                                         STA    FLAG1,
                                         ENDC
  A 6BBC 35     02        A              PULS   A
                0000      A              IFEQ   BASPNL
                                 *
                                 *        SMART PANELS
                                 *
A 6BBE 8E      00A7      A              LDX    #INBUF     ADDR OF INPUT BUFFER
A 6BC1 86      0A        A              LDA    #INLEN     LENGTH OF INPUT MESSAGE
A 6BC3 BD      71AD      A              JSR    CHKSUM
A 6BC6 108E    00A7      A              LDY    #INBUF
A 6BCA AC      28        A              CMPX   QRYCKS,Y   CHECKSUMS MATCH
A 6BCC 27      01        6BCF           BEQ    RESPO2     YES
               6BCE      A RESPO1       EQU    *
A 6BCE 39                               RTS               RETURN
               6BCF      A RESPO2       EQU    *
A 6BCF EC      A4        A              LDD    0,Y        GET FAMILY CODE AND DEVICE CODE
A 6BD1 81      46        A              CMPA   #FMCODE
A 6BD3 26      F9        6BCE           BNE    RESPO1     FAMILY CODES - NO MATCH
A 6BD5 C1      43        A              CMPB   #DVCCTL
A 6BD7 26      F5        6BCE           BNE    RESPO1     DEVICE CODES - NO MATCH
                                 *
                                 *        SET I/O TIME OUT COUNTER AND NO ANSWER COUNTER INACTIVE
                                 *
A 6BD9 86      77        A              LDA    #$77
A 6BDB 97      A1        A              STA    IOTMOT
A 6BDD 97      A2        A              STA    NOANSW
                                 *
                                 *        GET OPCODE FROM RESPONSE MESSAGE
                                 *
A 6BDF A6      22        A              LDA    QRYOPC,Y
A 6BE1 27      EB        6BCE           BEQ    RESPO1     NO OPERATION
A 6BE3 81      F1        A              CMPA   #OPCDUP    CHECK FOR DATA UPDATE OPCODE
A 6BE5 26      E7        6BCE           BNE    RESPO1     NO
                                 *
                                 *        RETRIEVE SET POINT
                                 *
A 6BE7 30      23        A              LEAX   RSPSET,Y
                                 *
```

```
                              *       CHECK TO SEE IF SET POINT WAS SENT
                              *
6BE9 EC   84          A              LDD    0,X
6BEB 10B3 2020        A              CMPD   #$2020
6BEF 27   28     6C19                BEQ    RESP6A    BRANCH IF SET POINT NOT SENT
6BF1 BD   7286        A              JSR    DTOBIN    *CONVERT TO BINARY
                              *
                              *       SETPOINT IN BUFFER SAME AS OLD ONE
                              *
6BF4 10B3 8E          A              CMPD   USRSET
6BF7 27   17     6C10                BEQ    RESP05    *SAME
                              *
                              *       NEW USER SETPOINT
                              *
6BF9 DD   8E          A              STD    USRSET
6BFB                                 TSTFLG USRMOD,FLAG2 *MODE = USER CONTROL
A 6BFB 34 02          A              PSHS   A
A 6BFD 86 40          A              LDAA   #USRMOD
          0000        A              IFEQ   NARG-2
A 6BFF 95 02          A              BITA   FLAG2
                                     ENDC
          FFFF        A              IFEQ   NARG-3
                                     BIT A  FLAG2,
                                     ENDC
A 6C01 35 02          A              PULS   A
6C03 27   0B     6C10                BEQ    RESP05
                              *
                              *       CHECK USER SETPOINT < MAXLIM
                              *
6C05 10B3 081A        A              CMPD   MAXLIM
6C09 2F   0C     6C17                BLE    RESP06    MAXLIM GREATER
6C0B FC   081A        A              LDD    MAXLIM
6C0E 20   07     6C17                BRA    RESP06
                              *
                              *       CHECK USER SETPOINT < CLIMIT
                              *
          6C10        A RESP05 EQU   *
6C10 10B3 90          A              CMPD   CLIMIT
6C13 2F   02     6C17                BLE    RESP06    CLIMIT GREATER
6C15 DC   90          A              LDD    CLIMIT
          6C17        A RESP06 EQU   *
6C17 DD   79          A              STD    SETPT
                              *
                              *
                              *       GET BYPASS INDICATOR FROM RESPONSE MSG
                              *
6C19 A6   25          A RESP6A LDA   RSPBP,Y
6C1B 81   20          A              CMPA   #'        BYPASS IND=NULL
6C1D 27   09     6C28                BEQ    RESP07    YES
6C1F 80   30          A              SUBA   #'0       CONVERT TO BINARY
6C21 91   59          A              CMPA   BYPSAV
```

```
1897A 6C23 27    03    6C28          BEQ     RESP07    SAME AS OLD
1898                          *
1899                          *        CALL THE BYPASS SETUP SUBROUTINE
1900                          *
1901A 6C25 BD    741C     A          JSR     BYPRTN
1902                          *
1903                          *        RETRIEVE PEAK AVERAGE RESET INDICATOR
1904                          *
1905             6C28     A RESP07  EQU     *
1906A 6C28 A6    26       A          LDA     RSPPKR,Y
1907A 6C2A 81    55       A          CMPA    #RSETPK   RESET PEAK
1908A 6C2C 26    04    6C32          BNE     RESP08    NO
1909                          *
1910                          *        CLEAR THE PEAK AVERAGE HOLD AREA
1911                          *
1912A 6C2E 0F    77       A          CLR     PEAKAV
1913A 6C30 0F    78       A          CLR     PEAKAV+1
1914             6C32     A RESP08  EQU     *
1915A 6C32 39                        RTS               RETURN
1916                          *
1917                          *        CHECK FOR RAW DATA REQUEST
1918
1919                          *
1920             6C33     A RESP10  EQU     *
1921A 6C33 81    A0       A          CMPA    #OPCSPR   REQUEST FOR DATA (SINGLE PRECISION)
1922A 6C35 26    06    6C3D          BNE     RESP11    NO
1923A 6C37 C6    01       A          LDB     #1        SET LENGTH INDICATOR = ONE
1924A 6C39 D7    A5       A          STB     LENHLD
1925A 6C3B 20    08    6C45          BRA     RESP12
1926             6C3D     A RESP11  EQU     *
1927A 6C3D 81    A1       A          CMPA    #OPCDPR   REQUEST FOR DATA (DOUBLE PRECISION)
1928A 6C3F 26    18    6C59          BNE     RESP13    NO
1929A 6C41 C6    02       A          LDB     #2        SET LENGTH INDICATOR = TWO
1930A 6C43 D7    A5       A          STB     LENHLD
1931             6C45     A RESP12  EQU     *
1932A 6C45 C6    01       A          LDB     #1
1933A 6C47 30    23       A          LEAX    RSPADR,Y ADDR OF ADDR FIELD
1934A 6C49 BD    7238     A          JSR     DATADC    DATA DECODE ROUTINE
1935A 6C4C DD    A6       A          STD     ADDRHD    SAVE ADDR IN HOLD
1936                          *
1937                          *        SET DATA REQUEST FLAG
1938                          *
1939A 6C4E                           SETFLG DRQFLG,FLAG3
    A 6C4E 34    02       A          PSHS    A
                 0000     A          IFEQ    NARG-2
    A 6C50 96    03       A          LDAA    FLAG3
    A 6C52 8A    01       A          ORA     #DRQFLG
    A 6C54 97    03       A          STAA    FLAG3
                                     ENDC
                 FFFF     A          IFEQ    NARG-3
                                     LDA     FLAG3,
```

```
                                   ORA     #ORQFLG
                                   STA     FLAG3,
                                   ENDC
     A 6C56 35    02        A      PULS    A
 1940A 6C58 39                     RTS               RETURN
 1941                       *
 1942                       *        CHECK FOR RAM DATA UPDATE
 1943                       *
 1944              6C59     A RESP13 EQU   *
 1945A 6C59 81     A2       A      CMPA    #OPCXFR   DATA TRANSFER (FROM CPM)
 1946A 6C5B 27     01   6C5F       BEQ     RESP14    YES
 1947                       *
 1948                       *        UNRECOGNIZABLE OP CODE
 1949                       *
 1950A 6C5D 39                     RTS               RETURN
 1951                       *
 1952                       *        DECODE DATA ADDRESS
 1953                       *
 1954              6C5E     A RESP14 EQU   *
 1955A 6C5E C6     01       A      LDB     #1        TWO BYTE RESULT
 1956A 6C60 30     23       A      LEAX    RSPADR,Y  ADDR OF ADDR FIELD
 1957A 6C62 BD     723B     A      JSR     DATADC    DECODE DATA ADDR
 1958A 6C65 DD     A6       A      STD     ADDRHD    SAVE ADDR
 1959A 6C67 1083   03FF     A      CMPD    #MAXRAM   VALID RAM ADDRESS
 1960A 6C6B 2F     01   6C6E       BLE     RESP15    YES
 1961                       *
 1962                       *        INVALID RAM ADDR
 1963                       *
 1964A 6C6D 39                     RTS               RETURN
 1965                       *
 1966                       *        SETUP TO GET DATA
 1967                       *
 1968              6C6E     A RESP15 EQU   *
 1969A 6C6E 5F                     CLRB              ONE BYTE RESULT
 1970A 6C6F BD     723B     A      JSR     DATADC    DECODE DATA
 1971                       *
 1972                       *        UPDATE MEMORY
 1973                       *
 1974A 6C72 9E     A6       A      LDX     ADDRHD
 1975A 6C74 A7     84       A      STA     0,X
 1976A 6C76 39                     RTS
 1977                              ENDC
 1978              0000     A      IFNE    BASPNL
 1979                       *
 1980                       *        TEST 'ENTER' BUTTON SET
 1981                       *
 1982                                TSTFLG     ENTRFG,FLAG3
 1983                                BEQ        RESP21        NOT SET
 1984                       *
 1985                       *        TEST 'ENTER' MODE FLAG SET
 1986                       *
```

```
                TSTFLG    EMODON,FLAG3
                BNE       RESP20          ALREADY IN 'ENTER'MODE
*
*               SET ENTER MODE ON
*
                SETFLG    EMODON,FLAG3
*
*               INITIALIZE ENTER COUNTER
*
                LDA       #3
                STA       ENTRCT
*
*               GET BYPASS LOAD NUMBER
*
RESP20          EQU       *
                LDA       BPHOLD          NEW BYPASS LOAD
                CMPA      BPLOLD          SAME AS OLD ONE
                BEQ       RESP24            YES
*
*               MOVE NEW BYPASS LOAD TO OLD ONE
*
                STA       BPLOLD
*
*               GET NEW SET POINT
*
                LDA       STPHLD
                BRA       RESP22
*
*               CLEAR ENTER AND BLINK MODES
*
RESP21          EQU       *
                CLRFLG    EMODFF,FLAG3      ENTER MODE OFF
                CLRFLG    BLNKCL,FLAG3      BLINK MODE OFF
*
*               GET THE SET POINT DATA
*
                LDA       STPHLD
                CMPA      STPOLD            SAME AS OLD ONE
                BEQ       RESP26              YES
*
*               MORE NEW SET POINT TO OLD ONE
*
RESP22          EQU       *
                STA       STPOLD
*
*               RESET 'ENTER' COUNTER
*
                LDA       #3
                STA       ENTRCT
*
```

```
*         SET THE QUERY FLAG
*
RESP23    EQU        *
          SETFLG     QRYFLG,FLAG1
          RTS
*
*         DECREMENT ENTER COUNTER
*
RESP24    EQU        *
          DEC        ENTRCT
          BNE        RESP23          COUNTER NOT ZERO
*
*         CALL THE BYPASS SETUP ROUTINE
*
          LDA        BPLDLD
          JSR        BYPRTN
*
*         SCALE THE NEW SET POINT
*
          LDB        STPOLD          SET POINT HOLD
          LDA        #250
          MUL
          ASLD
          ASLD
          CMPD       USRSET          NEW SETPOINT SAME AS USER SETPT
          BEQ        RESP26            YES
*
*         SAVE AS NEW USE SET POINT
*
          STD        USRSET
          TSTFLG     USRMOD,FLAG2     MODE = USER CONTROL
          BEQ        RESP26             YES
*
*         CHECK USER SET-POINT < CLIMIT
*
          CMPD       CLIMIT
          BGE        RESP25          CLIMIT GREATER
          LDD        CLIMIT
RESP25    EQU        *
          STD        SETPT           SET INTO EFFECTIVE SET POINT
RESP26    EQU        *
          RTS                        RETURN
          ENDC
* END OF RESPONSE HANDLING ROUTINE
      LIBRY  2:S2PWRD.TXT POWER READ ROUTINE
*  SYSTEM 2.0 - POWER READ ROUTINE
*             (S2PWRD.TXT)
*
*
******* DATE LIBRARY CREATED 11/18/81
```

```
                             ******* DATE LAST MODIFIED 02/18/82
                             *
                             *       POWER READING SUBROUTINE
                             *
               6C77     A PWRDG   EQU    *
               0001     A         IFNE   CFVTOF
                             *
                             *       POWER READING SUBROUTINE (V TO F)
                             *
      6C77 CC    C1       A         LDD    CCUNT2    COUNT 2 < COUNT 1
      6C79 1093  BF       A         CMPD   CCUNT1
      6C7C 24    09  6C87           BCC    PWRDG1
                             *
                             *       COUNTER FLIPPED (CCUNT 1 > COUNT 2)
                             *
      6C7E CC    FFFF     A         LDD    #65535
      6C81 93    BF       A         SUBD   CCUNT1
      6C83 D3    C1       A         ADDD   CCUNT2
      6C85 20    02  6C89           BRA    PWRDG2
                             *
                             *       COMPULE DELTA C
                             *
               6C87     A PWRDG1  EQU    *
      6C87 93    BF       A         SUBD   CCUNT1
               6C89     A PWRDG2  EQU    *
      6C89 DD    C3       A         STD    DELTAC    SAVE DELTA C
      6C8B 44    56                 LSRD
      6C8D DD    92       A         STD    NOWRDG    SAVE CURRENT READING
                             *
                             *       IF STARTUP SET SHORT AVERAGE TO INITIAL READING
                             *
      6C8F                          TSTFLG STRTUP,FLAG4
    A 6C8F 34    02       A         PSHS   A
    A 6C91 86    80       A         LDAA   #STRTUP
                 0000     A         IFEQ   NARG-2
    A 6C93 95    04       A         BITA   FLAG4
                                    ENDC
                 FFFF     A         IFEQ   NARG-3
                                    BIT A  FLAG4,
                                    ENDC
    A 6C95 35    02       A         PULS   A
      6C97 26    0C  6CA5           BNE    PWRDG3
      6C99 DD    73       A         STD    SHRTAV
                             *
                             *       SET STARTUP FLAG TO NOT STARTUP
                             *
      6C9B                          SETFLG STRTUP,FLAG4
    A 6C9B 34    02       A         PSHS   A
                 0000     A         IFEQ   NARG-2
    A 6C9D 96    04       A         LDAA   FLAG4
    A 6C9F 8A    80       A         ORA    #STRTUP
    A 6CA1 97    04       A         STAA   FLAG4
```

```
                        ENDC
          FFFF     A           IFEQ   NARG-3
                               LDA    FLAG4,
                               ORA    #STPTUP
                               STA    FLAG4,
                               ENDC
    A 6CA3 35   02     A       PULS   A
2126            6CA5   A PWRDG3 EQU   *
2127A 6CA5 1F   01     A       TFR    D,X
2128A 6CA7 DC   73     A       LDD    SHRTAV   LOAD SHORT AVERAGE
2129A 6CA9 108E 081C   A       LDY    XFCTRS   EXPONENTIAL FACTOR (SHORT AVERAGE)
2130A 6CAD BD   7258   A       JSR    XPFLTR   EXPONENTIAL FILTER ROUTINE
2131A 6CB0 DD   73     A       STD    SHRTAV   STORE RESULT IN SHORT AVERAGE
2132                       *
2133                       *     DECREMENT MAJOR AVERAGE COUNTER
2134                       *
2135A 6CB2 0A   C5     A       DEC    MAJCTR
2136A 6CB4 27   0B  6CC1       BEQ    PWRDG4   COUNTER = ZERO
2137A 6CB6                     TSTFLG SSDFLG,FLAG4 SECOND TIME THRU SHED FLAG SET
    A 6CB6 34   02     A       PSHS   A
    A 6CB8 36   01     A       LDAA   #SSDFLG
                0000   A       IFEQ   NARG-2
    A 6CBA 95   04     A       BITA   FLAG4
                               ENDC
                FFFF   A       IFEQ   NARG-3
                               BIT A  FLAG4,
                               ENDC
    A 6CBC 35   02     A       PULS   A
2138A 6CBE 26   1C  6CDC       BNE    PWRDG5          YES
2139A 6CC0 39                  RTS                    RETURN
2140                       *
2141                       *     COMPUTE MAJOR AVERAGE
2142                       *
2143            6CC1   A PWRDG4 EQU   *
2144A 6CC1 9E   73     A       LDX    SHRTAV   SHORT AVERAGE
2145A 6CC3 DC   75     A       LDD    MAJAVG   MAJOR AVERAGE
2146A 6CC5 108E 081E   A       LDY    XFCTRL   EXPONENTIAL FILTER FACTOR (LONG AVERAGE)
2147A 6CC9 BD   7258   A       JSR    XPFLTR   CALL EXPONENTIAL FILTER ROUTINE
2148A 6CCC DD   75     A       STD    MAJAVG   STORE RESULT IN MAJOR AVERAGE
2149                       *
2150                       *     CHECK FOR NEW PEAK AVERAGE
2151                       *
2152A 6CCE 1093 77     A       CMPD   PEAKAV
2153A 6CD1 23   02  6CD5       BLS    PWRD4A   NOT HIGHER THAN CURRENT PEAK
2154A 6CD3 DD   77     A       STD    PEAKAV
2155            6CD5   A PWRD4A EQU   *
2156                       *
2157                       *     RESET MAJOR AVERAGE COUNTER
2158                       *
2159A 6CD5 86   1E     A       LDA    #MAJSET
2160A 6CD7 97   C5     A       STA    MAJCTR
```

```
                 0001     A         IFNE   STEONE
                          *
                          *      SEND DATA TO STE-1
                          *
      6C09 PD    7515     A         JSR    STECOM
                                    ENDC
                 0001     A         IFNE   XXXXXX
                                     IFNE       DUMPXX
                          ************************************
                          *      DISPLAY MAJOR AND MINOR AVERAGE
                          *
                                     JSR        DMPAVG
                          ************************************
                                     ENDC
                                     ENDC
                                    ENDC
                 0000     A         IFNE   CEPI
                          *
                          *      POWER READ ROUTINE FOR PULSE INITIATOR
                          *
                          *      COMPUTE MAJOR AVERAGE
                          *
                                     LDX        SHRTAV          SHORT AVERAGE
                                     LDD        MAJAVG          MAJOR AVERAGE
                                     LDY        XFCTRL          EXPONENTIAL FILTER FACTOR (LONG AVERAGE)
                                     JSR        XPFLTR          CALL EXPONENTIAL FILTER ROUTINE
                                     STD        MAJAVG          STORE RESULT IN MAJOR AVERAGE
                          *
                          *      CHECK FOR NEW PEAK AVERAGE
                          *
                                     CMPD       PEAKAV
                                     BLS        PWRD4A          NOT HIGHER THAN CURRENT PEAK
                                     STD        PEAKAV
                          PWRD4A     EQU        *
                                     IFNE       STEONE
                          *
                          *      SEND DATA TO STE-1
                          *
                                     JSR        STECOM
                                     ENDC
                                     IFNE       XXXXXX
                                     IFNE       DUMPXX
                          ************************************
                          *      DISPLAY MAJOR AND MINOR AVERAGE
                          *
                                     JSR        DMPAVG
                          ************************************
                                     ENDC
                                     ENDC
                                     ENDC
                          *
```

```
2212                        *       TEST SECOND TIME THRU SWITCHES
2213                        *
2214            6CDC      A PWRDG5 EQU    *
2215A 6CDC                         TSTFLG SSDFLG,FLAG4
    A 6CDC 34   02        A        PSHS   A
    A 6CDE 86   01        A        LDAA   #SSDFLG
                0000      A        IFEQ   NARG-2
    A 6CE0 95   04        A        BITA   FLAG4
                                   ENDC
                FFFF      A        IFEQ   NARG-3
                                   BIT A  FLAG4,
                                   ENDC
    A 6CE2 35   02        A        PULS   A
2216A 6CE4 26   01   6CE7          BNE    PWRDG6
2217A 6CE6 39                      RTS
2218                        *
2219                        *       SET SHED/RESTORE FLAG
2220                        *
2221            6CE7      A PWRDG6 EQU    *
2222A 6CE7                         SETFLG SPTFLG,FLAG2
    A 6CE7 34   02        A        PSHS   A
                0000      A        IFEQ   NARG-2
    A 6CE9 96   02        A        LDAA   FLAG2
    A 6CEB 8A   02        A        ORA    #SRTFLG
    A 6CED 97   02        A        STAA   FLAG2
                                   ENDC
                FFFF      A        IFEQ   NARG-3
                                   LDA    FLAG2,
                                   ORA    #SRTFLG
                                   STA    FLAG2,
                                   ENDC
    A 6CEF 35   02        A        PULS   A
2223A 6CF1 39                      RTS
2224                        * END OF POWER READING SUBROUTINE
2225                               LIBRY  2:S2PQRY.TXT PANEL QUERY ROUTINE
2227                        * SYSTEM 2.0 - PANEL QUERY ROUTINE
2228                        *              (S2PQRY.TXT)
2229                        *
2230                        *
2231                        ******* DATE LIBRARY CREATED 11/18/81
2232                        ******* DATE LAST MODIFIED 02/17/82
2233                        *
2234                        *      PANEL QUERY ROUTINE
2235                        *
2236            6CF2      A PNLQRY EQU    *
2237            0001      A        IFEQ   SMRTPN
2238                               TSTFLG PNLXT1,BITSWS
2239                               BEQ    SNDQY0
2240                        *
2241                        *      SEND QUERY TO MONITOR
2242                        *
```

```
                         SNDMNO EQU    *
                                LDX    #OUTBUF     ADDR OF QUERY MESSAGE BUFFER
                                INX
                                STX    OUTIX
                                LDA A  #OUTLEN-1  LENGTH OF QUERY MESSAGE
                                STA A  OUTCTR
                                LDA A  #$35        ENABLE OUTPUT INTERRUPTS
                                STA A  ACSTAT
                                LDA A  QRYFC       OUTPUT FAMILY CODE
                                JSR    OUTCH
                                RTS
                                ENDC
          0000      A           IFNE   BASPNL
                         *
                         *      BASIC PANEL OUTPUT ROUTINE
                         *
                         *      SEND STATUS BYTE TO CONTROL PANEL
                         *
                         SNDQY0 EQU    *
                                LDX    #LTSTAT
                                LDA A  #1
                         SNDQY1 EQU    *
                                LDA B  0,X+         GET SHED/RESTORE STATUS
                                ROR B
                                ROL A
                                BLC    SNDQY1
                                STA      QRYMSG     SAVE IN QUERY MESSAGE
                         *
                         *      TEST BLINK ALARM LIGHT MODE SET
                         *
                                TSTFLG   BLNKSW,FLAG3
                                BEQ      SNDQY4     NOT SET
                         *
                         *      TEST BLINK STATE = ALARM LIGHT ON
                         *
                         SNDQY2 EQU      *
                                TSTFLG   BLKTGL,FLAG3
                                BEQ      SNDQY3      NOT ON
                         *
                         *      BLINK STATE TO OFF
                         *
                                CLRFLG   BLKOFF,FLAG3
                                BRA      SNDQY7
                         *
                         *      BLINK STATE TO ON
                         *
                         SNDQY3 EQU      *
                                SETFLG   BLKTGL,FLAG3
                                BRA      SNDQY5
                         *
                         *      TEST ALARM FLAG SET
```

```
                          *
                          SNDQY4 EQU      *
                                 TSTFLG   ALRMIN,FLAG3
                                 BEQ      SNDQY6      ALARM NOT SET
                          *
                          *      SET ALARM BIT IN QUERY BUFFER
                          *
                          SNDQY5 EQU      *
                                 SETFLG   SHEX40,QRYMSG
                                 BRA      SNDQY8
                          *
                          *      TEST 'OVER SETPOINT IN PAST' FLAG SET
                          *
                          SNDQY6 EQU      *
                                 TSTFLG   OVRPST,FLAG3
                                 BNE      SNDQY4        OVER SETPT INPAST
                          *
                          *      CLEAR ALARM LIGHT BIT IN QUERY MESSAGE BYTE
                          *
                          SNDQY7 EQU      *
                                 CLRFLG   RHEX40,QRYMSG
                          *
                          *      RESTORE QUERY MESSAGE BYTE
                          *
                          SNDQY8 EQU      *
                                 LDA      QRYMSG
                          *
                          *      CALL TRANSMIT ROUTINE
                          *
                                 JSR    OUTCH
                          *
                          *      ALLOW RECEIVE DATA INTERRUPTS
                          *
                                 LDA A  #$95
                                 STA A  ACSTAT
                                 RTS
                                 ENDC
                0001     A       IFNE   SMRTPN
                          *
                          *      SMART PANEL QUERY ROUTINE
                          *        FOR HI-TECH AND MID-RANGE PANELS
                          *
                6CF2     A SQSMTP EQU   *
 6CF2 108E      0052     A       LDY    #QRYMSG  ADDR OF QUERY MESSAGE BUFFER
                          *
                          *      TEST DATA REQUESTED FLAG SET
                          *
 6CF6                            TSTFLG DRQFLG,FLAG3
A 6CF6 34       02       A       PSHS   A
A 6CF8 86       01       A       LDAA   #DRQFLG
```

```
                    0000     A          IFEQ    NARG-2
       1 6CFA 95    03       A          BITA    FLAG3
                                        ENDC
                    FFFF     A          IFEQ    NARG-3
                                        BIT A   FLAG3,
                                        ENDC
       A 6CFC 35    02       A          PULS    A
2343                0000     A          IFEQ    XXXXXX
2344A 6CFE 1026 0092 6D84               LBNE    SQSM10   DATA REQUESTED FLAG IS SET
2345                                    ENDC
2346                0000     A          IFNE    XXXXXX
2347                                    LBNE    SQSM10     DATA REQUESTED FLAG IS SET
2348                                    ENDC
2349                             *
2350                             *      FAMILY CODE TO BUFFER
2351                             *
2352A 6D02 C6       46       A          LDB     #FMCODE
2353A 6D04 E7       A4       A          STB     QRYFC,Y
2354                             *
2355                             *      DEVICE CODE TO BUFFER
2356                             *
2357A 6D06 C6       50       A          LDB     #DVCPNL
2358A 6D08 E7       21       A          STB     QRYDC,Y
2359                             *
2360                             *      INCREMENT THE QUERY LOAD IX
2361                             *
2362A 6D0A D6       A3       A          LDB     QRYLIX
2363A 6D0C 5C                           INCB
2364A 6D0D C1       08       A          CMPB    #MAXLDS  GREATER THAN MAX NMBR LOADS
2365A 6D0F 2F       02  6D13            BLE     SQSM01   NO
2366A 6D11 C6       01       A          LDB     #1
2367                6D13     A SQSM01   EQU     *
2368A 6D13 1F       98       A          TFR     B,A
2369A 6D15 8B       30       A          ADDA    #'0      CONVERT TO ASCII
2370A 6D17 A7       23       A          STA     QRYLDN,Y STORE IN QUERY MSG BUFFER
2371A 6D19 D7       A3       A          STB     QRYLIX
2372                             *
2373                             *      LOAD NUMBER AND STATUS TO QUERY MESSAGE
2374                             *        STATUS CODES
2375                             *          'A' = ALLOWED
2376                             *          'I' = INHIBITED
2377                             *          'B' = ON BYPASS
2378                             *          'X' = NON-EXISTENT LOAD
2379                             *
2380A 6D1B 8E       0310     A          LDX     #SCPRTY-1
2381A 6D1E 3A                           ABX
2382A 6D1F 6D       84       A          TST     0,X      TEST FOR ACTIVE LOAD
2383A 6D21 2A       04  6D27            BPL     SQSM1A   YES - LOAD IS ACTIVE
2384A 6D23 C6       58       A          LDB     #'X      NON-EXISTENT LOAD
2385A 6D25 20       16  6D3D            BRA     SQSM1C
2386                6D27     A SQSM1A   EQU     *
```

```
6027 8E   002E    A          LDX    #LTSTAT-1
602A 3A                      ABX
602B A6   84      A          LDA    0,X       GET LOAD STATUS FROM LOAD TABLE
602D C6   41      A          LDB    #'A
602F 85   40      A          BITA   #LDSBYP   BYPASS ON STATUS SET
6031 27   04   6037          BEQ    SQSM1B    NO
6033 C6   42      A          LDB    #'B       SET BYPASS CODE IN ASCII
6035 20   06   603D          BRA    SQSM1C
          6037    A SQSM1B   EQU    *
6037 84   01      A          ANDA   #LDSSR
6039 27   02   603D          BEQ    SQSM1C    STATUS IS ALLOWED
603B C6   49      A          LDB    #'I       SET STATUS TO INHIBITED
          603D    A SQSM1C   EQU    *
603D E7   24      A          STB    QRYSTC,Y STORE IN QUERY MSG BUFFER
                    *
                    *        MOVE QUERY CODE TO MESSAGE (OP CODE)
                    *
603F D6   A4      A          LDB    QRYMOD
6041 5C                      INCB
6042 C1   04      A          CMPB   #4        GREATER THAN MAX MODE
6044 2F   02   6048          BLE    SQSM02    NO
6046 C6   01      A          LDB    #1
          6048    A SQSM02   EQU    *
6048 1F   98      A          TFR    B,A
604A 8B   30      A          ADDA   #'0       CONVERT OPCODE TO ASCII
604C A7   22      A          STA    QRYOPC,Y STORE OPCODE IN QUERY MSG BUFFER
604E D7   A4      A          STB    QRYMOD
                    *
                    *        DATA ITEM TO MESSAGE BUFFER
                    *
6050 5A                      DECB
6051 58                      ASLB
6052 8E   0073    A          LDX    #SHRTAV   GET SHORT AVERAGE, MAJ AVERAGE OR PEAK
6055 3A                      ABX
6056 EC   84      A          LDD    0,X
6058 8E   005C    A          LDX    #WRKBF
605B BD   71FC    A          JSR    CVBTD     BINARY TO DECIMAL ASCII
605E DC   5C      A          LDD    WRKBF
6060 ED   25      A          STD    QRYDAT,Y STORE IN QUERY MESSAGE BUFFER
6062 96   5E      A          LDA    WRKBF+2
6064 A7   27      A          STA    QRYDAT+2,Y
                    *
                    *        COMPUTE THE CHECKSUM
                    *
          6066    A SQSM03   EQU    *
6066 86   0A      A          LDA    #OUTLEN
6068 8E   0032    A          LDX    #QRYMSG
606B BD   71AD    A          JSR    CHKSUM
606E AF   28      A          STY    QRYCKS,Y STORE CHECKSUM IN MESSAGE BUFFER
                    *
```

```
                          *        SETUP TO TRANSMIT QUERY MESSAGE
                          *
6D70 31    21        A             LEAY    1,Y
6D72 109F  BD        A             STY     OUTIX     STORE MESSAGE INDEX
6D75 86    09        A             LDA     #OUTLEN-1
6D77 97    BC        A             STA     OUTCTR    MESSAGE LENGTH - 1
                          *
                          *        TRANSMIT FIRST BYTE OF QUERY MESSAGE
                          *
           0000      A             IFNE    XXXXXX
                                   IFNE    DUMPXX
                          ***********************************************
                                   JSR     DMPMSG
                                   RTS
                          ***********************************************
                                   ENDC
                                   ENDC
6D79 96    82        A             LDA     QRYMSG
6D7B BD    71ED      A             JSR     OUTCH
6D7E 86    35        A             LDA     #$35      INABLE OUTPUT INTERRUPTS
6D80 B7    2200      A             STA     ACSTAT
6D83 39                            RTS
                          *
                          *        SEND REQUESTED DATA TO CONTROL PANEL
                          *
           6D84      A    SQSM10   EQU     *
6D84 9E    46        A             LDX     ADDRHD
6D86 E6    81        A             LDB     0,X++
6D88 BD    72A7      A             JSR     BINHEX    CONVERT DATA TO HEX ASCII
6D8B ED    23        A             STD     QRYDXF,Y  STORE IN MESSAGE BUFFER
6D8D 0A    A5        A             DEC     LENHLD    ONE OR TWO BYTES LONG
6D8F 27    0B   6D9C               BEQ     SQSM11    ONE
6D91 E6    34        A             LDB     0,X
6D93 BD    72A7      A             JSR     BINHEX
6D96 ED    25        A             STD     QRYDXF+2,Y
6D98 86    81        A             LDA     #$81      LMM TO CPM DATA TRANSFER OPCODE
6D9A 20    02   6D9E               BRA     SQSM12
           6D9C      A    SQSM11   EQU     *
6D9C 86    B0        A             LDA     #$B0
           6D9E      A    SQSM12   EQU     *
6D9E A7    22        A             STA     QRYOPC,Y
                          *
                          *        CLEAR DATA TRANSFER REQUESTED FLAG
                          *
6DA0                               CLRFLG  DRQCLR,FLAG3
 A 6DA0 34  02       A             PSHS    A
            0000     A             IFEQ    NARG-2
 A 6DA2 96  03       A             LDAA    FLAG3
 A 6DA4 84  FE       A             ANDA    #DRQCLR
 A 6DA6 97  03       A             STAA    FLAG3
                                   ENDC
```

```
              FFFF     A          IFEQ    NARG-3
                                  LDA     FLAG3,
                                  ANDA    #DRSCLR
                                  STA     FLAG3,
                                  ENDC
    A 6DA8 35   02     A          PULS    A
2482A 6DAA 20   8A   6D66         BRA     SCSM03
2483                              ENDC
2484                     * END OF PANEL QUERY ROUTINE
2485                              LIBRY  2:S2SALL.TXT SHED ALL ROUTINE
2486                     *
2488                     *SYSTEM 2.0 - SHDALL - SHED ALL LOAD ROUTINE
2489                     *                (S2SALL.TXT)
2490                     *
2491                     *************DATE CREATED: 12/15/81
2492                     *************DATE LAST MODIFIED: 02/17/82
2493                     *
2494                     *FOR UNDER FREQUENCY DETECTION
2495          6DAC     A SHDALL EQU    *
2496                     *ALL LOADS SHED CHECK
2497A 6DAC 0F   8C     A          CLR     SRLOAD
2498A 6DAE 0C   8C     A          INC     SRLOAD
2499A 6DB0 8E   002F   A          LDX     #LTSTAT
2500A 6DB3               SHAL1    TSTBIT  LDSSR,SRLOAD,X
    A 6DB3 D6   8C     A          LDB     SRLOAD
    A 6DB5 3A                     ABX
    A 6DB6 86   01     A          LDAA    #LDSSR
    A 6DB8 A5   84     A          BITA    0,X
2501A 6DBA 27   08   6DC4         BEQ     SHAL1A   BRANCH IF LOAD IS RESTORED
2502A 6DBC 0C   8C     A          INC     SRLOAD
2503A 6DBE 96   8C     A          LDA     SRLOAD
2504A 6DC0 91   35     A          CMPA    NBRLDS
2505A 6DC2 2F   EF   6DB3         BLE     SHAL1    BRANCH IF MORE LOADS TO CHECK
2506                     *SHED LOADS THAT ARE RESTORED
2507A 6DC4 D6   06     A SHAL1A   LDB     NBRPLS   NUMBER OF LOADS PLUS ONE
2508A 6DC6 D7   5F     A          STB     TEMP1
2509A 6DC8 8E   0006   A SHAL2    LDX     #PTNMBR-1
2510A 6DCB 0A   5F     A          DEC     TEMP1
2511A 6DCD 27   18   6DE7         BEQ     SHAL4    BRANCH IF FINISH
2512A 6DCF D6   5F     A SHAL3    LDB     TEMP1
2513A 6DD1 3A                     ABX
2514A 6DD2 E6   84     A          LDB     0,X      GET PRESENT PRIORITY LD#
2515A 6DD4 D7   8C     A          STB     SRLOAD
2516A 6DD6 8E   002E   A          LDX     #LTSTAT-1
2517A 6DD9                        TSTBIT  LDSSR,SRLOAD,X
    A 6DD9 D6   8C     A          LDB     SRLOAD
    A 6DDB 3A                     ABX
    A 6DDC 86   01     A          LDAA    #LDSSR
    A 6DDE A5   84     A          BITA    0,X
2518A 6DE0 26   E6   6DC8         BNE     SHAL2    BRANCH IF ALREADY SHED
2519A 6DE2 BD   7493   A          JSR     RLYSHD   SHED LOAD
```

```
2520A 6DE5 20     F1    6DC8          BRA    SHAL2     CONTINUE
2521                              *SET SYSTEM NO-CONTROL MODE FLAG
2522A 6DE7                        SHAL4   SETFLG SYSFLG,FLAG4
    A 6DE7 34     02        A             PSHS   A
                  0000      A             IFEQ   NARG-2
    A 6DE9 96     04        A             LDAA   FLAG4
    A 6DEB 8A     04        A             ORA    #SYSFLG
    A 6DED 97     04        A             STAA   FLAG4
                                          ENDC
                  FFFF      A             IFEQ   NARG-3
                                          LDA    FLAG4,
                                          ORA    #SYSFLG
                                          STA    FLAG4,
                                          ENDC
    A 6DEF 35     02        A             PULS   A
2523A 6DF1 39                             RTS
2524                              ** END OF SHED ALL SUBROUTINE
2525                                      LIBRY  2:S2PTUP.TXT PRIORITY TABLE UPDATE ROUTINE
2527                              *
2528                              *SYSTEM 2.0 - PTBLUP - PRIOIRTY TABLE UPDATE REOUTINE
2529                              *                (S2PTUP.TXT)
2530                              **************DATE CREATED: 12/15/81
2531                              **************DATE LAST MODIFIED: 02/17/82
2532                              *
2533              6DF2      A PTBLUP  EQU    *
2534A 6DF2 D6     06        A             LDB    NBRPLS    NUMBER OF LOADS PLUS ONE
2535A 6DF4 D7     8C        A             STB    SRLOAD
2536A 6DF6 0A     8C        A PRTBP1  DEC    SRLOAD
2537A 6DF8 27     40    6E3A              BEQ    PRTBP3    BRANCH IF FINISHED CHECKING LOADS
2538A 6DFA 8E     0810      A             LDX    #LTPRTY-1
2539A 6DFD D6     8C        A             LDB    SRLOAD
2540A 6DFF 3A                             ABX
2541A 6E00 0F     5F        A             CLR    TEMP1
2542A 6E02 A6     84        A             LDA    0,X       GET PRIOIRTY VALUE
2543A 6E04 97     60        A             STA    TEMP2
2544A 6E06 8E     002E      A             LDX    #LTSTAT-1
2545A 6E09                                TSTBIT LDSSR,SRLOAD,X
    A 6E09 D6     8C        A             LDB    SRLOAD
    A 6E0B 3A                             ABX
    A 6E0C 86     01        A             LDAA   #LDSSR
    A 6E0E A5     84        A             BITA   0,X
2546A 6E10 27     14    6E26              BEQ    PRTBP2    BRANCH IF LOAD IS RESTORED
2547                              *FOR SHED TYPE LOAD ADD PRIORITY VALUE TO ACC WT TABLE
2548A 6E12 8E     000D      A             LDX    #PTACCV-2
2549A 6E15 D6     8C        A             LDB    SRLOAD
2550A 6E17 58                             LSLB             TIMES TWO
2551A 6E18 3A                             ABX
2552A 6E19 EC     84        A             LDD    0,X
2553A 6E1B D3     5F        A             ADDD   TEMP1
2554A 6E1D 28     03    6E22              BVC    PRTB1A    BRANCH IF OK VALUE
```

```
6E1F CC      7FFF      A         LDD     #$7FFF     SET TO MAX VALUE
6E22 ED      84        A PRTB1A  STD     0,X        UPDATE ACC WT TABLE
6E24 20      D0   6DF6           BRA     PRTBP1
                        *FOR RESTORED TYPE LOAD SUBTRACT PRIORITY VALUE FROM ACC WT TABLE
6E26 8E      000D      A PRTBP2  LDX     #PTACCV-2
6E29 D6      8C        A         LDB     SRLOAD
6E2B 58                          LSLB               TIMES TWO
6E2C 3A                          ABX
6E2D EC      84        A         LDD     0,X
6E2F 93      5F        A         SUBD    TEMP1
6E31 2B      03   6E36           BMI     PRTB1B
6E33 CC      8000      A         LDD     #$8000     SET MAX VALUE
6E36 ED      84        A PRTB1B  STD     0,X
6E38 20      BC   6DF6           BRA     PRTBP1
                        *SORT PRIORITY TABLE
             6E3A      A PRTBP3  EQU     *
                        *SORTING ROUTINE
                        *INITIALIZING POINTERS
6E3A 0F      5F        A         CLR     TEMP1      (HPP) HIGHER PRIORITY POINTER TO LD PR #
6E3C 0F      60        A         CLR     TEMP2      (LPP) LOWER PRIORITY POINTER TO LD PR #
6E3E 0F      61        A         CLR     TEMP3      LOAD # ASSOCIATED WITH TEMP1
6E40 0F      62        A         CLR     TEMP4      LOAD # ASSOCIATED WITH TEMP2
6E42 0F      63        A         CLR     TIMP5      NUMBER OF SORT EXCHANGE
                        *CHECK SYSTEM SIZE
6E44 86      01        A         LDA     #1
6E46 91      05        A         CMPA    NBRLDS
6E48 26      01   6E4B           BNE     SORT1      BRANCH IF NOT A ONE LOAD SYSTEM
6E4A 39                          RTS                EXIT, RIDICULOUS TO SORT A ONE LOAD SYSTEM
                        *INITIALIZE 1ST TIME THRU POINTERS (LOAD #1)
6E4B 86      01        A SORT1   LDA     #1
6E4D 97      5F        A         STA     TEMP1      SET HPP LOAD #
6E4F 4C                          INCA
6E50 97      60        A         STA     TEMP2      SET LPP LOAD #
                        *SET LOAD POINTER TO CORRESPONDING LOAD #
6E52 8E      0006      A SORT2   LDX     #FTNMBR-1
6E55 D6      5F        A         LDB     TEMP1
6E57 3A                          ABX
6E58 E6      80        A         LDB     0,X+
6E5A D7      61        A         STB     TEMP3      SET ASSOCIATED LOAD # WITH HPP
6E5C E6      84        A         LDB     0,X
6E5E D7      62        A         STB     TEMP4      SET ASSOCIATED LOAD # WITH LPP
                        *COMPARE ASSOCIATED ACC WT FOR HPP VS LPP #
6E60 8E      000D      A         LDX     #PTACCV-2
6E63 D6      61        A         LDB     TEMP3
6E65 58                          LSLB               TIMES TWO
6E66 3A                          ABX                SET INDEX POINTER TO HPP ACC WT
6E67 108E    000D      A         LDY     #PTACCV-2
6E6B D6      62        A         LDB     TEMP4
6E6D 58                          LSLB               TIMES TWO
6E6E 31      A5        A         LEAY    B,Y
6E70 EC      84        A         LDD     0,X
```

```
6E72 A3    A4         A          SUBD   0,Y
6E74 2C    10    6E86            BGE    SORT3     BRANCH IF ACC WT OF HPP>=LPP
                                 *EXCHANGE LOAD NUMBER FOR LPP>HPP
6E76 8E    0006       A          LDX    #PTNMBR-1
6E79 D6    5F         A          LDB    TEMP1
6E7B 3A                          ABX
6E7C D6    62         A          LDB    TEMP4
6E7E E7    80         A          STB    0,X+
6E80 D6    61         A          LDB    TEMP3
6E82 E7    84         A          STB    0,X
6E84 0C    63         A          INC    TEMP5     INCREMENT SORT EXCHANGE COUNTER
                                 *UPDATE PRIORITY NUMBER TO LOAD NUMBER POINTER
6E86 0C    5F         A SORT3    INC    TEMP1
6E88 0C    60         A          INC    TEMP2
6E8A 96    05         A          LDA    NBRLDS
6E8C 91    60         A          CMPA   TEMP2
6E8E 2C    C2    6E52            BGE    SORT2     BRANCH IF MORE LOADS TO CHECK
                                 *CHECK TO SEE IF SWAP WAS MADE
6E90 96    63         A          LDA    TEMP5
6E92 27    04    6E98            BEQ    SORT4     BRANCH IF FINISHED SORTING
6E94 0F    63         A          CLR    TEMP5     REINITIALIZE FOR NEXT RUN
6E96 20    33    6F40            BRA    SORT1
           6E98       A SORT4    EQU    *
6E98 39                          RTS
                                 * END OF PRIORITY TABLE UPDATE ROUTINE

                                 *
                                 *SYSTEM 2.0 LDTMCK - TIMER DECREMENT ROUTINE
                                 *                     (S2LDTM.TXT)
                                 **************DATE CREATED: 12/15/81
                                 **************DATE LAST MODIFIED: 04/20/82
                                 *
           6E99       A LDTMCK   EQU    *
6E99 D6    06         A          LDB    NBRPLS    NUMBER OF LOAD PLUS ONE
6E9B D7    8C         A          STB    SRLOAD
6E9D 0A    8C         A LDTM1    DEC    SRLOAD
6E9F 1027  0095  6F38            LBEQ   LDTM2     BRANCH IF FINISH CHECKING LOADS
                                 *CHECK LOAD STATUS
6EA3 8E    0046       A          LDX    #LTTIMR-1
6EA6 D6    8C         A          LDB    SRLOAD
6EA8 3A                          ABX
6EA9 A6    84         A          LDA    0,X
6EAB 27    20    6ECD            BEQ    LDTM1C    BRANCH IF LOAD IS NOT ON TIMER
6EAD 2A    10    6EBF            BPL    LDTM1B    BRANCH IF LOAD IS ON SHED TIMER
                                 *LOAD IS ON RESTORE TIMER COUNT
                                 *SET CORRESPONDING LOAD STATUS BITS
6EAF 8E    002E       A LDTM1A   LDX    #LTSTAT-1
6EB2 D6    8C         A          LDB    SRLOAD
6EB4 3A                          ABX
6EB5 A6    84         A          LDA    0,X
6EB7 84    FE         A          ANDA   #LDCSR    SET FOR RESTORE LOAD FLAG
6EB9 8A    40         A          ORA    #LDSTMR+LDSCNC SET FOR TIMER LOAD & CONTROL FLAG
```

```
2659A 6EBB A7    84       A          STA    0,X
2660A 6EBD 29    29   6EE8           BRA    LDTM1D
2661                             *LOAD IS ON SHED TIMER COUNTER
2662                             *SET CORRESPONDING LOAD STAUS BITS
2663A 6EBF 8E    002E     A LDTM1B LDX      #LTSTAT-1
2664A 6EC2 D6    8C       A          LDB    SRLOAD
2665A 6EC4 3A                        ABX
2666A 6EC5 A6    84       A          LDA    0,X
2667A 6EC7 8A    A1       A          ORA    #LDSTMR+LDSCNC+LDSSR SET FOR SHED LOAD,TIMER&CNTL FLG
2668A 6EC9 A7    84       A          STA    0,X
2669A 6ECB 20    18   6EE8           BRA    LDTM1D
2670                             *CHECK TO SEE IF BYPASS HAS BEEN ACTIVATED (AFTER SHED TIMER)
2671A 6ECD 8E    002E     A LDTM1C LDX      #LTSTAT-1
2672A 6ED0 D6    8C       A          LDB    SRLOAD
2673A 6ED2 3A                        ABX
2674A 6ED3 A6    84       A          LDA    0,X
2675A 6ED5 85    40       A          BITA   #LDSBYP
2676A 6ED7 27    09   6EE2           BEQ    LDTM1E    BRANCH IF BYPASS NOT ACTIVE
2677A 6ED9 85    01       A          BITA   #LDSSR
2678A 6EDB 27    18   6EF8           BEQ    LDTM3     BRANCH IF LOAD IS RESTORE
2679                             *SET LOAD TO RESTORE MODE WITH MIN TIMER COUNT ACTIVE
2680A 6EDD BD    74D3     A          JSR    RLYRST
2681A 6EE0 20    38   6E90           BRA    LDTM1
2682                             *CLEAR CONTROL FLAG BIT & TIMER FLAG
2683A 6EE2 84    5F       A LDTM1E ANDA     #LDCCNC!.LDCTMR
2684A 6EE4 A7    84       A          STA    0,X
2685A 6EE6 20    10   6EF8           BRA    LDTM3
2686A 6EE8 8E    0046     A LDTM1D LDX      #LTTIMR-1
2687A 6EEB D6    8C       A          LDB    SRLOAD
2688A 6EED 3A                        ABX
2689A 6EEE E6    84       A          LDB    0,X       CET TIMER VALUE
2690                             *         *INCREMENT SHED OFF TIME COUNT
2691                             *ADJUST TIMER TABLES
2692A 6EF0 2A    04   6EF6           BPL    LDTM4     BRANCH IF A SHED TYPE TIMER
2693A 6EF2 6C    84       A          INC    0,X       ADJUST TIMER COUNT FOR RESTORE TYPE LOAD
2694A 6EF4 20    2B   6F21           BRA    LDTM3A
2695A 6EF6 6A    84       A LDTM4  DEC      0,X       ADJUST TIMER COUNT FOR SHED TYPE LOAD
2696                             *CHECK TO SEE IF LOAD IS SHED, IF SHED ADJUST SHE TIME COUNTER
2697A 6EF8 8E    002E     A LDTM3  LDX      #LTSTAT-1
2698A 6EFB                           TSTBIT LDSSR,SRLOAD,X
    A 6EFB D6    8C       A          LDB    SRLOAD
    A 6EFD 3A                        ABX
    A 6EFE 86    01       A          LDAA   #LDSSR
    A 6F00 A5    84       A          BITA   0,X
2699A 6F02 27    1D   6F21           BEQ    LDTM3A    BRANCH IF NOT A SHED LOAD
2700A 6F04 D6    8C       A          LDB    SRLOAD
2701A 6F06 8E    004E     A          LDX    #MXSHTB-1
2702A 6F09 3A                        ABX
2703A 6F0A A6    84       A          LDA    0,X
2704A 6F0C 81    7F       A          CMPA   #$7F      MAX COUNT REACHED
2705A 6F0E 27    02   6F12           BEQ    LDTM3B    YES, BRANCH
2706A 6F10 6C    84       A          INC    0,X       UPDATE SHED COUNT
```

```
2707                          *          *SET LOAD RELAY MASK FOR SHED
2708A 6F12 8E    7343       A LDTM3B LDX    #STABLE-1
2709A 6F15 D6    8C         A        LDB    SRLOAD
2710A 6F17 3A                        ABX
2711A 6F18 A6    84         A        LDA    0,X
2712A 6F1A 9A    96         A        ORA    RELMAS
2713A 6F1C 97    96         A        STA    RELMAS
2714A 6F1E 16    FF7C 6E9D           LBRA   LDTM1
2715                          *CLEAR SHED COUNTER
2716A 6F21 8E    004E       A LDTM3A LDX    #MXSHTB-1
2717A 6F24 D6    8C         A        LDB    SRLOAD
2718A 6F26 3A                        ABX
2719A 6F27 6F    84         A        CLR    0,X
2720                          *          *SET LOAD RELAY MASK FOR RESTORE
2721A 6F29 8E    734B       A        LDX    #RTABLE-1
2722A 6F2C D6    8C         A        LDB    SRLOAD
2723A 6F2E 3A                        ABX
2724A 6F2F A6    84         A        LDA    0,X
2725A 6F31 94    96         A        ANDA   RELMAS
2726A 6F33 97    96         A        STA    RELMAS
2727A 6F35 16    FF65 6E9D           LBRA   LDTM1
2728                          * END OF LOAD TIMER CHECK ROUTINE
2729                          *MINUTE UPDATE OF RELAY PORT BITS
2730A 6F38 96    96         A LDTM2  LDA    RELMAS
2731A 6F3A B7    2800       A        STA    RLYPRT
2732A 6F3D 39                        RTS
2733                                 LIBRY  2:S2SDRS.TXT SHED-RESTORE ROUTINE

2735                          * SYSTEM 2.0 - SHDRST  SHED-RESTORE ROUTINE
2736                          *                 (S2SDRS.TXT)
2737                          ********** DATE CREATED 12/04/81
2738                          ********** DATE LAST MODIFIED 03/10/82
2739             6F3E       A SHDRST EQU    *
2740                          * TEST 2ND TIME THRU FLAGS
2741A 6F3E                           TSTFLG SSDFLG,FLAG4
    A 6F3E 34    02         A        PSHS   A
    A 6F40 86    01         A        LDAA   #SSDFLG
                 0000       A        IFEQ   NARG-2
    A 6F42 95    04         A        BITA   FLAG4
                                     ENDC
                 FFFF       A        IFEQ   NARG-3
                                     BIT A  FLAG4,
                                     ENDC
    A 6F44 35    02         A        PULS   A
2742A 6F46 27    04   6F4C           BEQ    SR1A
2743A 6F48 BD    70C7       A        JSR    LSHD20
2744A 6F4B 39                        RTS
2745                          *CHECK FOR PLDP FLAG
2746A 6F4C                    SR1A   TSTFLG PLDPFG,FLAG2
    A 6F4C 34    02         A        PSHS   A
    A 6F4E 86    08         A        LDAA   #PLDPFG
```

```
                 0000     A          IFEQ    NARG-2
A 6F50 95        02       A          BITA    FLAG2
                                     ENDC
                 FFFF     A          IFEQ    NARG-3
                                     BIT A   FLAG2,
                                     ENDC
A 6F52 35        02       A          PULS    A
A 6F54 27        01     6F57         BEQ     SR1        BRANCH IF PLDP NOT ACTIVE
A 6F56 39                            RTS                EXIT SHORST IF PLOP ACTIVE
                             * SAVE PREVIOUS DELTA-X & DELTA-D VARIABLES
A 6F57 DC        7F       A SR1      LDD     DELTAX+1
A 6F59 DD        85       A          STD     OLDDLX+1
A 6F5B 96        7E       A          LDA     DELTAX
A 6F5D 97        84       A          STA     OLDDLX    MSB
A 6F5F DC        82       A          LDD     DELTAD+1
A 6F61 DD        88       A          STD     OLDDLD+1
A 6F63 96        81       A          LDA     DELTAD
A 6F65 97        87       A          STA     OLDDLD    MSB
                             * COMPUTE CURRENT DELTA-D
A 6F67 DC        73       A          LDD     SHRTAV
A 6F69 93        79       A          SUBD    SETPT
A 6F6B DD        82       A          STD     DELTAD+1
A 6F6D 2A        06     6F75         BPL     SR1B
A 6F6F 86        FF       A          LDA     #$FF
A 6F71 97        81       A          STA     DELTAD    MSB - NEGATIVE
A 6F73 20        02     6F77         BRA     SR1C
A 6F75 0F        81       A SR1B     CLR     DELTAD    MSB - POSTIVE
                             * COMPUTE CURRENT DELTA-X
A 6F77 DC        75       A SR1C     LDD     MAJAVG
A 6F79 93        79       A          SUBD    SETPT
A 6F7B DD        7F       A          STD     DELTAX+1
A 6F7D 2A        06     6F85         BPL     SR1D
A 6F7F 86        FF       A          LDA     #$FF
A 6F81 97        7E       A          STA     DELTAX    MSB - NEGATIVE
A 6F83 20        02     6F87         BRA     SR1E
A 6F85 0F        7E       A SR1D     CLR     DELTAX    MSB - POSTIVE
                             * ZERO CROSSOVER DETERMINATION (MAJOR AVERAGE)
A 6F87 96        84       A SR1E     LDA     OLDDLX
A 6F89 2A        04     6F8F         BPL     SR2        BRANCH IF PREVIOUS MAJAVG >= SETPOINT
A 6F8B 0F        8A       A          CLR     ZCXCNT     CLEAR ZERO CROSSOVER COUNTER
A 6F8D 20        02     6F91         BRA     SR3
                             *
A 6F8F 0C        8A       A SR2      INC     ZCXCNT     UPDATE ZERO CROSSOVER COUNTER
                 6F91     A SR3      EQU     *
                 0001     A          IFEQ    SHARED
                             ***********************************************************
                             *
                             *       ANY CODE FOR A NON-SHARED SYSTEM GOES HERE
                             *
                             ***********************************************************
                                     ENDC
```

```
                             * CHECK HIGHEST LOAD PRIORITY # MODE
A 6F91 BD   7433    A              JSR    HPRLDN   GET HIGHEST PR LD #
A 6F94 BE   002F    A              LDX    #LTSTAT-1
A 6F97                             TSTBIT LDSSR,SRLOAD,X
A 6F97 D6   3C      A              LDB    SRLOAD
A 6F99 3A                          ABX
A 6F9A 86   01      A              LDAA   #LDSSR
A 6F9C A5   34      A              BITA   0,X
A 6F9E 27   22    6FC2             BEQ    SR4      BRANCH IF LOAD IS IN RESTORE MODE
A 6FA0 8E   004E    A              LDX    #MXSHT9-1
A 6FA3 D6   3C      A              LDB    SRLOAD
A 6FA5 3A                          ABX
A 6FA6 A6   84      A              LDA    0,X
A 6FA8 91   0F      A              CMPA   #MAXOFF
A 6FAA 2D   16    6FC2             BLT    SR4      BRANCH IF MAX OFF TIME NOT REACHED
                             * CHECK LOWEST PRIORITY LOAD # MODE
A 6FAC BD   7438    A              JSR    LPRLDN   GET LOWEST PR LD #
A 6FAF 8E   002E    A              LDX    #LTSTAT-1
A 6FB2                             TSTBIT LDSSR,SRLOAD,X
A 6FB2 D6   8C      A              LDB    SRLOAD
A 6FB4 3A                          ABX
A 6FB5 86   01      A              LDAA   #LDSSR
A 6FB7 A5   34      A              BITA   0,X
A 6FB9 26   07    6FC2             BNE    SR4      BRANCH IF LOWEST PRIORITY LOAD #
                             *                              IS NOT RESTORED
                             * SET HIGHEST LOAD # FOR RESTORE
A 6FBB BD   7493    A              JSR    HPRLDN   GET HIGHEST PR LD #
A 6FBE BD   7119    A              JSR    LDREST   RESTORE LOAD SUBROUTINE
A 6FC1 39                          RTS
                             * TRUTH TABLE EVALUATION
            6FC2    A SR4          EQU    *
A 6FC2 DC   82      A              LDD    DELTAD+1 GET SHORT AVERAGE
A 6FC4 2D   3A    7000             BLT    SR6      BRANCH IF SHORT AVG < 0
A 6FC6 26   01    6FC9             BNE    SR5      BRANCH IF SHORT AVG<> 0
A 6FC8 39                          RTS
                             * NOTE: SHORT AVERAGE IS > 0
A 6FC9 DC   7F      A SR5          LDD    DELTAX+1 GET MAJOR AVERAGE
A 6FCB 2A   10    6FDD             BPL    SR7      BRANCH  IF MAJ AVA > 0
                             *IS THE RATIO OF THE MAJ AVG TO SHORT AVG WITHIN RANGE
A 6FCD DC   7F      A              LDD    DELTAX+1 SET DIVISOR
A 6FCF 8E   0032    A              LDX    #DELTAD+1 SET DIVIDEND
A 6FD2 BD   737F    A              JSR    DDIV     D.P. DIVISION
A 6FD5 4F                          CLRA
A 6FD6 C6   01      A              LDB    #DDTCDX
A 6FD8 93   9E      A              SUBD   DRESLT+1
A 6FDA 2C   01    6FDD             BGE    SR7      BRANCH IF NOT WITHIN RANGE
A 6FDC 39                          RTS             EXIT, IN + - CONDITION
                             * + + CONDITION - > SHED LOWEST PRIORITY LOAD #
A 6FDD D5   05      A SR7          LDAB   NOPLDS
A 6FDF D7   5F      A              STB    TEMP1
A 6FE1 8E   0006    A SR7C         LDX    #PTNMBR-1
```

```
A 6FE4 D6     5F        A            LDB     TEMP1
A 6FE6 3A                            ABX
A 6FE7 A6     84        A            LDAA    0,X
A 6FE9 97     8C        A            STAA    SRLOAD    TEMP SAVE LOWEST PRIORITY #
A 6FEB 8E     002E      A            LDX     #LTSTAT-1
A 6FEE                               TSTBIT  LDSSR,SRLOAD,X
A 6FEE D6     8C        A            LDB     SRLOAD
A 6FF0 3A                            ABX
A 6FF1 86     01        A            LDAA    #LDSSR
A 6FF3 A5     84        A            BITA    0,X
A 6FF5 27     05   6FFC              BEQ     SR8       BRANCH IF LOWEST PRIORITY LD #
                             *                                   IS RESTORED
A 6FF7 0A     5F        A            DEC     TEMP1     SET FOR NEXT LOWEST PRIORITY LD #
A 6FF9 26     E6   6FE1              BNE     SR7C      CONTINUE CHECK

A 6FFB 39                            RTS
                             **
A 6FFC BD     7019      A SR8        JSR     LDSHED    SHED LOAD RTN
A 6FFF 39                            RTS
                             * PART 2 OF - - CONDITION CHECK
A 7000 DC     7F        A SR6        LDD     DELTAX+1
A 7002 2D     01   7005              BLT     SR9       BRANCH IF MAJOR AVG < 0
A 7004 39                            RTS               EXIT, IN - + CONDITION
A 7005 BD     7483      A SR9        JSR     HPRLDN    GET HIGHEST PR LD #
A 7008 8E     002E      A            LDX     #LTSTAT-1
A 700B                               TSTBIT  LDSSR,SRLOAD,X
A 700B D6     8C        A            LDB     SRLOAD
A 700D 3A                            ABX
A 700E 86     01        A            LDAA    #LDSSR
A 7010 A5     84        A            BITA    0,X
A 7012 26     01   7015              BNE     SR10      BRANCH IF LD SHED
A 7014 39                            RTS
A 7015 BD     7119      A SR10       JSR     LDREST    RESTORE LOAD
A 7018 39                            RTS
                             * END OF SHED-RESTORE ROUTINE
                             * SYSTEM 2.0 - LDSHED (LOAD SHED ROUTINE)
                             ********** DATE CREATED: 12/09/81
                             ********** DATE LAST UPDATED: 03/10/82
                             *
              7019      A LDSHED EQU     *
                             * UPDATE RUNNING SUM (T.P.)
A 7019 108E   0093      A            LDY     #DELTAD+2
A 701D 8E     0070      A            LDX     #RUNSUM+2
A 7020 BD     7354      A            JSR     TADD
                             * LOOP THRU LOAD #
A 7023 D6     06        A LSHD10     LDB     NBRPLS    NUMBER OF LOADS PLUS ONE
A 7025 D7     5F        A            STB     TEMP1
A 7027 8E     0006      A LSHD11     LDX     #PTNMBR-1
A 702A 0A     5F        A            DEC     TEMP1     UPDATE PRIORITY # POINTER
A 702C 26     0B   7039              BNE     LSHD12    BRANCH IF NOT FINISH CHECKING LD#
```

```
2877                              *SET ALARM CONDITION - THREHOLD PRESENTLY EXCEEDED FLAG
2878A 702E                              SETFLG ALRMON,FLAG3
    A 702E 34    02       A             PSHS   A
                 0000     A             IFEQ   NARG-2
    A 7030 96    03       A             LDAA   FLAG3
    A 7032 9A    03       A             ORA    #ALRMON
    A 7034 97    03       A             STAA   FLAG3
                                        ENDC
                 FFFF     A             IFEQ   NARG-3
                                        LDA    FLAG3,
                                        ORA    #ALRMON
                                        STA    FLAG3,
                                        ENDC
    A 7036 35    02       A             PULS   A
2879A 7038 39                           RTS
2880A 7039 D6    5F       A LSHD12      LDAB   TEMP1
2881A 703B 3A                           ABX
2882A 703C E6    84       A             LDAB   0,X       GET PRESENT PRIORITY LD #
2883A 703E D7    3C       A             STAB   SPLOAD
2884A 7040 CE    002E     A             LDX    #LTSTAT-1
2885A 7043                              TSTBIT LDSSR,SRLOAD,X
    A 7043 D6    3C       A             LDB    SRLOAD
    A 7045 3A                           ABX
    A 7046 86    01       A             LDAA   #LDSSR
    A 7048 A5    84       A             BITA   0,X
2886A 704A 27    02  704E               BEQ    LSHD13    BRANCH IF LOAD IS RESTORE
2887A 704C 20    D9  7027               BRA    LSHD11    CONTINUE WITH NEXT PRIORITY #
2888A 704E CE    002E     A LSHD13      LDX    #LTSTAT-1
2889A 7051                              TSTBIT LDSCNC,SRLOAD,X
    A 7051 D6    3C       A             LDB    SRLOAD
    A 7053 3A                           ABX
    A 7054 86    30       A             LDAA   #LDSCNC
    A 7056 A5    84       A             BITA   0,X
2890A 7058 27    02  705C               BEQ    LSHD14    BRANCH IF LOAD IS CONTROLLABLE
2891A 705A 20    CB  7027               BRA    LSHD11    CONTINUE WITH NEXT PRIORITY #
2892                              * LOCK AHEAD FEATURE - SHOULD A LOAD BE SHED
2893A 705C 8E    0035     A LSHD14      LDX    #LTIMPT-2
2894A 705F D6    3C       A             LDAB   SRLOAD
2895A 7061 58                           ASLB
2896A 7062 3A                           ABX
2897A 7063 108E  0062     A             LDY    #TEMP4
2898A 7067 6F    A1       A             CLR    0,Y++     MSB OF MINUEND
2899A 7069 EC    84       A             LDD    0,X
2900A 706B DD    63       A             STD    TEMP3
2901A 706D 8E    007D     A             LDX    #RUNSUM+2 SET SUBTRAHEND POINTER
2902A 7070 BD    7369     A             JSR    TSUB      TRIPLE PRECISION SUBROUTINE
2903A 7073 24    04  7079               BCC    LSHD15    BRANCH IF SHEDDING IS POSSIBLE
2904A 7075 BD    7354     A             JSR    TADD      RESTORE RUNNING SUM
2905A 7078 39                           RTS
2906                              * ADJUST RUNNING TO REFLECT IMPACT OF SHEDDING THIS LOAD
2907A 7079 8E    001D     A LSHD15      LDX    #LTVAL-2
```

```
7070 D6    8C        A        LDAB   SRLOAD
707F 58                       ASLB
707F 3A                       ABX           SET MSB OF DIVIDEND
7080 4F                       CLRA
7081 F6    0820      A        LDB    TFACTR   SET DIVISOR
7084 BD    737E      A        JSR    DDIV     FOR 16 X 16 BIT DIVISION
7087 25    19   70A2          BCS    LSHD16   BRANCH ON ERROR & IGNORE IMPACT
7089 8E    0035      A        LDX    #LTIMPT-2
708C D6    8C        A        LDAB   SRLOAD
708E 58                       ASLB
708F 3A                       ABX
7090 DC    9F        A        LDD    DRESLT+1
7092 ED    84        A        STD    0,X      UPDATE IMPACT TABLE
                    *SET MINUEND VARAIBLE
7094 0F    62        A        CLR    TEMP4
7096 DD    63        A        STD    TEMP5
7098 108E  0064      A        LDY    #TEMP6
709C 8E    0070      A        LDX    #RUNSUM+2 SET SUBTRAHEND (LSB)
709F BD    7369      A        JSR    TSUB       T.P. SUBTACTION SUBRTN
                     * SHED LOAD
70A2 BD    7493      A LSHD16 JSR    RLYSHD   SHED LOAD & SET TIMER
                     *          *SET RELMAS AND I/O PORT
70A5 8E    7343      A        LDX    #RTABLE-1
70A8 D6    8C        A        LDB    SRLOAD
70AA 3A                       ABX
70AB A6    84        A        LDA    0,X
70AD 94    96        A        ANDA   RELMAS
70AF 97    96        A        STA    RELMAS
70B1 B7    2800      A        STA    RLYPRT
                     * SET 2ND TIME THRU SHED RTN FLAG
7084                          SETFLG SSDFLG,FLAG4
A 7084 34  02        A        PSHS   A
           0000      A        IFEQ   NARG-2
A 7086 96  04        A        LDAA   FLAG4
A 7088 8A  01        A        ORA    #SSDFLG
A 708A 97  04        A        STAA   FLAG4
                              ENDC
           FFFF      A        IFEQ   NARG-3
                              LDA    FLAG4,
                              ORA    #SSDFLG
                              STA    FLAG4,
                              ENDC
A 708C 35  02        A        PULS   A
                     * SAVE PRESENT SYSTEM DAC (V/F) READING
708E DC    92        A        LDD    NOWRDG
70C0 DD    94        A        STD    SNAP
                     *SAVE PRESENT LOAD #
70C2 96    8C        A        LDA    SRLOAD
70C4 97    8D        A        STA    SRSAVE
70C6 39                       RTS
                     * 2ND TIME THRU ENTRY POINT
```

```
2947                         * DID SHEDDING LOAD HAVE AN EFFECT ON
2948A 7007                   LSHD20 CLRFLG SSDCLR,FLAG4 CLEAR 2ND TIME THRU FLAG
    A 7007 34   02       A          PSHS   A
                0000     A          IFEQ   NARG-2
    A 7009 96   04       A          LDAA   FLAG4
    A 700B 84   FE       A          ANDA   #SSDCLR
    A 700D 97   04       A          STAA   FLAG4
                                    ENDC
                FFFF     A          IFEQ   NARG-3
                                    LDA    FLAG4,
                                    ANDA   #SSDCLR
                                    STA    FLAG4,
                                    ENDC
    A 700F 35   02       A          PULS   A
2949A 7011 DC   92       A          LDD    NOWRDG
2950A 7013 93   94       A          SUBD   SNAP
2951A 7015 2B   01  7008            BMI    LSHD21   BRANCH IF SHEDDING DID HAVE
2952A 7017 39                       RTS
2953                         *                                PROPER EFFECT
2954                         * RE-ADJUST RUNNING SUM (CORRECT FOR ABOVE LOAD #)
2955A 7008 108E 0035     A LSHD21 LDY    #LTIMPT-2
2956A 700C D6   80       A          LDB    SRSAVE
2957A 700E 58                       ASLB            TIMES TWO
2958A 700F 31   A5       A          LEAY   B,Y
2959A 70E1 0F   62       A          CLR    TEMP4
2960A 70E3 EC   A4       A          LDD    0,Y
2961A 70E5 DD   63       A          STD    TEMP5
2962A 70E7 108E 0064     A          LDY    #TEMP6
2963A 70EB 8E   007D     A          LDX    #RUNSUM+2
2964A 70EE BD   7354     A          JSR    TADD     T.P. ADDITION SUBRTN
2965                         *COMPUTE NEW SHED LOAD VALUE
2966A 70F1 8E   001D     A          LDX    #LTVAL-2
2967A 70F4 D6   8D       A          LDB    SRSAVE
2968A 70F6 58                       ASLB
2969A 70F7 3A                       ABX
2970A 70F8 DC   94       A          LDD    SNAP
2971A 70FA 93   92       A          SUBD   NOWRDG
2972A 70FC 2B   1A  7118            BMI    LSHD23   BRANCH IF SHEDDING LD HAD OPPOSITE EFFECT
2973A 70FE 27   18  7118            BEQ    LSHD23   BRANCH IF NO EFFECT
2974A 7100 DD   5F       A          STD    TEMP1    SAVE LOAD VALUE TEMPORARY
2975                         *AVERAGE NEW AND OLD SHED VALUE
2976A 7102 8E   001D     A          LDX    #LTVAL-2
2977A 7105 D6   8D       A          LDB    SRSAVE
2978A 7107 58                       ASLB            TIMES TWO
2979A 7108 3A                       ABX
2980                         *TEST TO SEE IF THIS IS THE FIRST TABLE ENTRY
2981A 7109 4F                       CLRA
2982A 710A 5F                       CLRB
2983A 710B E3   84       A          ADDD   0,X
2984A 710D 26   03  7112            BNE    LSHD22
2985A 710F ED   84       A          STD    0,X
2986A 7111 39                       RTS
2987A 7112 D3   5F       A LSHD22 ADDD   TEMP1
```

```
2988                              *DIVIDE BY 2
2989A 7114 44                            LSRA
2990A 7115 56                            RORB
2991A 7116 ED     84       A             STD    0,X       SAVE UPDATED SHED VALUE
2992A 7118 39                     LSHD23 RTS
2993                              * END OF LOAD SHED ROUTINE
2994                              *
2996                              *SYSTEM 2.0 - LDREST - LOAD RESTORE SUBROUTINE
2997                              **************DATE CREATED: 12/15/81
2998                              **************DATE LAST MODIFIED: 02/11/82
2999                              *
3000              7119         A  LDREST EQU    *
3001                              *TEST FOR ALARM CONDITION
3002A 7119                               TSTFLG ALRMON,FLAG3
    A 7119 34     02       A             PSHS   A
    A 711B 86     08       A             LDAA   #ALRMON
                  0000     A             IFEQ   NARG-2
    A 711D 95     03       A             BITA   FLAG3
                                         ENDC
                  FFFF     A             IFEQ   NARG-3
                                         BIT A  FLAG3,
                                         ENDC
    A 711F 35     02       A             PULS   A
3003A 7121 27     14    7137             BEQ    LRST10    BRANCH ON NO ALARM FLAGS SET
3004A 7123                               SETFLG OVRPST,FLAG3 SET OVER THRESHOLD IN PAST FLAG
    A 7123 34     02       A             PSHS   A
                  0000     A             IFEQ   NARG-2
    A 7125 96     03       A             LDAA   FLAG3
    A 7127 8A     10       A             ORA    #OVRPST
    A 7129 97     03       A             STAA   FLAG3
                                         ENDC
                  FFFF     A             IFEQ   NARG-3
                                         LDA    FLAG3,
                                         ORA    #OVRPST
                                         STA    FLAG3,
                                         ENDC
    A 712B 35     02       A             PULS   A
3005A 712D                               CLRFLG ALRMFF,FLAG3 CLEAR ALARM ON FLAG
    A 712D 34     02       A             PSHS   A
                  0000     A             IFEQ   NARG-2
    A 712F 96     03       A             LDAA   FLAG3
    A 7131 84     F7       A             ANDA   #ALRMFF
    A 7133 97     03       A             STAA   FLAG3
                                         ENDC
                  FFFF     A             IFEQ   NARG-3
                                         LDA    FLAG3,
                                         ANDA   #ALRMFF
                                         STA    FLAG3,
                                         ENDC
    A 7135 35     02       A             PULS   A
3006                              *HAS ALL LOADS BEEN RESTORED?
```

```
3007              7137      A LRST10 EQU    *
3008A 7137 BD     7433      A        JSR    HPRLDN   SET HIGHEST PRIORITY LOAD #
3009A 713A 8E     0036      A LRST11 LDX    #PTNMBR-1
3010A 713D                           TSTBIT LDSSR,SRLOAD,X
    A 713D D6     3C        A        LDB    SRLOAD
    A 713F 3A                        ABX
    A 7140 86     01        A        LDAA   #LDSSR
    A 7142 A5     84        A        BITA   0,X
3011A 7144 26     0E   7154          BNE    LRST12   BRANCH IF LOAD IS SHED
3012A 7146 0C     3D        A        INC    SRSAVE
3013A 7148 96     3D        A        LDA    SRSAVE
3014A 714A 91     05        A        CMPA   NBRLDS
3015A 714C 2F     EC   713A          BLE    LRST11   BRANCH IF MORE LOADS TO CHECK
3016                          *RESET RUNNING SUM COUNTER
3017A 714E 0F     7B        A        CLR    RUNSUM
3018A 7150 0F     7C        A        CLR    RUNSUM+1
3019A 7152 0F     7D        A        CLR    RUNSUM+2
3020                          *UPDATE RUNNING SUM
3021A 7154 108E   0093      A LRST12 LDY    #DELTAD+2 SET LSB OF ADDEND
3022A 7158 8E     007D      A LRST17 LDX    #RUNSUM+2 SET LSB OF AUGEND/RESULT
3023A 715B BD     7354      A        JSR    TADD     T.P. ADDITION SUBRTN
3024                          *PREPARE TO INDEX THRU LOAD TABLE BY PRIORITY
3025A 715E 0F     5F        A        CLR    TEMP1
3026A 7160 8E     0006      A LRST13 LDX    #PTNMBR-1
3027A 7163 0C     5F        A        INC    TEMP1
3028A 7165 96     06        A        LDA    NBRPLS   NUMBER OF LOADS PLUS ONE
3029A 7167 91     5F        A        CMPA   TEMP1
3030A 7169 2E     01   716C          BGT    LRST14   BRANCH IF MORE LOADS TO GO
3031A 716B 39                        RTS
3032A 716C D6     5F        A LRST14 LDB    TEMP1
3033A 716E 3A                        ABX
3034A 716F E6     84        A        LDB    0,X      GET PRESENT PRIORITY LOAD #
3035A 7171 D7     3C        A        STB    SRLOAD
3036A 7173 8E     002E      A        LDX    #LTSTAT-1
3037A 7176                           TSTBIT LDSSR,SRLOAD,X
    A 7176 D6     3C        A        LDB    SRLOAD
    A 7178 3A                        ABX
    A 7179 86     01        A        LDAA   #LDSSR
    A 717B A5     84        A        BITA   0,X
3038A 717D 27     E1   7160          BEQ    LRST13   BRANCH IF LOAD IS RESTORED ALREADY
3039A 717F 8E     002E      A        LDX    #LTSTAT-1
3040A 7182                           TSTBIT LDSCNC,SRLOAD,X
    A 7182 D6     3C        A        LDB    SRLOAD
    A 7184 3A                        ABX
    A 7185 86     80        A        LDAA   #LDSCNC
    A 7187 A5     84        A        BITA   0,X
3041A 7189 26     D5   7160          BNE    LRST13   BRANCH IF LOAD IS IN CONTROL MODE
3042                          *LOOK AHEAD FEATURE - SHOULD LOAD BE RESTORED?
3043A 718B 8E     0035      A        LDX    #LTIMPT-2
3044A 718E D6     3C        A        LDB    SRLOAD
3045A 7190 58                        LSLB            TIMES TWO
```

```
3046A 7191 3A                      ABX
3047A 7192 CF    62      A         CLR     TEMP4
3048A 7194 EC    34      A         LDD     0,X
3049A 7196 DD    63      A         STD     TEMP5
3050A 7198 108E  3064    A         LDY     #TEMP6
3051A 719C 8E    007D    A         LDX     #RUNSUM+2
3052A 719F BD    7369    A         JSR     TSUB      T.P. SUBTRACTION SUBRTN
3053A 71A2 24    04   71A8         BCC     LRST15    BRANCH IF RESTORE IS POSSIBLE
3054A 71A4 BD    7354    A         JSR     TADD      CORRECTION FACTOR
3055A 71A7 39                      RTS               RESTORE NOT POSSIBLE, EXIT RTN
3056                       *RESTORE LOAD
3057A 71A8 BD    7493    A LRST15  JSR     RLYRST
3058A 71AB 39                      RTS
3059                       * END OF LOAD RESTORE ROUTINE
3060                               LIBRY   2:S2UTIL.TXT UTILITY OVERRIDE ROUTINE
3062                       * SYSTEM 2.0 - UTILITY OVERRIDE ROUTINE
3063                       *
3064                       *
3065                       ******* DATE LIBRARY CREATED 11/18/81
3066                       ******* DATE LAST MODIFIED 11/18/81
3067                       *
3068                       *       UTILITY OVERRIDE ROUTINE
3069                       *
3070             71AC    A UTLOVR  EQU     *
3071A 71AC 39                      RTS
3072                       * END OF UTILITY OVERRIDE ROUTINE
3073                       *
3074                       *        I/O AND UTILITY ROUTINES
3075                       *
3076                               LIBRY   2:S2SYSS.TXT SYSTEM SUPPORT ROUTINES
3078                       * SYSTEM 2.0 - SYSTEM SUBROUTINES
3079                       *
3080                       * SYSTEM 2.0 - CHECKSUM ROUTINE
3081                       *
3082                       ******* DATE LIBRARY CREATED 12/02/81
3083                       ******* DATE LAST MODIFIED 03/09/82
3084                       *
3085                       * SUBROUTINE TO CALCULATE THE CHECKSUM OF A TRANSMITTED MESSAGE.
3086                       * X-REG CONTAINS THE ADDRESS OF THE MESSAGE UPON ENTRY.
3087                       * AT EXIT, X-REG CONTAINS THE 2-BYTE CHECKSUM
3088                       * CONTENTS OF A- AND B-REGISTERS ARE LOST.
3089                       *
3090                       * THIS ROUTINE GENERATES A CYCLIC REDUNDANCY CODE USING THE DIVISOR
3091                       * POLYNOMIAL OF: 1+X+X**4+X**5+X**9+X**10.  THE MSG IS SHIFTED
3092                       * INTO THE "SHIFT REGISTER" (SHFTRG AND SHFTRG+1) IN THE NORMAL
3093                       * BYTE ORDER (I.E., LOW ADDR FIRST, HIGH ADDR LAST), AND EACH BYTE
3094                       * IS SHIFTED IN FROM LO-ORDER TO HI-ORDER BIT.  SO BYTE 0, BIT 0
3095                       * GOES IN FIRST* BYTE 0, BIT 1--2ND ... * BYTE 1, BIT 0 -- 9TH*
3096                       * ... *LAST BYTE, BIT 7 -- LAST.
3097                       *
3098             71AD    A CHKSUM  EQU     *
```

```
3099A 71AD 80   02        A        SUBA   #2        *SET COUNTER TO NUMBER OF BYTES
3100A 71AF 97   5C        A        STA    CNT       *IN TRANSMITTED MESSAGE, LESS CHECKSUM BYTES
3101A 71B1 0F   65        A        CLR    SHFTRG    *INITIALIE THE SHIFT REGISTER TO ZERO
3102A 71B3 0F   66        A        CLR    SHFTRG+1  *NOTE - ONLY 10 BITS WILL BE USED
3103                        *                       *  LOWEST 2 BITS IN SHFTRG AND ALL 8 BITS IN
3104                        *                       *  SHFTRG+1
3105            7135      A CHKLP1 EQU    *
3106A 7135 86   08        A        LDA    #8
3107A 7137 97   5D        A        STA    CNT2      *SET BIT COUNTER (# OF BITS IN BYTE)
3108A 7139 A6   80        A        LDA    0,X+      *LOAD BYTE FROM MESSAGE
3109            713B      A CHKLP2 EQU    *
3110A 713B D6   66        A        LDB    SHFTRG+1  *LOAD LAST 8 BITS OF SHIFT REGISTER
3111A 713D 97   5E        A        STA    TEMP      *STORE MSG BYTE
3112A 713F D8   5E        A        EORB   TEMP      *EXCLUSIVE OR LAST BIT OF SHIFT REGISTER
3113A 71C1 C4   01        A        ANDB   #1        *WITH MSG BYTE (MASK OFF OTHER BITS)
3114A 71C3 D7   5F        A        STB    TEMP1     *STORE THIS BIT
3115A 71C5 DC   65        A        LDD    SHFTRG    *LOAD THE SHIFT REGISTER AND THEN
3116A 71C7 47                      ASRA             * SHIFT IT ONE BIT RIGHT
3117A 71C8 56                      RORB
3118A 71C9 0D   5F        A        TST    TEMP1     *WAS BIT FOUND ABOVE A 1
3119A 71CB 26   04   71D1          BNE    NOLUP2    * NO - DONT'T HAVE TO DO ANYTHING
3120A 71CD 88   03        A        EORA   #3        *YES - EXCLUSIVE OR IN THE DIVISOR POLYNOMIAL
3121A 71CF C8   31        A        EORB   #$31      * LESS THE X**10 TERM  WHICH IS SHIFTED
3122                        *                       * OUT OF THE SHIFT REGISTER
3123            71D1      A NOLUP2 EQU    *
3124A 71D1 DD   65        A        STD    SHFTRG    *PUT NEW VALUE IN SHIFT REGISTER
3125A 71D3 96   5E        A        LDA    TEMP      *SET UP FOR NEXT BIT IN THIS MSG BYTE
3126A 71D5 46                      RORA
3127A 71D6 0A   5D        A        DEC    CNT2      *HAVE WE DONE ALL BITS IN THIS MSG BYTE
3128A 71D8 2E   E1   713B          BGT    CHKLP2    *NO - DO NEXT
3129A 71DA 0A   5C        A        DEC    CNT       *YES - IS THERE ANOTHER MSG BYTE
3130A 71DC 2E   D7   7135          BGT    CHKLP1    *YES - GO PROCESS IT
3131A 71DE 9E   65        A        LDX    SHFTRG    *NO - ALL DONE.  LOAD DATA FROM SHIFT
3132                        *                       *  REGISTER.  WHICH IS THE DESIRED CHECKSUM
3133A 71E0 39                      RTS              *RETURN
3135                        *      SYSTEM 2.0 - I/O ROUTINES
3136                        *        INPUT ONE CHARACTER - ACIA
3137                        *        OUTPUT ONE CHARACTER - ACIA
3138                        *
3139                        ****** DATE LIBRARY CREATED 12/1/81
3140                        ****** DATE LAST MODIFIED 12/1/81
3141                        *
3142                        *      INPUT ONE CHARACTER - ACIA
3143                        *
3144            71E1      A INCH   EQU    *
3145A 71E1 B6   2200      A        LDAA   ACSTAT    READY TO RECEIVE
3146A 71E4 47                      ASRA
3147A 71E5 24   FA   71E1          BCC    INCH      NO
3148A 71E7 B6   2201      A        LDAA   ACDATA    INPUT CHAR
3149A 71EA 84   7F        A        ANDA   #$7F      STRIP OFF PARITY
3150A 71EC 39                      RTS              RETURN
```

```
                          *
                          *       OUTPUT ONE CHARACTER
                          *         A-REG = CHAR TO BE TRANSMITTED
                          *
                 71ED     A OUTCH   EQU     *
71ED 34          04       A         PSHS    B
                 71EF     A OUT1    EQU     *
71EF F6          2200     A         LDAB    ACSTAT    READY TO TRANSMIT
71F2 57                             ASRB
71F3 57                             ASRB
71F4 24          F9  71EF           BCC     OUT1      NO
71F6 B7          2201     A         STAA    ACDATA    OUTPUT A CHARACTER
71F9 35          04                 PULB
71FB 39                             RTS
                          *
                          *
                          *    CONVERT BINARY TO DECIMAL ASCII
                          *    ENTER WITH (A,B)=BINARY NUMBER
                          *                (X)=POINTER TO STORE ASCII CHAR
71FC 9F          67       A CVBTD   STX     SAVEX     SAVE POINTER
71FE 8E          7231     A         LDX     #K10K     POINT TO CONSTANTS
7201 0F          6F       A CVDEC1  CLR     SAVEA     INIT.DEC CHAR
7203 E0          01       A CVDEC2  SUBB    1,X
7205 A2          84       A         SBCA    0,X
7207 25          04  720D           BCS     CVDEC5    OVERFLOW
7209 0C          6F       A         INC     SAVEA     INC CHAR BEING BUILT
720B 20          F6  7203           BRA     CVDEC2
720D EB          01       A CVDEC5  ADDB    1,X       RESTORE PARTIAL RESULT
720F A9          84       A         ADCA    0,X
7211 34          02                 PSHA
7213 9F          69       A         STX     SAVEX1
7215 9E          67       A         LDX     SAVEX     X-STORE CHAR.POINTER
7217 96          6F       A         LDAA    SAVEA
7219 8B          30       A         ADDA    #'0       MAKE ASCII CHAR
721B A7          84       A         STAA    0,X
721D 35          02                 PULA
721F 30          01                 INX
7221 9F          67       A         STX     SAVEX
7223 9E          69       A         LDX     SAVEX1    X POINTS TO CONSTANTS
7225 30          01                 INX
7227 30          01                 INX
7229 8C          723B     A         CPX     #K10K+10
722C 26          D3  7201           BNE     CVDEC1
722E 9E          67       A         LDX     SAVEX
7230 39                             RTS
                          *    CONSTANTS FOR CONVERSION
7231             2710     A K10K    FDB     10000
7233             03E8     A         FDB     1000
7235             0064     A         FDB     100
7237             000A     A         FDB     10
7239             0001     A         FDB     1
```

```
                            *
                            * DATA DECODE SUBROUTINE
                            *      X =  POINTS TO DATA
                            *      B =  LENGTH (2/4 BYTES)       0 = 2 BYTES
                            *      D =  CONTAINS DATA (ON EXIT)
                            *
                7238      A DATADC EQU   *
7238 0F         5E        A        CLR   TEMP
723D 0F         5F        A        CLR   TEMP1
723F A6         80        A        LDA   0,X+      GET DATA BYTE
7241 81         41        A        CMPA  #'A
7243 2B         02   7247          BMI   DDCD01    NUMERIC
7245 8B         09        A        ADDA  #9
                7247      A DDCD01 EQU   *
7247 84         0F        A        ANDA  #$0F
7249 27         06   7251          BEQ   DDCD02
724B 48                            ASLA
724C 48                            ASLA
724D 48                            ASLA
724E 48                            ASLA
724F 97         5E        A        STA   TEMP
                7251      A DDCD02 EQU   *
7251 A6         80        A        LDA   0,X+      GET NEXT BYTE
7253 81         41        A        CMPA  #'A
7255 2B         02   7259          BMI   DDCD03
7257 8B         09        A        ADDA  #9
                7259      A DDCD03 EQU   *
7259 84         0F        A        ANDA  #$0F
725B 9B         5E        A        ADDA  TEMP
725D 97         5E        A        STA   TEMP
725F 5D                            TSTB
7260 26         01   7263          BNE   DDCD04    TWO BYTE DECODE
7262 39                            RTS             RETURN
                7263      A DDCD04 EQU   *
7263 A6         80        A        LDA   0,X+      GET 3RD BYTE
7265 81         41        A        CMPA  #'A
7267 2B         02   726B          BMI   DDCD05
7269 8B         09        A        ADDA  #9

                726B      A DDCD05 EQU   *
726B 84         0F        A        ANDA  #$0F
726D 27         06   7275          BEQ   DDCD06
726F 48                            ASLA
7270 48                            ASLA
7271 48                            ASLA
7272 48                            ASLA
7273 97         5F        A        STA   TEMP1
                7275      A DDCD06 EQU   *
7275 A6         80        A        LDA   0,X+      GET 4TH BYTE
7277 81         41        A        CMPA  #'A
7279 2B         02   727D          BMI   DDCD07
```

```
7279 33      09         A            ADDA   #9
             727D       A  CDCD07    EQU    *
727D 84      0F         A            ANDA   #$0F
727F 9B      5F         A            ADDA   TEMP1
7281 97      5F         A            STA    TEMP1
7283 DC      5F         A            LDD    TEMP1
7285 39                              RTS                RETURN
                           *
                           *         CONVERT DECIMAL ASCII (MOD1000) TO BINARY
                           *
                           *           X - ADDR OF SOURCE
                           *           D - CONTAINS RESULT
                           *
             7286       A  DTOBIN    EQU    *
7286 A6      01         A            LDA    1,X        GET UNITS DIGIT
7288 80      30         A            SUBA   #'0
728A 97      68         A            STA    SAVEX+1
728C 0F      67         A            CLR    SAVEX
728E A6      84         A            LDA    0,X        GET TENS DIGIT
7290 80      30         A            SUBA   #'0
7292 C6      0A         A            LDB    #10
7294 3D                              MUL
7295 D3      67         A            ADDD   SAVEX
                           *
                           *              CHECK FOR FULL SCALE EXCEEDED
                           *
7297 F1      0819       A            CMPB   FULLSC
729A 2F      03    729F              BLE    DTOB01
729C F6      0819       A            LDB    FULLSC
             729F       A  DTOB01    EQU    *
                           *
                           *              MULTIPLY 'B' BY 100 ('B' * 250 SHIFT LEFT 2)
                           *
729F 86      FA         A            LDA    #250
72A1 3D                              MUL
72A2 58      49                      ASLD
72A4 53      49                      ASLD
72A6 39                              RTS
                           *              BINARY TO HEX ASCII
                           *
                           *                B  CONTAINS THE DATA TO BE CONVERTED (INPUT)
                           *                D  CONTAINS ASCII CHARACTERS
                           *
             72A7       A  BINHEX    EQU    *
72A7 4F                              CLRA
72A8 58      49                      ASLD
72AA 53      49                      ASLD
72AC 58      49                      ASLD
72AE 58      49                      ASLD
72B0 56                              RORB
72B1 56                              RORB
```

```
3305A 7232 56                      RORB
3306A 7233 56                      RORB
3307A 7234 81   09      A          CMPA    #9
3308A 7236 2F   04   72BC          BLE     BINHX1
3309A 7238 3A   30      A          ADDA    #'0
3310A 723A 20   04   72C0          BRA     BINHX2
3311            72BC    A BINHX1   EQU     *
3312A 723C 80   0A      A          SUBA    #$0A
3313A 723E 8B   41      A          ADDA    #'A
3314            72C0    A BINHX2   EQU     *
3315A 72C0 C1   09      A          CMPB    #9
3316A 72C2 2F   03   72C7          BLE     BINHX3
3317A 72C4 CB   30      A          ADDB    #'0
3318A 72C6 39                      RTS
3319            72C7    A BINHX3   EQU     *
3320A 72C7 C0   0A      A          SUBB    #$0A
3321A 72C9 CB   41      A          ADDB    #'A
3322A 72CB 39                      RTS
3324                        *  MUL16A --A 16 X 16 MULTIPLY (32 BIT PRODUCT)
3325                        *         THIS ROUTINE MULTIPLIES THE TWO
3326                        *         UNSIGNED 16-BIT INTEGERS P & Q AND
3327                        *         STORES THE PRODUCT IN THE 32-BIT
3328                        *         UNSIGNED RESULT, R
3329                        *
3330                        *CALLING CONVENTION:
3331                        *
3332                        *         LDX      #DATA
3333                        *         JSR      MUL16A
3334                        *
3335                        * WHERE DATA IS DEFINED AS
3336                        *
3337                        *    DATA RMB 2  P
3338                        *         RMB 2  Q
3339                        *         RMB 4  R    P * Q GOES HERE
3340                        *
3341                        * RESTRICTIONS:
3342                        *
3343                        *    1.  THE ROUTINE IS RE-ENTRANT PROVIDING EACH
3344                        *        CALLER SUPPLIES ITS OWN DATA AREA.
3345                        *    2.  THE DATA AREA MUST BE DEFINED AS ABOVE.
3346                        *
3347                        ******************************************
3348
3349            0000    A P        EQU     0          OFFSET FOR P
3350            0002    A Q        EQU     2          OFFSET FOR Q
3351            0004    A R        EQU     4          OFFSET FOR R
3352
3353A 72CC 4F              MUL16A CLRA               CLR TWO HIGH BYTES OF RESULT
3354A 72CD 5F                     CLRB
3355A 72CE ED   04      A          STD     R,X
3356A 72D0 A6   01      A          LDAA    P+1,X      P+1 * Q+1
```

```
7202 E6    03         A         LDAB   Q+1,X
72D4 3D                         MUL
72D5 ED    06         A         STD    R+2,X
72D7 A6    34         A         LDAA   P,X       P * Q+1
72D9 E6    03         A         LDAB   Q+1,X
72DB 3D                         MUL
72DC E3    05         A         ADDD   R+1,X
72DE ED    05         A         STD    R+1,X
72E0 24    02    72E4           BCC    MUL002    CHK FOR CARRY
72E2 6C    04         A         INC    R,X
72E4 A6    01         A MUL002  LDAA   P+1,X     P+1 * Q
72E6 E6    02         A         LDAB   Q,X
72E8 3D                         MUL
72E9 E3    05         A         ADDD   R+1,X
72EB ED    05         A         STD    R+1,X
72ED 24    02    72F1           BCC    MUL004    CHK FOR CARRY
72EF 6C    04         A         INC    R,X
72F1 A6    34         A MUL004  LDAA   P,X       P * Q
72F3 E6    02         A         LDAB   Q,X
72F5 3D                         MUL
72F6 E3    04         A         ADDD   R,X
72F8 ED    04         A         STD    R,X
72FA 39                         RTS
                        *
                        *         EXPONENTIAL FILTER ROUTINE
                        *           INPUT PARAMETERS
                        *              X = NEW DATA (16 BITS)
                        *              D = EXISTING EXPONENTIAL FILTER
                        *              Y = X FACTOR
                        *
           72FB       A XPFLTR  EQU    *
72FB DD    6F         A         STD    SAVEA     SAVE EXPONENTIAL FILTER
72FD 109F  67         A         STY    OPRND1    SAVE XFACTOR IN OPERAND 2
7300 9F    69         A         STX    OPRND2    NEW DATA TO OPERAND 1
7302 8E    0067       A         LDX    #OPRND1
7305 9D    72CC       A         JSR    MUL16A    MULTIPLY ROUTINE
                        *
                        *         SCALE BY ROUNDING UP BY ONE BYTE
                        *
7308 96    6E         A         LDA    RSULT1+3
730A 81    30         A         CMPA   #$80
730C 23    0B    7319           BLS    XPFLT1    NO ROUNDING REQUIRED
730E DC    6C         A         LDD    RSULT1+1
7310 C3    0001       A         ADDD   #$0001
7313 DD    6C         A         STD    RSULT1+1
7315 24    02    7319           BCC    XPFLT1
7317 0C    6B         A         INC    RSULT1
           7319       A XPFLT1  EQU    *
7319 DC    6C         A         LDD    RSULT1+1
731B DD    5C         A         STD    WRKBF      SAVE IN TEMPORARY STORAGE
```

```
                              *
                              *      COMPUTE 1 - XFACTOR
                              *
7310 5F                            CLRB
731E 86    01         A            LDA    #1
7320 93    67         A            SUBD   OPRND1   1-XFACTOR
7322 DD    67         A            STD    CPRND1   TO OPERAND 1
7324 DC    6F         A            LDD    SAVEA    EXPONENTIAL FILTER TO OPERAND 2
7326 DD    69         A            STD    OPRND2
7328 8E    9067       A            LDX    #OPRND1
7328 BD    72CC       A            JSR    MUL16A
                              *
                              *      SCALE BY ROUNDING UP BY ONE BYTE
                              *
732E 96    6E         A            LDA    RSULT1+3
7330 81    80         A            CMPA   #$80
7332 23    08    733F              BLS    XPFLT2   NO ROUNDING REQUIRED
7334 DC    5C         A            LDD    RSULT1+1
7336 C3    0001       A            ADDD   #$0001
7339 DD    5C         A            STD    RSULT1+1
733B 24    02    733F              BCC    XPFLT2
733D 0C    5B         A            INC    RSULT1
           733F       A XPFLT2     EQU    *
733F DC    5C         A            LDD    RSULT1+1
7341 D3    5C         A            ADDD   WRKBF
7343 39                            RTS             RETURN
                              *
                              *      UPDATED: 02/05/82
                              *
                              *FIXED CONSTANT VALUE BYTES
                              *SET BIT TABLE
7344       01         A STABLE     FCB    1
7345       02         A            FCB    2
7346       04         A            FCB    4
7347       08         A            FCB    8
7348       10         A            FCB    16
7349       20         A            FCB    32
734A       40         A            FCB    64
734B       80         A            FCB    128
                              *RESET BIT TABLE
734C       FE         A RTABLE     FCB    254
734D       FD         A            FCB    253
734E       FB         A            FCB    251
734F       F7         A            FCB    247
7350       EF         A            FCB    239
7351       DF         A            FCB    223
7352       BF         A            FCB    191
7353       7F         A            FCB    127
                              *
                              * SYSTEM 2.C - TADD - TRIPLE PRECISION ADDITION SUBRTN
```

```
3461                         ************** DATE CREATED: 12/10/81
3462                         *************  DATE LAST MODIFIED: 02/05/82
3463                         *
3464                         *INPUT PARAMETER
3465                         *       X INDEX REGISTER POINTS TO LSB OF AUGEND & RESULT (T.P.)
3466                         *       Y INDEX REGISTER POINTS TO LSB OF ADDEND          (T.P.)
3467                         *       X AND Y INDEX ARE THE SAME ON EXITING
3468                         * OUTPUT: RESULT IS PLACED BACK IN AUGEND WITH
3469                         *
3470             7354      A TADD   EQU    *
3471                         *       SIGN BIT & CARRY BIT RETURNED
3472                         * NOTE: A REGISTER USED EXCLUSIVELY FOR CALCULATION
3473A 7354 A6    A4        A        LDA    0,Y
3474A 7356 AB    84        A        ADDA   0,X
3475A 7358 A7    84        A        STA    0,X       LSB
3476A 735A A6    A2        A        LDA    0,-Y
3477A 735C A9    82        A        ADCA   0,-X
3478A 735E A7    84        A        STA    0,X       2ND BYTE
3479A 7360 A6    A2        A        LDA    0,-Y
3480A 7362 A9    82        A        ADCA   0,-X
3481A 7364 A7    81        A        STA    0,X++     MSB
3482A 7366 A6    A1        A        LDA    0,Y++     INDEX CORRECTION
3483A 7368 39                       RTS
3485                         *
3486                         * SYSTEM  2.0 - TSUB - TRIPLE PRECISION SUBTRACTION SUBRTN
3487                         ************* DATE CREATED: 12/10/81
3488                         ************  DATE LAST MODIFIED: 02/05/82
3489                         *
3490                         * INPUT PARAMETERS*
3491                         *       X INDEX REGISTER POINTS TO LSB OF SUBTRAHEND (T.P.)
3492                         *       Y INDEX REGISTER POINTS TO LSB OF MINUEND    (T.P.)
3493                         *       X AND Y INDEX ARE THE SAME ON EXITING
3494                         * OUTPUT PARAMETER*
3495                         *       RESULT IS PLACED IN SUBTRAHEND VARIABLES
3496                         *       NOTE: A REG USED EXCLUSIVELY IN CALCULTION
3497                         *       AND SIGN BIT RETURNED
3498             7369      A TSUB   EQU    *
3499A 7369 A6    84        A        LDA    0,X
3500A 736B A0    A4        A        SUBA   0,Y
3501A 736D A7    84        A        STA    0,X       SAVE LSB OF RESULT
3502A 736F A6    82        A        LDA    0,-X
3503A 7371 A2    A2        A        SBCA   0,-Y
3504A 7373 A7    84        A        STA    0,X       SAVE 2ND BYTE OF RESULT
3505A 7375 A6    82        A        LDA    0,-X
3506A 7377 A2    A2        A        SBCA   0,-Y
3507A 7379 A7    81        A        STA    0,X++     SAVE MSB OF RESULT
3508A 737B A6    A1        A        LDA    0,Y++     INDEX CORRECTION
3509A 737D 39                       RTS
3511                         * SYSTEM 2.0 - TDIV - 24 BIT BY 16 BIT UNSIGNED DIVIDE
3512                         *
```

```
                              *            - DDIV - 16 BIT BY 16 BIT UNSIGNED DIVIDE
                              **************DATE CREATED: 12/15/81
                              **************DATE LAST MODIFIED: 02/16/82
                              * CALLING SEQUENCE:
                              *       LDD     ()   SET A:B TO 16-BIT DIVISOR
                              *       LDX     #()  SET INDEX TO MSB OF DIVIDEND
                              *       JSR     TDIV  FOR 24 BIT BY 16 BIT DIVIDE
                              *          OR   JSR  DDIV FOR 16 BIT BY 16 BIT DIVIDE
                              *
                              * NOTE: A) DEPENDING UPON ENTRY POINT THIS SUBRTN IS
                              *          EITHER A 24 X 16 OR 16 X 16 DIVIDE RTN, BUT
                              *          SAME ALAORITHM IS USED FOR BOTH
                              *       B) RESULT OF DIVISION IS IN DRESLT, BUT IF
                              *          ERROR OCCURS, C-BIT IS SET, ELSE IT IS CLEARED.
                              *       C) NOTE: THIS IS ACTUALLY A 24 X 24 BIT DIVISION RTN
                              *       D) RAM LOCATIONS USED:
                              *             DIVSOR  RMB  3    T.P. DIVISOR
                              *             DIVEND  RMB  3    T.P. DIVIDEND
                              *             DCNT    RMB  1    SHIFT BIT COUNTER
                              *             DRESLT  RMB  2    D.P. QUOTIENT (RESULT)
                              *          X-REG POINTS TO DIVIIDEND
                              *          Y-REG POINTS TO DIVISOR
                              *
                              * 16 X 16 BIT ENTRY POINT
                 737F       A DDIV    EQU     *
       737F DD   9B         A         STD     DIVSOR+1
       7380 2A   06    7388           BPL     DDIV1A
       7382 86   FF         A         LDA     #$FF       SIGN EXTEND
       7384 97   9A         A         STA     DIVSOR
       7386 20   02    738A           BRA     DDIV1B
       7388 0F   9A         A DDIV1A  CLR     DIVSOR
       738A 108E 0097       A DDIV1B  LDY     #DIVEND
       738E A6   84         A         LDA     0,X
       7390 2A   06    7398           BPL     DDIV1C
       7392 86   FF         A         LDA     #$FF
       7394 A7   A0         A         STA     0,Y+       SIGN EXTEND
       7396 20   18    73B0           BRA     TDIV1
       7398 6F   A0         A DDIV1C  CLR     0,Y+       MSB
       739A 20   14    73B0           BRA     TDIV1
                              * 24 X 16 BIT ENTRY POINT
                 739C       A TDIV    EQU     *
       739C DD   9B         A         STD     DIVSOR+1
       739E 2A   06    73A6           BPL     TDIVA
       73A0 86   FF         A         LDA     #$FF
       73A2 97   9A         A         STA     DIVSOR     SIGN EXTEND
       73A4 20   02    73A8           BRA     TDIVB
       73A6 0F   9A         A TDIVA   CLR     DIVSOR
       73A8 108E 0097       A TDIVB   LDY     #DIVEND
       73AC A6   80         A         LDA     0,X+
       73AE A7   A0         A         STA     0,Y+       MSB
```

```
73B0 A6   80        A TDIV1   LDA    ,X+
73B2 A7   A0        A         STA    ,Y+       2ND BYTE
73B4 A6   84        A         LDA    ,X
73B6 A7   A4        A         STA    ,Y        LSB
                      *INITIALIZE SHIFT COUNTER
73B8 0F   A0        A         CLR    DCNT
73BA 0C   A0        A         INC    DCNT
                      *DETERMINE IF DIVISOR IS ZERO
73BC 96   9A        A         LDA    DIVSOR
73BE 9A   9B        A         ORA    DIVSOR+1
73C0 9A   9C        A         ORA    DIVSOR+2
73C2 27   55   7419           BEQ    TDIV8     BRANCH IF DIVISOR=0 (ERROR)
                      *LEFT JUSTIFY THE DIVISOR
73C4 96   9A        A         LDA    DIVSOR
73C6 2B   0A   73D2           BMI    TDIV3     BRANCH IF LEFT JUSTIFIED ALREADY
73C8 0C   A0        A TDIV2   INC    DCNT      UPDATE BIT COUNTER
73CA 08   9C        A         LSL    DIVSOR+2
73CC 09   9B        A         ROL    DIVSOR+1
73CE 09   9A        A         ROL    DIVSOR
73D0 2A   F6   73C8           BPL    TDIV2     BRANCH IF MORE SHIFT NEEDED
                      *CLEAR QUOTIENT (RESULT)
73D2 0F   9D        A TDIV3   CLR    DRESLT    INITIALITE RESULT
73D4 0F   9E        A         CLR    DRESLT+1

73D6 0F   9F        A         CLR    DRESLT+2
                      * DIVISION ROUTINE PROPER
73D8 108E 009C      A TDIV3A  LDY    #DIVSOR+2 SET LSB OF DIVISOR
73DC 8E   0099      A         LDX    #DIVEND+2 SET LSB OF DIVIDEND
73DF BD   7369      A         JSR    TSUB      T.P. SUBTRACTION SUBRTN (DIVEND-DIVSOR)
73E2 24   07   73EB           BCC    TDIV4     BRANCH IF DIVSOR<DIVEND
                      *DIVEND<DIVSOR
73E4 BD   7354      A         JSR    TADD      RESTORE DIVIDEND
73E7 1C   FE                  CLC
73E9 20   02   73ED           BRA    TDIV5
                      *DIVSOR<DIVEND
73EB 1A   01          TDIV4   SEC
                      *UPDATE QUOTIENT(RESULT)
73ED 09   9F        A TDIV5   ROL    DRESLT+2 LSB
73EF 09   9E        A         ROL    DRESLT+1
73F1 09   9D        A         ROL    DRESLT   MSB
                      *UPDATE DIVISOR
73F3 04   9A        A         LSR    DIVSOR
73F5 06   9B        A         ROR    DIVSOR+1
73F7 06   9C        A         ROR    DIVSOR+2
                      *UPDATE BIT COUNTER
73F9 0A   A0        A         DEC    DCNT
73FB 26   DB   73D8           BNE    TDIV3A    BRANCH IF DIVISION IS NOT FINISHED
                      *PERFORM ROUNDING IF NEEDED
73FD 108E 009C      A         LDY    #DIVSOR+2
7401 8E   0099      A         LDX    #DIVEND+2
```

```
7404 30     7369       A         JSR    TSUB
7407 25     0D    7416           BCS    TDIV6    BRANCH IF NO ROUNDING NEEDED
7409 CC     0001       A         LDD    #1
740C D3     9E         A         ADDD   DRESLT+1
740E DD     9E         A         STD    DRESLT+1
7410 86     00         A         LDA    #0
7412 99     9D         A         ADCA   DRESLT
7414 97     9D         A         STA    DRESLT   UPDATE MSB FOR POSSIBLE CARRY BIT
7416 1C     FE           TDIV6   CLC
7418 39                          RTS
                         *ERROR  EXIT
7419 1A     01           TDIV8   SEC
741B 39                          RTS
                                 LIBRY  2:S2USYS.TXT USER DEFINED SUBROUTINES
                         * SYSTEM 2.0 - USER DEFINED SUBROUTINES
                         *              (S2USYS.TXT)
                         *
                         *      DATE CREATED 12/07/82
                         *      DATE LAST MODIFIED 04/19/82
                         *
                         *
                         *  BYPASS SETUP SUBROUTINE
                         *    A-REG = NEW BYPASS LOAD NUMBER
                         *
            741C       A BYPRTN EQU     *
741C 0D     53         A         TST    BYPSAV   OLD BYPASS NMBR =0
741E 27     24    7444           BEQ    BYPRT1   YES
7420 D6     53         A         LDB    BYPSAV
7422 8E     002E       A         LDX    #LTSTAT-1 COMPUTE ADDR OF STATUS BYTE
7425 3A                          ABX              OF OLD BYPASS LOAD
7426                             CLRFLG LDCBYP,O,X CLEAR BYPASS BIT
A 7426 34   02         A         PSHS   A
            0001       A         IFEQ   NARG-2
                                 LDA A  0
                                 ANDA   #LDCBYP
                                 STA A  0
                                 ENDC
            0000       A         IFEQ   NARG-3
A 7428 A6   84         A         LDA    0,X
A 742A 84   BF         A         ANDA   #LDCBYP
A 742C A7   84         A         STA    0,X
                                 ENDC
A 742E 35   02         A         PULS   A
7430                             TSTFLG LDSTMR,0,X LOAD ON TIME
A 7430 34   02         A         PSHS   A
A 7432 86   20         A         LDAA   #LDSTMR
            0001       A         IFEQ   NARG-2
                                 BIT A  0
                                 ENDC
            0000       A         IFEQ   NARG-3
```

```
     A 7434 A5    34        A           BITA    0,X
                                        ENDC
     A 7436 35    02        A           PULS    A
36453 7438 26    0A    7444            BNE     BYPRT1    YES
36473 743A                              CLRFLG LDCCNC,0,X CLEAR NO-CONTROL BIT
     A 743A 34    02        A           PSHS    A
                  0001      A           IFEQ    NARG-2
                                        LDA A   0
                                        ANDA    #LDCCNC
                                        STA A   0
                                        ENDC
                  0000      A           IFEQ    NARG-3
     A 743C A6    84        A           LDA     0,X
     A 743E 84    7F        A           ANDA    #LDCCNC
     A 7440 A7    84        A           STA     0,X
                                        ENDC
     A 7442 35    02        A           PULS    A
3648                           *
3649                           *          CLEAR BY-PASS COUNTER
3650                           *
3651              7444      A BYPRT1 EQU     *
3652A 7444 0F    5A        A           CLR     BPCNTR
3653                           *
3654              7446      A BYPRT2 EQU     *
3655A 7446 97    59        A           STA     BYPSAV   SET NEW BP# INTO BP#
3656A 7448 26    01    744B            BNE     BYPRT3   NOT ZERO
3657A 744A 39                           RTS              RETURN
3658              744B      A BYPRT3 EQU     *
3659A 744B 1F    89        A           TFR     A,B
3660A 744D 3E    0025      A           LDX     #LTSTAT-1
3661A 7450 34                           ABX
3662                           *
3663                           *          IS NEW LOAD ON TIMER
3664                           *
3665A 7451                              TSTFLG LDSTMR,0,X
     A 7451 34    02        A           PSHS    A
     A 7453 86    20        A           LDAA    #LDSTMR
                  0001      A           IFEQ    NARG-2
                                        BIT A   0
                                        ENDC
                  0000      A           IFEQ    NARG-3
     A 7455 A5    84        A           BITA    0,X
                                        ENDC
     A 7457 35    02        A           PULS    A
3666A 7459 27    0C    7467            BEQ     BYPRT5   BRANCH IF NOT ON TIMER
3667A 745B                              SETFLG LDSBYP,0,X
     A 745B 34    02        A           PSHS    A
                  0001      A           IFEQ    NARG-2
                                        LDA A   0
                                        ORA     #LDSBYP
                                        STA A   0
```

```
                                  ENDC
                   0000    A      IFEQ    NARG-3
   A 745D A6       84      A      LDA     0,X
   A 745F 8A       40      A      ORA     #LDSBYP
   A 7461 A7       84      A      STA     0,X
                                  ENDC
   A 7463 35       02      A      PULS    A
3668A 7465 20      17   747E      BRA     BYPRT4
3669                          *
3670                          *      SET THE BYPASS BIT, THE TIMER BIT AND THE NC CNTRCL BIT
3671                          *
3672A 7467                    BYPRT5 SETFLG LDSBYP+LDSTMR+LDSCNC,0,X
   A 7467 34       02      A      PSHS    A
                   0001    A      IFEQ    NARG-2
                                  LDA A   0
                                  CRA     #LDSBYP+LDSTMP+LDSCNC
                                  STA A   C
                                  ENDC
                   0000    A      IFEQ    NARG-3
   A 7469 A6       84      A      LDA     0,X
   A 746B 8A       E0      A      ORA     #LDSBYP+LDSTMR+LDSCNC
   A 746D A7       84      A      STA     0,X
                                  ENDC
   A 746F 35       02      A      PULS    A
3673                          *
3674                          *      MAX TIMER VALUE INTO LOAD TIMER
3675                          *
3676A 7471 8E      0800    A      LDX     #SCNTMR-1
3677A 7474 3A                     ABX
3678A 7475 A6      84      A      LDA     0,X
3679A 7477 40                     NEGA              RESTORE LOAD TIMER COUNT IS NEGATIVE
3680A 7478 8E      0046    A      LDX     #LTTIMR-1
3681A 747B 3A                     ABX
3682A 747C A7      84      A      STA     0,X
3683                          *
3684                          *      SET BYPASS TIMER TO MAX
3685                          *
3686               747E    A BYPRT4 EQU   *
3687A 747E 86      3C      A      LDA     #BYPCNT
3688A 7480 97      5A      A      STA     BPCNTR
3689A 7482 39                     RTS
3691                          *
3692                          *  STEM 2.C - HPRLDN HIGHEST PRIORITY LOAD # SUBRTN
3693                          **************DATE CREATED: 12/07/81
3694                          **************DATE LAST MODIFIED: 12/17/81
3695                          *REGISTER CHANGED: A,X,C
3696                          *OUTPUT: LOAD # IS IN "SRLOAD"
3697                          *
3698               7483    A HPRLDN EQU   *
3699A 7483 96      07      A      LDA     PTNMBR
```

```
7435 97   8C        A          STA    SRLOAD
7437 39                        RTS
                              *
                              *SYSTEM 2.0 - LPRLDN LOWEST PRIORITY LOAD # SVBRTN
                              ************* DATE CREATED: 12/07/81
                              ************* DATE LAST MODIFIED: 02/05/82
                              * REGISTERS CHANGED: B,X
                              * OUTPUT: LOAD # IS IN "SRLOAD"
                              *
          7488      A LPRLDN EQU    *
7438 D6   05        A          LDB    NBRLDS
743A 8E   0006      A          LDX    #PTNMBR-1
743D 3A                        ABX
743E E6   84        A          LDB    0,X
7490 D7   8C        A          STB    SRLOAD
7492 39                        RTS
                              *
                              *SYSTEM 2.0 - RLYSHD - ACTUAL LOAD SHED RTN
                              **************DATE CREATED: 12/15/81
                              **************DATE LAST MODIFIED: 02/11/82
                              *
                              *INPUT PARAMETER: VARIABLE  "SRLOAD" MUST CONTAIN LOAD # TO BE SHED
                              *
          7493      A RLYSHD EQU    *
                              *SET SHED TIME COUNTER TABLE "ACTIVE"
7493 8E   004E      A          LDX    #MXSHT3-1
7496 D6   8C        A          LDB    SRLOAD
7498 3A                        ABX
7499 86   01        A          LDA    #1         "ACTIVE" VALUE
749B A7   84        A          STA    0,X
                              *CLEAR PRIORTY ACCUMULATION TABLE LOCATION FOR LOAD#
749D 8E   009D      A          LDX    #PTACCV-2
74A0 D6   8C        A          LDB    SRLOAD
74A2 58                        LSLB              TIME TWO
74A3 3A                        ABX
74A4 CC   0001      A          LDD    #1
74A7 ED   84        A          STD    0,X        CLEAR TABLE LOCATION
                              *SET OFF-COUNT TIMER
74A9 D6   8C        A          LDAB   SRLOAD
74AB 8E   0908      A          LDX    #SCFTMR-1
74AE 3A                        ABX
74AF A6   84        A          LDA    0,X        GET OFF-TIME COUNT
74B1 8E   0046      A          LDX    #LTTIMR-1
74B4 3A                        ABX
74B5 A7   84        A          STA    0,X        SET OFF-TIME COUNT IN TABLE
                              *SET APPROPRIATE CONTROL WORD BIT FLAGS
74B7 27   0D   74C6            BEQ    RLYSH1     BRANCH IF NO TIMER COUNT
74B9 8E   002E      A          LDX    #LTSTAT-1
74BC D6   8C        A          LDB    SRLOAD
74BE 3A                        ABX
```

```
7 4BF A6    84       A          LDA    0,X
74C1 8A    A1       A          ORA    #LDSCNC+LDSTMR+LDSSR
74C3 A7    84       A          STA    0,X
74C5 39                        RTS
                              *    *SET CONDITION FLAGS FOR LOAD WITH NO MINIMUN ON TIME
74C6 8E    002E     A RLYSH1  LDX    #LTSTAT-1
74C9 D6    3C       A          LDB    SRLOAD
74CB 3A                        ABX
74CC A6    84       A          LDA    0,X
74CE 8A    01       A          ORA    #LDSSR
74D0 A7    84       A          STA    0,X
74D2 39                        RTS
                              *
                              * SYSTEM 2.0 - RLYPST - ACTUAL LOAD RESTORE RTN
                              **************DATE CREATED: 12/09/81
                              **************DATE LAST MODIFIED: 02/15/82
                              *
                              * INPUT PARAMETER: VARIABLE "SRLOAD" MUST CONTAIN LOAD # TO BE RESTORED
                              *
           7403     A RLYRST  EQU    *
                              *RESET SHED OFF TIME COUNTER TABLE
7403 8E    004E     A          LDX    #MXSHT3-1
7406 D6    3C       A          LDB    SRLOAD
7408 3A                        ABX
7409 4F                        CLRA           'DEACTIVATION' VALUE
740A A7    84       A          STA    0,X
                              *INITIALIZE PRIORITY ACCUMLATION TABLE LOCATION FOR LOAD #
740C 8E    0000     A          LDX    #PTACCV-2
740F D6    3C       A          LDB    SRLOAD
74E1 58                        LSLB           TIMES TWO
74E2 3A                        ABX
74E3 CC    FFFF     A          LDD    #$FFFF
74E6 ED    84       A          STD    0,X    INTIALIZE LOCATION
                              * SET ON-COUNT TIMER
74E8 D6    3C       A          LDB    SRLOAD
74EA 8E    0900     A          LDX    #SCNTMR-1
74ED 3A                        ABX
74EE A6    84       A          LDA    0,X    GET ON-TIME COUNT
74F0 8E    0046     A          LDX    #LTTIMR-1
74F3 3A                        ABX
74F4 40                        NEGA           SET OFF TIME TO A NEGATIVE NUMBER
74F5 A7    84       A          STA    0,X    SET ON-TIME COUNT IN TABLE
                              *SET APPROPIATE CONTROL WORD BIT FLAGS
74F7 27    0F    7508          BEQ    RLYRS1 BRANCH IF NO TIMER COUNT
74F9 8E    002E     A          LDX    #LTSTAT-1
74FC D6    3C       A          LDB    SRLOAD
74FE 3A                        ABX
74FF A6    84       A          LDA    0,X
7501 8A    A0       A          ORA    #LDSCNC+LDSTMR
7503 84    FE       A          ANDA   #LDCSR
```

```
7505 A7    84     A          STA    0,X
7507 39                      RTS
                         *     *SET CONDITION FLAGS FOR NO MINIMUN TIMER CCUNT
7508 CE    092F   A RLYRS1 LDX    #LTSTAT-1
750B D6    3C     A          LDB    SRLOAD
750D 3A                      ABX
750E A6    84     A          LDA    0,X
7510 84    FE     A          ANDA   #LDCSR
7512 A7    84     A          STA    0,X
7514 39                      RTS
           0000   A          IFNE   CFPI
                         *
                               PAGE
                         * SYSTEM 2.0 - PULSE INITIATOR MEASUREMENT ROUTINE
                         *
                         ******** DATE ROUTINE CREATED 03/03/82
                         ******** DATE LAST MODIFIED 03/03/82
                         *
                         *     PULSE INITIATOR MEASUREMENT ROUTINE
                         *
                         PIMSMT EQU    *
                         *
                         *     TEST FOR ANY WRAP ARROUNDS
                         *
                                LDAA   WRAPS
                                BEQ    PIMS01      NO
                                CMPA   #1          ONE WRAP ARROUND
                                BNE    PIMS02       NO - MORE
                                BRA    PIMS04
                         *
                         *     IS THE CCUNT THE SAME
                         *
                         PIMS01 EQU    *
                                LDX    COUNT1
                                CPX    #$FFFF
                                BNE    PIMS03      NO
                         *
                         *     SET WATTS TO ZERO
                         *
                         PIMS02 EQU    *
                                CLRA
                                CLRB
                                BRA    PIMS10
                         *
                         *     COMPUTE THE DIFFERENCE
                         *
                         PIMS03 EQU    *
                                CLR    DELTAC
                                BRA    PIMS05
                         *
```

```
                        *       COMPUTE DIFFERENCE (WITH WRAP ARROUNDS)
                        *         DIFF=(WRAPS * MAX) + (MAX-COUNT1)+1
                        *
                        PIMS04 EQU    *
                               LDA    WRAPS
                               STA    DELTAC
                        PIMS05 EQU    *
                               LDD    #$FFFF
                               SUBD   COUNT1
                               STD    DELTAC+1
                        *
                        *       CONVERT PI COUNT TO WATTS
                        *         WATTS = (36000/(PICOUNT/2)*120/4
                        *
                               LSR    DELTAC        DIVIDE PI COUNT BY 2
                               RDR    DELTAC+1
                               ROR    DELTAC+2
                               LDD    #PICNST       PI CONSTANT (3600*KH*2)
                               LDX    #DELTAC+1
                               JSR    DDIV
                               LDD    DRESLT+1
                               STD    OPRND1
                               LDD    #PIFREQ       PI CLOCK FREQUENCY
                               STD    OPRND2
                               LDX    #OPRND1
                               JSR    MUL16A
                               LDD    RSULT1+2
                        PIMS10 EQU    *
                               STD    SHRTAV        STORE IN SHORT AVERAGE
                               RTS
                               ENDC
                        *
                        *        END OF USER DEFINED SUBROUTINES
             0001     A        IFNE   STEONE
                               LIBRY  1:S2STE1.TXT STE-1 COMMUNICATION ROUTINE
                        * SYSTEM 2.0 - STE-1 COMMUNICATION ROUTINE
                        *                (S2STE1.TXT)
                        *
                        *       DATE CREATED: 02/17/82
                        *       DATE LAST MODIFIED: 02/17/82
                        *
                        *       STE-1 COMMUNICATIONS SUBROUTINE
                        *
             7515     A STECOM EQU    *
 A 7515 86   0F       A        LDA    #$0F     START BYTE FOR STE COMMUNICATION
 A 7517 C6   00       A        LDB    #0       NULL CHAR FOR STROBE
 A 7519 B7   2600     A        STA    STEDAT
 A 751C F7   2700     A        STB    STESTB
                        *
                        *       SEND OUT MAJOR AVERAGE (D.P.)
```

```
                         *
751F 96      75       A          LDA     MAJAVG
7521 B7      2600     A          STA     STEDAT   MSB OF MAJOR AVERAGE
7524 F7      2700     A          STB     STESTB   STROBE
7527 96      76       A          LDA     MAJAVG+1
7529 B7      2600     A          STA     STEDAT   LSB OF MAJOR AVERAGE
752C F7      2700     A          STB     STESTB   STROBE
                         *
                         *       SEND OUT SHORT AVERAGE (D.P.)
                         *
752F 96      73       A          LDA     SHRTAV
7531 B7      2600     A          STA     STEDAT   MSB OF SHORT AVERAGE
7534 F7      2700     A          STB     STESTB   STROBE
7537 96      74       A          LDA     SHRTAV+1
7539 B7      2600     A          STA     STEDAT   LSB OF SHORT AVERAGE
753C F7      2700     A          STB     STESTB   STROBE
753F 39                          RTS              EXIT
                         *       END OF STF-1 COMMUNICATION ROUTINE
                                 ENDC
                         *
                         *        INTERRUPT ROUTINES
                         *
                                 LIBRY  2:S2INTS.TXT INTERRUPT ROUTINES
                         * SYSTEM 2.C - INTERRUPT REQUEST INTERRUPT ROUTINE
                         *                (S2INTS.TXT)
                         *
                         *
                         ******* DATE LIBRARY CREATED 11/23/81
                         ******* DATE LAST MODIFIED 02/01/82
                         *
                         *       INTERRUPT REQUEST INTERRUPT ROUTINE
                         *
             7540     A IRQINT   EQU     *
             0001     A          IFNE    CFACIA
7540 B6      2200     A          LDAA    ACSTAT   ACIA STATUS SET
7543 2A      03    7548          BPL     IRQ01    NO
7545 7E      7585     A          JMP     COMINT   TO THE COMMUNICATIONS INTERRUPT ROUTINE
                                 ENDC
                         *
             7548     A IRQ01    EQU     *
7548 B6      2001     A          LDAA    TOCR1    TIMER 0 INTERRUPT STATUS SET
754B 2A      0E    755B          BPL     IRQ04    NO
                         *
                         *       TIMER 0 INTERRUPT OF SOME SORT
                         *
             754D     A IRQ03    EQU     *
             0001     A          IFNE    CFUTIL
754D                             TSTFLG  TIMER3,TOCR1 UTILITY OVERRIDE CONTACT OPEN
A 754D 34    32       A          PSHS    A
A 754F 86    04       A          LDAA    #TIMER3
             0000     A          IFEQ    NARG-2
```

```
  A 7551 85    2001     A          BITA    TOCP1
                                   ENDC
               FFFF     A          IFEQ    NARG-3
                                   BIT A   TOCR1,
                                   ENDC
  A 7554 35    02       A          PULS    A
   A 7556 27    03   755B          BEQ     IRQ04     NO
                          *
                          *        READ TIMER 0-3
                          *
   A 7558 8?    2006     A          LDX     TOCR6
                          *
                          *        UTILITY CONTACT OPEN ROUTINE
                          *
                          ****** GOES HERE *****
                                   ENDC
               755B     A IRQ04    EQU     *
   A 755B 96    2101     A          LDAA    T1CR1     TIMER 1 INTERRUPT STATUS SET
   A 755D 2B    01   7561          BMI     IRQ06     YES
               7560     A IRQ05    EQU     *
   A 7560 3B                        RTI
               7561     A IRQ06    EQU     *
   A 7561                           TSTFLG TIMER1,T1CR1 VTOF OR PI INTERRUPT STATUS SET
  A 7561 36    02       A          PSHS    A
  A 7563 86    01       A          LDAA    #TIMER1
               0000     A          IFEQ    NARG-2
  A 7565 B5    2101     A          BITA    T1CR1
                                   ENDC
               FFFF     A          IFEQ    NARG-3
                                   BIT A   T1CR1,
                                   ENDC
  A 7568 35    02       A          PULS    A
   A 756A 27    03   756F          BEQ     IRQ07     NO
                          *
                          *        READ TIMER 1-1
                          *
   A 756C 3?    2102     A          LDX     T1CR2
               0000     A          IFNE    CFP1
                          *
                          *        PULSE TRANSITION INTERRUPT
                          *
                                   STX     CCUNT1
                          *
                          *        SET THE PI MEASUREMENT FLAG
                          *
                                   SETFLG PIMFLG,FLAG1
                                   ENDC
               756F     A IRQ07    EQU     *
   A 756F                           TSTFLG TIMER2,T1CR1 UNDERFREQUENCY / SECOND TIMER INTERRUPT
  A 756F 34    02       A          PSHS    A
```

```
      A 7571 86    02        A          LDAA   #TIMER2
                   0000      A          IFEQ   NARG-2
      A 7573 85    2101      A          BITA   TICR1
                                        ENDC
                   FFFF      A          IFEQ   NARG-3
                                        BIT A  TICR1,
                                        ENDC
      A 7576 35    02        A          PULS   A
39854 7578 27      2A   75A4            BEQ    IRQ12     NO
3986                          *
3987                          *         READ TIMER 1-2
3988                          *
3989A 757A 3E      2104      A          LDX    TICR4
3990               0000      A          IFEQ   CFRTC
3991                          *
3992                          *         SET THE SECOND FLAG
3993                          *
3994A 757D                              SETFLG SECFLG,FLAG1
      A 757D 34    02        A          PSHS   A
                   0000      A          IFEQ   NARG-2
      A 757F 96    01        A          LDAA   FLAG1
      A 7581 8A    10        A          ORA    #SECFLG
      A 7583 97    01        A          STAA   FLAG1
                                        ENDC
                   FFFF      A          IFEQ   NARG-3
                                        LDA    FLAG1,
                                        ORA    #SECFLG
                                        STA    FLAG1,
                                        ENDC
      A 7585 35    02        A          PULS   A
3995                          *
3996                          *         TEST SECOND COUNTER = 60
3997                          *
3998A 7587 86      3C        A          LDAA   #60
3999A 7589 91      57        A          CMPA   SECNTR
4000A 758B 27      04   7591            BEQ    IRQ08     SECOND COUNTER = 60
4001                          *
4002                          *         INCREMENT SECOND COUNTER
4003                          *
4004A 758D 0C      57        A          INC    SECNTR
4005A 758F 20      10   75A1            BRA    IRQ11
4006                          *
4007               7591      A IRQ08    EQU    *
4008A 7591 91      53        A          CMPA   MINCTR    TEST MINUTE COUNTER = 60
4009A 7593 26      06   759B            BNE    IRQ09
4010                          *
4011                          *         RESET MINUTE COUNTER
4012                          *
4013A 7595 86      01        A          LDA    #1
4014A 7597 97      58        A          STAA   MINCTR
```

```
4015A 7599 20   04   759F        BRA    IRQ10
4016            759B    A IRQ09  EQU    *
4017A 759B 0C   58      A        INC    MINCTR   INCREMENT MINUTE COUNTER
4018A 759D 86   01      A        LDAA   #1
4019            759F    A IRQ10  EQU    *
4020A 759F 97   57      A        STAA   SECNTR   RESET SECOND COUNTER
4021                             ENDC
4022                          *
4023            75A1    A IRQ11  EQU    *
4024            0001    A        IFNE   CFUNDR
4025A 75A1 7E   760D    A        JMP    UNDINT   UNDERFREQUENCY INTERRUPT
4026                             ENDC
4027            75A4    A IRQ12  EQU    *
4028            0001    A        IFNE   CFUTIL
4029A 75A4                       TSTFLG TIMER3,T1CR1 UTILITY OVERRIDE CONTACT CLOSED
    A 75A4 34   02      A        PSHS   A
    A 75A6 36   04      A        LDAA   #TIMER3
                0000    A        IFEQ   NARG-2
    A 75A8 B5   2101    A        BITA   T1CR1
                                 ENDC
                FFFF    A        IFEQ   NARG-3
                                 BIT A  T1CR1,
                                 ENDC
    A 75AB 35   02      A        PULS   A
4030A 75AD 27   31   7560        BEQ    IRQ05    NO
4031                          *
4032                          *  READ TIMER 1-3
4033                          *
4034A 75AF BF   2106    A        LDY    T1CR6
4035                          *
4036                          *  UTILITY CONTACT CLOSED ROUTINE
4037                          *
4038                             ENDC
4039            0000    A        IFNE   CFRTC
4040                          *
4041                          *  CHECK FOR CALENDAR CHIP INTERRUPT
4042                          *
4043                             LDA A  RTCLGC
4044                             BPL    IRQ05      NO RTC INTERRUPT
4045                             ASL A
4046                             ASL A
4047                             BPL    IRQ05      NOT ALARM INTERRUPT
4048                          *
4049                          *  SET THE SECOND FLAG
4050                          *
4051                             SETFLG SECFLG,FLAG1
4052                          *
4053                          *  TEST SECOND COUNTER = 60
4054                          *
4055                             LDAA   #60
```

```
4056                          CMPA   SECNTR
4057                          BEQ    IRQ13        SECOND COUNTER = 60
4058                    *
4059                    *     INCREMENT SECOND COUNTER
4060                    *
4061                          INC    SECNTR
4062                          BRA    IRQ16
4063                    *
4064                    IRQ13 EQU    *
4065                          CMPA   MINCTR       TEST MINUTE COUNTER = 60
4066                          BNE    IRQ14
4067                    *
4068                    *     RESET MINUTE COUNTER
4069                    *
4070                          LDA    #1
4071                          STAA   MINCTR
4072                          BRA    IRQ15
4073                    IRQ14 EQU    *
4074                          INC    MINCTR       INCREMENT MINUTE COUNTER
4075                          LDAA   #1
4076                    IRQ15 EQU    *
4077                          STAA   SECNTR       RESET SECOND COUNTER
4078                          ENDC
4079                    *
4080            7532    A IRQ16 EQU  *
4081A 7532 7E   7560    A       JMP  IRQ05
4082                    * END OF INTERRUPT REQUEST INTERRUPT ROUTINE
4084                    *
4085                    *     COMMUNICATIONS INTERRUPT ROUTINE
4086                    *
4087            0001    A     IFNE   CFACIA
4088            7535    A COMINT EQU *
4089A 7535 46                 RORA
4090A 7536 25   25  75F6      BCS    COMINP   .INPUT INTERRUPT
4091A 7538 46                 RORA
4092A 7539 24   80  754B      BCC    IRQ01    NOT INPUT OR OUTPUT - IGNORE
4093                    *
4094                    *     OUTPUT INTERRUPT
4095                    *
4096A 753B 0D   0C      A     TST    OUTCTR   TEST OUTPUT COUNTER = 0
---> Warning #1    about following line.   Most recent warning was line # 1596
4097A 753D 1027 FF37 754B     LBEQ   IRQ01    NO DATA TO GO OUT
4098                    *
4099                    *     OUTPUT NEXT CHARACTER
4100                    *
4101            75C1    A COMOT1 EQU *
4102A 75C1 34   10      A     PSHS   X
4103A 75C3 9E   8D      A     LDX    OUTIX    ADDR OF NEXT CHAR IN OUTPUT BUFFER
4104A 75C5 A6   80      A     LDAA   0,X+
4105A 75C7 37   2201    A     STAA   ACDATA
```

```
4106A 75CA 9F    3D        A         STX    OUTIX
4107                         *
4108                         *       DECREMENT THE OUTPUT COUNTER
4109                         *
4110A 75CC 0A    8C        A         DEC    OUTCTR
4111A 75CE 26    38    7608          BNE    COMIN1    STILL DATA TO TRANSFER
4112A 75D0 0F    BD        A         CLR    OUTIX     SET TO NO DATA TRANSFER
4113                         *
4114                         *       MESSAGE HAS BEEN SENT - SETUP TO RECEIVE RESPONSE
4115                         *
4116A 75D2 86    04        A         LDAA   #INLEN    LENGTH OF INPUT MESSAGE
4117A 75D4 97    81        A         STAA   INCTR
4118A 75D6 34    10        A         PSHS   X
4119A 75D8 8E    0047      A         LDX    #INBUF    ADDRESS OF INPUT BUFFER
4120A 75DB 9F    BD        A         STX    OUTIX
4121A 75DD 35    10        A         PULS   X
4122                         *
4123                         *       TURN OFF OUTPUT INTERRUPTS AND TURN ON INPUT INTERRUPTS
4124                         *
4125A 75DF 86    95        A         LDAA   #$95
4126A 75E1 B7    2200      A         STAA   ACSTAT
4127A 75E4 20    22    7608          BRA    COMIN1
4128                         *
4129                         *       COMMUNICATIONS INTERRUPT - INPUT
4130                         *
4131             75E6      A COMINP  EQU    *
4132A 75E6 0D    81        A         TST    INCTR     MORE INPUT DATA
4133A 75E8 27    20    760A          BEQ    COMIN2    NO
4134                         *
4135                         *       READ THE DATA BYTE
4136                         *
4137A 75EA 34    10        A         PSHS   X
4138A 75EC 9E    3D        A         LDX    OUTIX     INPUT BUFFER INDEX
4139A 75EE B6    2201      A         LDAA   ACDATA
4140A 75F1 A7    80        A         STAA   0,X+
4141A 75F3 9F    3D        A         STX    OUTIX
4142A 75F5 0A    81        A         DEC    INCTR     DECREMENT THE INPUT DATA COUNTER
4143A 75F7 26    0F    7608          BNE    COMIN1    STILL ROOM
4144                         *
4145                         *       TURN OFF I/O INTERRUPTS
4146                         *
4147A 75F9 86    15        A         LDAA   #$15
4148A 75FB B7    2200      A         STAA   ACSTAT
4149                         *
4150                         *       SET THE INPUT EOF FLAG
4151                         *
4152A 75FE                           SETFLG EOFFLG,FLAG1
    A 75FE 34    02        A         PSHS   A
                 0000      A         IFEQ   NARG-2
    A 7600 96    01        A         LDAA   FLAG1
```

```
      A 7602 8A    08       A          ORA     #EOFFLG
      A 7604 97    01       A          STAA    FLAG1
                                       ENDC
                   FFFF     A          IFEQ    NARG-3
                                       LDA     FLAG1,
                                       ORA     #EOFFLG
                                       STA     FLAG1,
                                       ENDC
      A 7606 35    02       A          PULS    A
4153               7608     A COMIN1 EQU     *
4154A 7608 35      10       A          PULS    X
4155               760A     A COMIN2 EQU     *
4156A 760A 7E      7548     A          JMP     IRQ01
4157                                   ENDC
4158                        * END OF COMMUNICATIONS INTERRUPT ROUTINE
4160                        *
4161                        *      UNDER-FREQUENCY INTERRUPT ROUTINE
4162                        *
4163               760D     A UNDINT EQU     *
4164A 760D 7E      7544     A          JMP     IRQ12
4166                        * END OF UNDER-FREQUENCY INTERRUPT ROUTINE
4167                        *
4168                        *      POWERFAIL INTERRUPT ROUTINE
4169                        *
4170               7610     A PWFAIL EQU     *
4171A 7610 3B                          RTI
4172                        * END OF POWERFAIL INTERRUPT ROUTINE
4174                        *
4175                        *      NON-MASKABLE INTERRUPT ROUTINE
4176                        *
4177               7611     A NMSKI  EQU     *
4178A 7611 10FF   03FF     A          STS     STKSAV
4179A 7615 12                          NOP
4180A 7616 12                          NOP
4181A 7617 10FE   03FF     A          LDS     STKSAV
4182A 761B 3B                          RTI
4183                        *      END OF INTERRUPT ROUTINES
4184                        *
4185                        *       INTERRUPT VECTORS
4186                        *
4187               0000     A          IFEQ    XXXXXX
4188A 7FFE                             ORG     IVRSET    RESET INTERRUPT
4189A 7FFE        6800     A          FDB     RESET
4190A 7FF8                             ORG     IVIRQ     IRQ INTERRUPT
4191A 7FF8        7540     A          FDB     IRQINT
4192A 7FF6                             ORG     IPFAIL    POWER FAIL INTERRUPT
4193A 7FF6        7610     A          FDB     PWFAIL
4194A 7FFC                             ORG     IVNMI     NON-MASKABLE INTERRUPT
4195A 7FFC        7611     A          FDB     NMSKI
4196                                   ENDC
4197               0000     A          IFNE    XXXXXX
```

```
4198                  ORG     $FC18
4199         CSR13    RMB     1
4200         CSR2     RMB     1
4201         TMR1     RMB     2
4202         TMR2     RMB     2
4203         TMR3     RMB     3
4204                  ENDC
4205                 END

No Errors detected during this assembly
Warnings noted during this assembly: 2     last warning is on line # 4097
2201 ACDATA    539* 3148  3162  4105  4137
2200 ACSTAT    538* 1268  1270  2457  3145  3159  3937  4126  4148
00A6 ADDRHO    787*  791  1935  1958  1974  2463
00F7 ALPMFF    416* 3005
00F3 ALEMON    415* 2873  3002
0000 BASPNL    319*  827  1819  1978  2255
001A BAUD      576* 1312
0007 BELL      291*
72A7 BINHEX   2465  2470  3297*
72BC BINHX1   3308  3311*
72C0 BINHX2   3310  3314*
72C7 BINHX3   3316  3319*
2500 BITSWS    548*
00FB BLKOFF    414*
0004 BLKTGL    413*
00FD BLNKCL    412*
0002 BLNKSW    411*
005A BPCNTR    677*  681  1213  1716  1733  1788  3652  3688
003C BYPCNT    615* 1787  3687
7444 BYPRT1   3640  3646  3651*
7446 BYPRT2   3654*
744B BYPRT3   3656  3658*
747E BYPRT4   3668  3686*
7467 BYPRT5   3666  3672*
741C BYPRTN   1901  3638*
0059 BYPSAV    573*  677  1212  1711  1721  1732  1777  1896  3639  3641  3655
0783 CDFM      167*
0001 CFACIA    305* 1663  1700  3936  4087
0000 CFPI      311*  635  1231  1288  1329  1532  1587  1621  2177  3812  3973
0009 CFRTC     315* 1186  1340  1349  3990  4039
0001 CFUNDR    313* 1456  4024
0001 CFUTIL    307* 3949  4028
0001 CFVTOF    309*  629  1219  1285  1329  1563  1587  1600  2093
7135 CHKLP1   3105* 3130
71BB CHKLP2   3107* 3128
71AD CHKSUM   1097  1138  1503  1825  2434  3098*
0090 CLIMIT    749*  753  1238  1241  1883  1885
6823 CLRMEM   1057* 1060
```

```
005C CNT        686*  687   3100  3129
005D CNT2       687*  688   3107  3127
7608 COMIN1     4111  4127  4143  4153*
760A COMIN2     4133  4155*
75E6 COMINP     4090  4131*
75E5 COMINT     3339  4088*
75C1 COMSTI     4101*
00FF COUNT1     809*  810   1224  1611  1615  2098  2104  2111
00C1 COUNT2     810*  811    812  1225  1612  2097  2105
000D CR         293*
00FD CTLCLR     376*
0002 CTLFLG     375*
71FC CVBTD      2423  3170*
7201 CVDEC1     3172* 3193
7203 CVDEC2     3173* 3177
720D CVDEC3     3177  3178*
7238 DATADC     1934  1957  1970  2209*
0000 DATASR     483*  648    867
02CD DCMDLM     142*
00A0 DCNT       769*  773   3568  3569  3578  3608
7247 DDC001     3213  3215*
7251 DDC002     3217  3223*
7259 DDC003     3226  3228*
7263 DDC004     3233  3235*
7268 DDC005     3238  3241*
7275 DDC006     3243  3249*
7279 DDC007     3252  3254*
737E DDIV       2824  2913  3537*
7338 DDIV1A     3539  3543*
739A DDIV1B     3542  3544*
7398 DDIV1C     3546  3550*
0001 DDTIDX     620*  2826
00EF DEADCL     401*
0010 DEADFG     400*  1545
00F0 DEADMX     628*  1319
00C3 DELTAC     812*  813   2113
0081 DELTAD     724*  728   2754  2756  2761  2764  2766  2814  2823  2868  3021
007E DELTAX     723*  724   2750  2752  2770  2773  2775  2819  2822  2850
D736 DEM        168*
D789 DEMORG     65*   166   167   168
0097 DIVEND     765*  766   3544  3560  3590  3612
009A DIVSOR     766*  767   3538  3541  3543  3554  3557  3559  3571  3572  3573  3576  3579  3580  3581  3589  3604
                3605  3606  3611
D380 DOSBAS     64*
C880 DOSFCB     53*
0280 DOSJMP     62*   115   116   117   118   119   120   122   123   124   125   126   127   128   129   130   131
                132   134   135   136   137   138   139   140   141   142   143   144   146   147   149   149
009D DRESLT     767*  768   2827  2919  3584  3585  3587  3600  3601  3602  3616  3617  3619  3620
00FE DROCLR     410*  2481
0001 DROFLG     409*  1939  2342
729F DTO001     3280  3282*
```

```
7286 DTOBIN   1360  3266*
0043 DVCCTL    611* 1835
0050 DVCPNL    612* 2357
0017 ECE       255*
0022 ECSS      266*
001D EDA       261*
001E EDB       262*
001F EDCE      263*
0018 EDDI      256*
0007 EDF       240*
001C EDNOR     260*
0019 EDNR      257*
0013 EDP       251*
000E EOP       246*
001A EOSK      258*
001B EOSNF     259*
000F EDW       247*
0015 EDWP      253*
0006 EEOF      239*
0004 EFB       237*
0002 EFE       235*
0003 EFIB      236*
000A EFS       243*
0014 EFSE      252*
0016 EIOC      254*
0008 EIF       241*
0001 EIFC      234*
0009 EIFN      242*
0010 EIFT      248*
000B EITS      244*
000C EIUN      245*
003F EMODFF    422*
0040 EMODON    421*
0011 ENFR      249*
0020 ENSD      264*
0005 ENSF      238*
000F ENTRCL    420*
005B ENTRCT    681*  685
0020 ENTRFG    419*
00F7 EOFCLR    380* 1818
0008 EOFFLG    379* 1420  4152
0000 EOS       295*
0021 ESFF      265*
0012 EWP       250*
CA00 EXTDOS     59*
D362 EXTTBL    111*
0000 FANA      284*
0004 FAPA      287*
0001 FASR      285*
0002 FASH      286*
0000 FLAGD     643*  649
```

```
0001 FLAG1     649*  650  1048 1397 1420 1427 1440 1440 1445 1451 1451 1457 1466 1472 1472 1598 1598
              1619  1619  1639 1639 1697 1597 1818 1818 3994 3994 4152 4152
0002 FLAG2     650*  651  1049 1082 1082 1168 1170 1411 1477 1483 1483 1488 1494 1494 1526 1526 1545
              1545  1650  1650 1661 1661 1695 1901 1801 1870 2222 2222 2746
0003 FLAG3     651*  652  1050 1939 1939 2342 2481 2481 2878 2878 3002 3004 3004 3005 3005
0004 FLAG4     652*  656  1051 1499 1508 1508 1744 1744 2119 2125 2125 2137 2215 2522 2522 2741 2933
              2938  2948  2948
0046 FMCIDE    610* 1833  2352
0020 FSDP      278*
0040 FSPV      279*
0030 FSSY      280*
0010 FSWP      277*
0003 FTCT      272*
0001 FTCS      270*
0006 FTIS      275*
0004 FTPB      273*
0005 FTRR      274*
0002 FTSJ      271*
0919 FULLSC    896* 1124  3279 3231
7483 HPRLDN   2792  2809  2853 3008 3698*
0009 HT        292*
693E IDL001   1398  1403*
69AE IDL002   1412  1419*
6938 IDL003   1421  1426*
6902 IDL004   1423  1444*
6959 IDL005   1446  1455*
69F9 IDL006   1453  1465*
6A19 IDL007   1467  1476*
6A27 IDL008   1478  1487*
6A35 IDL009   1483  1493*
6A53 IDL010   1505  1507*
6A62 IDL011   1509  1512*
6A78 IDL012   1414  1460  1514 1516 1522 1530*
6A7B IDLEND   1544*
6991 IDLOOP   1391* 1546
00C8 IMOCR0    818*  819  1284 1310
00C9 IMOCR1    819*  820  1292 1317
00CA IMOCR2    820*  824  1295 1301
00CB IMICR0    824*  825  1286 1335
00CC IMICR1    825*  826  1293
00CD IMICR2    826* 1296  1325
0047 INBUF     791*  795  1823 1826 4119
71F1 INCH     3144* 3147
0091 INCTR     795*  799  4117 4132 4142
6926 INIT1    1275* 1279
6906 INIT1A   1239  1245*
690F INIT1B   1246  1249*
6878 INITN0   1107* 1110
6881 INITN1   1113* 1116
6889 INITN2   1143* 1145
```

```
6890 INITN3   1099  1146*
685C INITNV   1091  1101*
000A INLEN     573*  795  1824  4116
00A1 IOTMOT    773*  774  1513  1515  1841
7FF6 IPFAIL    504* 4192
7546 IRQ01    3939  3942* 4092  4097  4156
754D IRQ03    3949*
755B IRQ04    3944  3951  3961*
7560 IRQ05    3964* 4030  4081
7561 IRQ06    3963  3966*
756F IRQ07    3968  3983*
7591 IRQ08    4000  4007*
7598 IRQ09    4009  4016*
759F IRQ10    4015  4019*
75A1 IRQ11    4005  4023*
75A4 IRQ12    3985  4027* 4164
7592 IRQ16    4080*
7540 IRQINT   3935* 4191
7FF8 IVIRQ     503* 4190
7FFC IVNMI     502* 4194
7FFE IVRSET    501* 4188
7231 K10K     3171  3192  3197*
00BF LDCBYP    465* 1725  3644
007F LDCCNC    467* 1730  2683  3647
00FF LDCSR     461* 2657  3801  3809
00DF LDCTMR    463* 2683
0009 LDREST    497*  665   840   841   842   853   854   855   890   891
7119 LDREST   2910  2859  3000*
0040 LDSBYP    464* 1784  2391  2675  3667  3672
0030 LDSCNC    466* 2658  2667  2889  3040  3572  3752  3800
7019 LDSHED   1799  2847  2866*
0001 LDSSR     459* 2396  2500  2517  2545  2667  2577  2698  2794  2905  2939  2955  2985  3010  3037  3752  3769
0020 LDSTMR    462* 1727  2659  2667  3645  3665  3672  3752  3900
0097 LDTBL     661*  665   839   840   841   342   953   954   855
00FF LDTCLR    393* 1483
0091 LDTFLG    392* 1477  1661
629D LDTM1    2542* 2681  2714  2727
6EAF LDTM1A   2553*
659F LDTM1B   2650  2663*
6ECD LDTM1C   2547  2671*
6EEB LDTM1D   2660  2669  2696*
6F02 LDTM1E   2675  2683*
6F3B LDTM2    2643  2730*
6EF8 LDTM3    2579  2685  2697*
6F21 LDTM3A   2694  2599  2716*
6F12 LDTM3B   2705  2708*
6EF6 LDTM4    2692  2695*
6599 LDTMCK   1479  2639*
00A5 LENHLD    786*  787  1924  1930  2467
000A LF        234*
CD00 LINBUF     69*
```

```
7483 LPRLON    2303  3709*
7137 LRST10    3003  3007*
713A LRST11    3009* 3015
7154 LRST12    3011  3021*
7160 LRST13    3026* 3038  3041
716C LRST14    3030  3032*
71A8 LRST15    3053  3057*
7158 LRST17    3022*
7023 LSHD10    2872*
7027 LSHD11    2874* 2887  2891
7039 LSHD12    2376  2880*
704E LSHD13    2386  2888*
705C LSHD14    2390  2893*
7079 LSHD15    2903  2907*
70A2 LSHD16    2914  2928*
70C7 LSHD20    2743  2948*
70D8 LSHD21    2951  2955*
7112 LSHD22    2984  2987*
7118 LSHD23    2972  2973  2992*
0037 LTIMPT     853* 2993  2915  2955  3043
0011 LTPRTY     892* 2538
002F LTSTAT     342* 1722  1780  2387  2499  2516  2544  2653  2663  2671  2697  2793  2804  2838  2354  2884  2883
               3036  3039  3642  3660  3748  3756  3796  3805
0047 LTTIMR     854* 2645  2686  3680  3743  3790
001F LTVAL      341* 2907  2966  2976
0075 MAJAVG     716*  717  1249  1767  2145  2148  2768  3903  3906
00C5 MAJCTR     813*  814  1229  2135  2160
001E MAJSET     624* 1228  2159
00FB MAVCLR     397*
0004 MAVFLG     396*
0008 MAXLDT     493*  497  1075  1104  1111  1163  2364
081A MAXLIM     900* 1126  1875  1877
000F MAXOFF     618* 2800
03FF MAXRAM     477* 1059  1959
8E00 MEMLIM      27*
0058 MINCTR     669*  673  1182  4008  4014  4017
7254 MUL002    3365  3367*
72F1 MUL004    3372  3374*
72CC MUL16A    3353* 3393  3418
001E MYOFCT     519*
004F MYSHT3     355* 2701  2716  2796  3726  3773
0005 NBPLDS     656*  657  1152  1160  1174  1794  2504  2580  2620  2331  3014  3710
0006 NBPPLS     657*  661  1176  2507  2534  2640  2372  3029
7611 NMSKI     4177* 4195
00A2 NOANSW     774*  778  1521  1842
7191 NOLUP2    3119  3123*
002F NOOCLR     403*
0020 NOOURY     402* 1526  1695
0800 NOVRAM     480*  878
0092 NOWRDS     753*  757  2115  2940  2949  2971
```

```
0321 NVCKSM    913*  915 1098 1139 1504
0809 NVCODE    880*  915 1090 1095 1102 1136 1501
0001 NVFLAG    303*  479  482 1087 1140
00EF NVKCLR    435* 1508
0010 NVKFLG    434* 1499 1744
0021 NVLEN     215* 1096 1137 1502
1000 NVSAVE    341* 1141
0780 ODEH      165*
0087 OLDOLD    723*  733 2755 2757
0084 OLDOLX    728*  729 2751 2753 2777
0041 OPCOPR    605* 1927
00F1 OPCOUP    603* 1348
0040 OPCSPR    604* 1921
00A2 OPCXFR    606* 1945
0067 OPRND1    700*  701 3390 3392 3413 3414 3417
0069 OPRND2    702*  703 3391 3416
0043 OPGLST     26*
71FF OUT1     3157* 3161
0032 OUTBUF    300*  804 1275
71ED OUTCH    2455  3155*
000C OUTCTR    304*  305 2442 4096 4110
0C3D OUTTX     305*  809 2440 4103 4106 4112 4120 4138 4141
000A OUTLEN    574*  804 1274 2432 2441
00EF OVRCLR    414*
0010 OVRRST    417* 3004
0000 P        3349* 3356 3360 3367 3374
0300 PARTBL     63*   69   70   71   72   73   74   75   76   77   78   79   80   81   82   83   84
                85    86   87   88   89   90   91   92   93   94   95   96   97   98   99  100  101
               102   104  105  106  111
0077 PEAKAV    717*  718 1712 1913 2152 2154
00F7 PIMCLR    433*
0008 PIMFLG    432*
6368 PLDP     1413  1759*
6B72 PLDP1    1763  1766*
6B98 PLDP2    1778  1790*
6B23 PLDP3    1792* 1799
6BA4 PLDP4    1774  1798*
6BA9 PLDP5    1769  1795 1801*
00F7 PLDPCL    399* 1801
0008 PLDPFG    398* 1169 1411 2746
0006 PLDPOF    617* 1762
6CF2 PNLDRY   1447  2236*
0003 PNLXT     443*
0001 PNLXT1    441*
0002 PNLXT2    442*
6E22 PRTB1A   2554  2556*
6E36 PRTB1B   2565  2567*
60F6 PRTBP1   2535* 2557 2568
6E26 PRTBP2   2546  2559*
6E3A PRTBP3   2537  2570*
000F PTACCV    340* 2543 2559 2597 2601 3732 3779
```

```
6DF2 PTRLUP    1469   2533*
0007 PTN1BR     339*  1154   2509   2589   2609   2333   2374   3009   3026   3699   3711
007F PUPCLR     388*  1472
0030 PUPFLG     387*  1466   1593
7610 PWFAIL    4170*  4193
00FB PWPCLR     378*  1440
6CD5 PWRD4A    2153   2155*
6C77 PWRDG     1427   2092*
6C27 PWRDG1    2099   2110*
6C89 PWRDG2    2106   2112*
6CA5 PWRDG3    2120   2126*
6CC1 PWRDG4    2136   2143*
6CDC PWRDG5    2138   2214*
6CE7 PWRDG6    2216   2221*
0004 PWRFLG     377*  1427   1619
0002 Q         3350*  3357   3361   3368   3375
0009 QAPP       203*
0013 QCLSRF     222*
0014 QCRF       217*
0007 QDEL       206*
000A QDIRI      209*
0003 QDIRT      210*
0023 QFDD       227*
0020 QFLU       224*
001C QFRF       223*
0000 QFREE      199*
0024 QIDD       228*
0021 QILU       225*
0010 QLOGD      213*
0011 QLOGC      214*
0015 QORF       218*
0016 QPRF       219*
000D QRAFCB     212*
0025 QRDD       229*
0008 QREN       207*
0022 QRLU       226*
0017 QRRF       220*
0008 QRYCKS     583*  1827   2435
000F QRYCLR     384*  1451
0005 QRYDAT     586*  2425   2427
0001 QRYDC      581*  2358
0003 QRYDXF     533*  2466   2471
0000 QRYFC      580*  2353
0020 QRYFLG     393*  1445   1697
0003 QRYLDN     584*  2370
00A3 QRYLIX     779*   782   1255   2362   2371
00A4 QRYMOD     782*   786   1256   2404   2413
0082 QRYMSG     799*   800   2339   2433   2454
0007 QRYNU      587*
0002 QRYOPC     532*  1946   2412   2477
0004 QRYSTC     585*  2400
```

```
0004 QSD4R      203*
0001 QSD4W      200*
0006 QSRC       205*
0005 QSREAD     204*
0012 QSSR       215*
0013 QSSW       216*
0003 QSWC       202*
0002 QSWRIT     201*
000C QTYPF      211*
0013 QWRF       221*
0004 R         3351* 3355  3359  3363  3364  3366  3370  3371  3373  3377  3378
0000 RAMADR     472*  477   483   489  1055
00FD RAPCL2     427*
0002 RAPFL3     428*
1800 RECALL     340* 1088  1506
0006 RELMAS     761*  765  1064  1070  1072  1077  2712  2713  2725  2726  2730  2934  2935
00FE REPCL2     374*
0001 REPFLG     373*
6800 RESET     1027* 4189
65CE RESP01    1329* 1334  1836  1847  1849
65CF RESP02    1323  1831*
6C10 RESP05    1365  1871  1882*
6C17 RESP06    1876  1878  1884  1886*
6C28 RESP07    1894  1897  1905*
6C32 RESP08    1908  1914*
6C33 RESP10    1920*
6C3D RESP11    1922  1926*
6C45 RESP12    1925  1931*
6C59 RESP13    1928  1944*
6C5E RESP14    1946  1954*
6C6E RESP15    1960  1968*
6C19 RESP6A    1859  1892*
00FE RHEX01     359*  374   393   410   427   461
00FD RHEX02     360*  376   395   412   429
00FB RHEX04     361*  378   397   414   431
00F7 RHEX08     362*  380   399   416   433
00EF RHEX10     363*  382   401   418   435
00DF RHEX20     364*  384   403   420   463
00BF RHEX40     365*  386   405   422   465
007F RHEX80     366*  388   437   454   467
6E2F RLYINT    1066* 1076
2800 RLYPRT     557* 1078  2731  2936
7508 RLYRS1    3795  3805*
7403 RLYRST    1790  2680  3057  3771*
74C6 RLYSHI    3747  3756*
7493 RLYSHO    1073  2519  2928  3724*
5800 ROMADR     486*  487
0055 RSETPK     599* 1907
0003 RSPADR     593* 1933  1956
0005 RSP3P      594* 1892
6934 RSPHNO    1422  1814*
```

```
0006 RSPPKP    595*  1906
0003 RSPSET    592*  1853
0068 RSULT1    704*   705  3397  3400  3402  3404  3406  3422  3425  3427  3429  3431
734C RTABLE   2721   2930  3449*
3000 RTCD0     561*
0020 RTCAIF    455*
007F RTCCLR    454*
002F RTCRGA    569*
0029 RTCSET    453*
300A RTRFGA    552*
3008 RTRFGB    563*
300C RTRFGC    564*
3000 RTRFGD    565*
0078 RUNSUA    719*   723  2359  2901  2925  2363  3017  3019  3019  3022  3051
0065 SAVEA     705*   706  3172  3176  3183  3189  3415
0071 SAVEB     706*   715
0067 SAVEX     701*   702  3179  3182  3188  3194  3269  3270  3275
0069 SAVEX1    703*   704  3181  3189
0803 SCFTMR    390*  1770  3740
0801 SCLDAD    382*   889   890   891  1106
0801 SCNTMR    383*  3676  3737
0811 SCPRTY    391*   892  1155  2380
00FF SECCLR    392*  1639
0010 SECFLG    381*  1397  3794
0057 SECNTR    665*   669  1181  1560  1761  3399  4004  4020
0073 SETPT     718*   719  1245  1249  1766  1887  2760  2769
6033 SHAL1    2500*  2505
6DC4 SHAL1A   2501   2507*
6DC8 SHAL2    2509*  2518  2520
6DCF SHAL3    2512*
6DF7 SHAL4    2511   2522*
0001 SHARED    323*  2784
6DAL SHDALL   1459   2495*
6F3E SHDPST   1490   2739*
0001 SHEX01    348*   373   392   409   426   441   447   459
0002 SHEX02    349*   375   394   411   428   442   448
0004 SHEX04    350*   377   396   413   430   449
0008 SHEX08    351*   379   398   415   432
0010 SHEX10    352*   381   400   417   434
0020 SHEX20    353*   383   402   419   455   462
0040 SHEX40    354*   385   404   421   464
0080 SHEX80    355*   387   436   453   466
0055 SHFTRG    695*   700  3101  3102  3110  3115  3124  3131
0073 SHRTAV    715*   716  1250  2121  2128  2131  2144  2419  2759  3912  3915
0001 SHRTPN    320*  1251  2237  2332
0094 SNAP      757*   761  2941  2950  2970
6E48 SORT1    2581   2584* 2627
6E52 SORT2    2589*  2622
6E86 SORT3    2607   2618*
6E98 SORT4    2625   2628*
0020 SP        295*
```

```
6D13 SOSM01   2365  2367*
6D48 SOSM02   2407  2409*
6D56 SOSM03   2431* 2482
6D84 SOSM10   2344  2462*
6D9C SOSM11   2468  2474*
6D9F SOSM12   2473  2476*
6D27 SOSM1A   2383  2386*
6D37 SOSM1B   2392  2395*
6D3D SOSM1C   2385  2394  2397  2399*
6CF2 SOSMTP   2337*
6F57 SR1      2747  2750*
7015 SR10     2356  2359*
6F4C SR1A     2742  2746*
6F75 SR1B     2762  2766*
6F77 SR1C     2765  2768*
6F95 SR1D     2771  2775*
6F87 SR1E     2774  2777*
6F8F SR2      2779  2782*
6F71 SR3      2790  2793*
6FC2 SR4      2795  2801  2806  2813*
6FC9 SR5      2816  2819*
7000 SR6      2815  2850*
6FDD SR7      2820  2829  2831*
6FF1 SR7C     2833* 2843
6FFC SR8      2840  2847*
7005 SR9      2851  2853*
008C SRLOAD    737*  741  1065  1067  1069  1074  1218  1771  1776  1781  1792  1793  2497  2498  2500  2502  2503
              2515  2517  2535  2536  2539  2545  2549  2560  2641  2642  2646  2654  2664  2672  2687  2698  2700
              2709  2717  2722  2794  2797  2805  2837  2839  2855  2883  2885  2889  2894  2908  2916  2931  2943
              3010  3035  3037  3040  3044  3700  3714  3727  3733  3739  3749  3757  3774  3780  3786  3797  3806
0080 SRSAVE    741*  745  2944  2956  2967  2977  3012  3013
00FD SRTCLR    395* 1494
0002 SRTFLG    394* 1488  1650  2222
00FF SSDCLR    427* 2948
0001 SSDFLG    426* 2137  2215  2741  2938
7344 STABLE   1066  2708  3440*
03FD STACK     489*  872  1032  1033  1043  1044
6800 STADDR    487* 1013  1025
680B START    1039*
7515 STECOM   2165  3895*
2600 STEDAT    552* 3898  3904  3907  3913  3916
0001 STEONE    299* 2161  3885
2700 STESTB    553* 3899  3905  3908  3914  3917
03FE STKSAV    373* 4178  4181
007F STRTCL    437*
0080 STRTUP    435* 2119  2125
00FB SYRFLG    431*
C000 SYSBAS     25*   53    55    59    60    61    62    63    64    65
0004 SYSFLG    430* 2522
CA00 SYSSTK     55*
2000 TOCR0     510* 1302  1311
```

| | | | | | | | | | | | | | | | | | | |
|---|---|---|---|---|---|---|---|---|---|---|---|---|---|---|---|---|---|---|
| 2001 | TOCR1 | 511* | 1300 | 1309 | 1318 | 3943 | 3950 | | | | | | | | | | | |
| 2002 | TOCR2 | 515* | 1313 | | | | | | | | | | | | | | | |
| 2003 | TOCR3 | 516* | | | | | | | | | | | | | | | | |
| 2004 | TOCR4 | 517* | 1320 | | | | | | | | | | | | | | | |
| 2005 | TOCR5 | 513* | | | | | | | | | | | | | | | | |
| 2006 | TOCR6 | 519* | 1304 | 3955 | | | | | | | | | | | | | | |
| 2007 | TOCR7 | 520* | | | | | | | | | | | | | | | | |
| 2100 | TICR0 | 524* | 1326 | 1336 | | | | | | | | | | | | | | |
| 2101 | TICR1 | 523* | 1324 | 1334 | 1354 | 1613 | 3962 | 3967 | 3984 | 4023 | | | | | | | | |
| 2102 | TICR2 | 529* | 1338 | 1614 | 3972 | | | | | | | | | | | | | |
| 2103 | TICR3 | 531* | | | | | | | | | | | | | | | | |
| 2104 | TICR4 | 532* | 1356 | 3989 | | | | | | | | | | | | | | |
| 2105 | TICR5 | 533* | | | | | | | | | | | | | | | | |
| 2106 | TICR6 | 534* | 1328 | 4034 | | | | | | | | | | | | | | |
| 2107 | TICR7 | 535* | | | | | | | | | | | | | | | | |
| 7354 | TADD | 2370 | 2904 | 2964 | 3023 | 3054 | 3470* | 3594 | | | | | | | | | | |
| 68C8 | TBINIT | 1155* | 1164 | | | | | | | | | | | | | | | |
| 68D0 | TBINTL | 1158 | 1161* | | | | | | | | | | | | | | | |
| CD30 | TCA | 61* | | | | | | | | | | | | | | | | |
| 733C | TDIV | 3553* | | | | | | | | | | | | | | | | |
| 7330 | TDIV1 | 3549 | 3551 | 3563* | | | | | | | | | | | | | | |
| 7308 | TDIV2 | 3573* | 3582 | | | | | | | | | | | | | | | |
| 7302 | TDIV3 | 3577 | 3584* | | | | | | | | | | | | | | | |
| 7303 | TDIV31 | 3583* | 3609 | | | | | | | | | | | | | | | |
| 7350 | TDIV4 | 3592 | 3598* | | | | | | | | | | | | | | | |
| 738D | TDIV5 | 3596 | 3600* | | | | | | | | | | | | | | | |
| 7416 | TDIV6 | 3514 | 3621* | | | | | | | | | | | | | | | |
| 7419 | TDIV8 | 3574 | 3624* | | | | | | | | | | | | | | | |
| 7346 | TDIVA | 3555 | 3559* | | | | | | | | | | | | | | | |
| 7348 | TDIVB | 3551 | 3560* | | | | | | | | | | | | | | | |
| 005E | TEMP | 688* | 689 | 3111 | 3112 | 3125 | 3209 | 3222 | 3230 | 3231 | | | | | | | | |
| 005F | TEMP1 | 689* | 690 | 2509 | 2510 | 2512 | 2541 | 2553 | 2564 | 2573 | 2585 | 2590 | 2610 | 2618 | 2832 | 2834 | 2942 | 2873 |
| | | 2375 | 2380 | 2974 | 2987 | 3025 | 3027 | 3029 | 3032 | 3114 | 3118 | 3210 | 3243 | 3256 | 3257 | 3259 | | |
| 0060 | TEMP2 | 690* | 691 | 2543 | 2574 | 2587 | 2619 | 2621 | | | | | | | | | | |
| 0061 | TEMP3 | 691* | 692 | 2575 | 2593 | 2598 | 2614 | | | | | | | | | | | |
| 0062 | TEMP4 | 692* | 693 | 2576 | 2595 | 2602 | 2612 | 2897 | 2922 | 2959 | 3047 | | | | | | | |
| 0063 | TEMP5 | 693* | 694 | 2577 | 2616 | 2624 | 2626 | 2900 | 2923 | 2961 | 3049 | | | | | | | |
| 0064 | TEMP6 | 694* | 695 | 2924 | 2962 | 3059 | | | | | | | | | | | | |
| 0320 | TFACTR | 909* | 1132 | 2912 | | | | | | | | | | | | | | |
| 0001 | TIMER1 | 447* | 3967 | | | | | | | | | | | | | | | |
| 0002 | TIMER2 | 448* | 3994 | | | | | | | | | | | | | | | |
| 0004 | TIMER3 | 449* | 3950 | 4029 | | | | | | | | | | | | | | |
| 6A3A | THCKX1 | 1605 | 1635* | | | | | | | | | | | | | | | |
| 6931 | TMRC10 | 1712 | 1715* | | | | | | | | | | | | | | | |
| 6958 | TMRC11 | 1707 | 1738* | | | | | | | | | | | | | | | |
| 6951 | TMRC12 | 1729 | 1732* | | | | | | | | | | | | | | | |
| 6A38 | TMRCHK | 1339 | 1359* | | | | | | | | | | | | | | | |
| 6A3E | TMRCK3 | 1562 | 1588* | | | | | | | | | | | | | | | |
| 6AC5 | TMRCK4 | 1594 | 1644* | | | | | | | | | | | | | | | |
| 6A05 | TMRCK5 | 1646 | 1655* | | | | | | | | | | | | | | | |
| 6A55 | TMRCK6 | 1657 | 1667* | | | | | | | | | | | | | | | |

```
6B0D TMRCK7   1669  1671  1673  1675  1677  1679  1681  1683  1685  1691*
6826 TMRCK8   1697  1705*
682E TMRCK9   1713* 1717
5A9C TMRCKX   1599* 1651  1662  1696  1698  1714  1734  1740  1745
7359 TSUB     2702  2926  3052  3498* 3591  3613
028F UCTBL     120*
002F UNDCLR    385*
0040 UNDFLG    393* 1457
760D UNDINT   4925  4163*
002F USRCLR    405*
0040 USRMOD    404* 1082  1870
008E USRSET    745*  749  1864  1869
71AC UTLOVR   1531  3070*
0007 VTOFCT    314*  318  1227  1604  1607
0002 VTOFMX    633* 1726  1606
00C1 WRAPS     811*
005C WRKBF     585*  686  2422  2424  2426  3407  3432
0005 XBAK      159*
0003 XBAS      155*
0000 XBIM      153*
001F XCS       186*
001C XCT       185*
0004 XCTL      157*
0005 XDAT      159*
0026 XDS       190*  191  192   193   194   195
0001 XES       173*
0000 XFC       172*
081E XFCTRI    205* 1130  2146
081C XFCTRS    204* 1129  2129
0009 XFF       176*
0003 XFN       175*
0007 XFUR      160*
0000 XFS       178*
000F XFSU      179*
000C XFT       177*
0010 XLSU      180*
0027 XJS       192*
0026 XMT       191*
7319 XPFLT1   3399  3403  3405*
733F XPFLT2   3424  3423  3430*
72F9 XPFLT3   2130  2147  3388*
0029 XPS       194*
0028 XPT       193*
0010 XRBA      184*
0014 XRFS      182*
0017 XRHIW     133*
0021 XRID      189*
0020 XRIF      183*
0020 XRIM      187*
002A XSDD      195*
0009 XSPART    162*
```

```
0002 XSRC      155*
0012 XSUC      181*
0008 XTMP      161*
0001 XTXT      154*
0002 XUN       174*
0000 XXXXXX    296*  471   474   473   537   541   877  1261  1358  1392  1404  1430  1747  2167  2343  2346  2446
              4187  4197
030C YABORT     77*
030D YABRTV     78*
0308 YBSCHR     73*
0324 YCCOL      93*
0329 YCFLG      98*
0323 YCLINE     92*
0317 YCPORT     82*
0349 YDATE     105*
0327 YDCMDA     96*
0313 YDEPTH     84*
0303 YDLINE     74*
0315 YECHOC     81*
031F YEJECT     83*
0328 YFRSHT     97*
031E YHCFLG     87*
0308 YLCNT      76*
0304 YLINAD     71*
0306 YLINPT     72*
032A YLOADF     99*
030A YLPAUS     75*
0302 YMEMAX     70*
0300 YMONV      69*
0330 YMSTAT    104*
031D YNULLS     86*
032E YOFSET    102*
0326 YOSHT      95*
0319 YPPORT     88*
0320 YPPPAS     89*
0321 YSYSBR     90*
032C YTADDR    101*
032B YTAFLG    100*
0359 YTIME     106*
0325 YUCSHT     94*
031C YWIDTH     85*
0322 YWRKDP     91*
02A3 ZADDX     128*
029A ZANCHK    125*
0290 ZCOLDS    115*
02DC ZCRLF     147*
008A ZCXCNT    733*  737  2779  2782
0290 ZDIE      176*
0280 ZEXCHD    143*
0291 ZFLSPC    122*
```

```
D294 ZGCHAR  123*
D2C4 ZGETCH  139*
D2A0 ZGETLIN 127*
D297 ZGNCHR  124*
D30F ZHCINIT  79*
D312 ZHCOUT   80*
D289 ZINCH   118*
D2B5 ZLINEI  134*
D2D3 ZLOAD   144*
D2B8 ZLP     135*
D28C ZMON    119*
D2D9 ZNAMEJ  146*
D2BE ZOUTCH  137*
D286 ZOUTEE  117*
D2AF ZOUTHA  132*
D2AC ZOUTHX  131*
D2A6 ZOUTST  129*
D2BB ZPEEK   136*
D2C1 ZPUTCH  138*
D2F2 ZRDTIM  143*
D2CA ZRESTR  141*
D2C7 ZSTAT   140*
D2DF ZSTEXT  148*
D2A9 ZTYPDE  130*
D283 ZWARMS  116*
```

What is claimed is:

1. A method for controlling delivery of elecrical energy from a power line to an establishment having a plurality of electrical loads in order to maintain the total power delivered to the electrical loads close to a power limit, the electrical loads including a plurality of controlled loads which can be electrically connected to and disconnected from the power line, partially in accordance with user-selected priorities attributed to respect ones of the controlled loads, by means of a control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:

(a) for each of said controlled loads, including a first one of said controlled loads, 1. measuring the value of a variable associated with a cumulative effect of operation or non-operation of that controlled load.
2. computing a cumulative priority value for that controlled load, said cumulative priority value being a function of both (i) said user-selected priority associated with that controlled load, and (ii) said value of said variable; and (b) making a decision whether to shed or restore said first controlled load on the basis of whether said first controlled load is less than or exceeds the the value of said cumulative priority value of certain other cumulative priority values of other ones of said controlled loads.

2. The method of claim 1 wherein said variable is an amount of time that said first controlled load has been shed.

3. The method of claim 2 wherein said cumulative priority value is proportional to the product of said user-selected priority and said value of said variable.

4. The method of claim 1 wherein said variable is an amount of time that said first controlled load has been restored.

5. The method of claim 4 wherein said cumulative priority value is negative and is proportional to the product of said user-selected priority and said value of said variable.

6. The method of claim 1 wherein said variable is an amount of time that a control element associated with said first controlled load has been in a predetermined condition.

7. The method of claim 6 wherein said control element includes a thermostat.

8. The method of claim 6 wherein said variable is an amount of time that said control element has been on while said first load has been off.

9. A method for controlling delivery of electrical energy from a power line to an establishment having a plurality of electrical loads in order to maintain the total power delivered to the electrical loads close to a power limit, the electrical loads including a plurality of controlled loads which can be electrically connected to and disconnected from the power line, partially in accordance with user-selected priorities attributed to respective ones of the controlled loads, by means of a control system, the control system including a plurality of load switching means for controllably connecting the controlled loads to and disconnecting the controlled loads from the power line, the control system also including power measuring means for measuring power delievered from the power line to the electrical loads, said method comprising operating a processor to effect the steps of:

(a) computing and storing a power consumption number for any one of the controlled loads when that controlled load is electrically disconnected from the power line or is electrically connected to the power line;

(b) obtaining a minor average that represents the average power consumption of the establishment during a first period of time prior to the present time;

(c) obtaining a major average that represents the average power consumption of the establishment during a second period of time prior to the present time, said second period of time being substantially greater than said first period of time;

(d) comparing said major average to said power limit, and comparing said minor average to said power limit;

(e) measuring the values of a variable associated with a cumulative effect of operation or non-operation of respective ones of said controlled loads;

(f) computing a cumulative priority value for each of said controlled loads, respectively, each cumulative priority value being a function of both said user selected priority associated with the controlled load for which that cumulative priority value is computed and said measured value of the variable associated with the controlled load for which that cumulative priority value is computed;

(g) electrically disconnecting the one of said controlled loads presently connected to the power line and having the lowest cumulative priority value from the power line if both said major average and said minor average are greater than said selected power limit;

(h) repeating steps (b), (c), (d), and (e) until either said major average or said minor average is less than said selected power limit;

(i) computing a first power availability number representative of the difference between the selected power limit and said major average; and (j) comparing a stored power consumption number of the one of said controlled loads not presently electrically connected to the power line and having the highest cumulative priority value with said first power availability number and electrically connecting that controlled load to the power line if the power consumption of that controlled load is less than said first power availability number and both said major average and said minor average are less than said power limit.

10. The method of claim 9 including, if said minor average is above said power limit and said major average is below said power limit, computing a first running sum of the amounts by which said minor average exceeds said power limit and also computing a second running sum of the amounts by which said minor average is less than said power limit over a predetermined time interval, determining whether electrically disconnecting the one of said controlled loads presently connected to the power line and having the lowest cumulative priority value from the power line would increase said second running sum enough to ensure that said second running sum would exceed said first running sum for at least a predetermined amount of time, and if the determination is affirmative, electrically disconnecting said controlled load having the lowest cumulative priority value from the power line.

11. The method of claim 9 wherein said power limit is a floating power limit and including the steps of determining if the present value of said power limit is a fixed lower power limit, and if it is not, then decreasing said power limit by a first predetermined amount before computing said shed running sum or said restore running sum.

12. The method of claim 9 including the steps of determining if the present value of said power limit is a fixed upper power limit, and if it is not, then increasing said power limit by a second predetermined amount before computing said shed running sum or said restore running sum.

13. The method of claim 11 wherein said first predetermined amount is selected to cause said power limit to decrease at a rate that accurately adjusts said power limit in accordance with seasonal changes in average power usage by the user so that substantial money-saving energy curtailment occurs during seasonal periods of relatively low power-usage.

14. The method of claim 12 wherein said second predetermined amount is selected to cause said power limit to increase at a rate that is great enough to avoid undue inconvenience to the user during unexpected short term increases in the daily energy usage by the user.

15. The method of claim 9 wherein said obtaining of said minor average includes attributing substantially more weight to the more recent power readings in said first period of time than to power readings nearer to the beginning of said first period of time.

16. The method of claim 9 wherein said obtaining of said major average includes attributing substantially more weight to the more recent values of said minor average in said second period of time than to said earlier values of said minor average.

17. A system for controlling delivery of electrical energy from a power line to an establishment having a plurality of electrical loads in order to maintain the total power delivered to the electrical loads close to a power limit, the electrical loads including a plurality of controlled loads which can be electrically connected to and disconnected from the power line, partially in accordance with user-selected priorities attributed to respective ones of the controlled loads, by means of a control system, the control system comprising in combination:

(a) a plurality of load switching means for controllably connecting the controlled loads to and disconnecting the controlled loads from the power line;

(b) power measuring means for measuring power delivered from the powerl ine to the electrical loads;

(c) means for measuring the value of a variable associated with a cumulative effect of operation or non-operation of each of said controlled loads, respectively;

(d) means for computing a cumulative priority value for each of said controlled loads, respectively, said cumulative priority value being a function of both (i) said user-selected priority associated with that controlled load and (ii) said value of said variable for that controlled load; and (e) means for making a decision whether to shed or restore a first one of said controlled loads on the basis of whether the value of the cumulativepriority value of said first controlled load exceeds or is less than the cumulative priority values of certain other ones of said controlled loads.

18. The system of claim 17 wherein said variable is an amount of time that said first controlled load has been shed.

19. The system of claim 18 wherein said cumulative priority value is proportional to the product of said user-selected priority and said value of said variable.

20. The system of claim 17 wherein said variable is an amount of time that said first controlled load has been restored.

21. The system of claim 20 wherein said cumulative priority value is negative and is proportional to the product said user-selected priority and said value of said variable.

22. The system of claim 17 wherein said variable is an amount of time that a control element associated with said first controlled load has been in a predetermined condition.

23. The system of claim 22 wherein said control element includes a thermostat.

24. The method of claim 22 wherein said variable is an amount of time that said control element has been on while said first load has been off.

25. A system for controlling delivery of electrical energy from a power line to an establishment having a plurality of electrical loads in order to maintain the total power delivered to the electrical loads close to a power limit, the electrical loads including a plurality of controlled loads which can be electrically connected to and disconnected from the power line, partially in accordance with user-selected priorities attributed to respective ones of the controlled loads, by means of a control system, the control system comprising in combination:

(a) a plurality of load switching means for controllably connecting the controlled loads to and disconnecting the controlled loads from the power line;

(b) power measuring means for measuring power delievered from the power line to the electrical loads;

(c) means for computing and storing a power consumption number for any one of the controlled loads when that controlled load is electrically disconnected from the power line or is electrically connected to the power line;

(d) means for obtaining a minor average that represents the average power consumption of the establishment during the first period of time prior to the present time;

(e) means for obtaining a major average that represents the average power consumption of the establishment during a second period of time prior to the present time, said second period of time being substantially greater than said first period of time;

(f) means for comparing said major average to said power limit, and comparing said minor average to said power limit;

(g) means for measuring the values of a variable associated with a cumulative effect of operation or non-operation of respective ones of said controlled loads;

(h) means for computing a cumulative priority value for each of said controlled loads, respectively, each cumulative priority value being a function of both said user selected priority associated with the controlled load for which that cumulative priority value is computed and the measured value of the variable associated with the controlled load for which that cumulative priority value is computed;

(i) means for electrically disconnecting the one of said controlled loads presently connected to the power line and having the lowest cumulative priority value from the power line if both said major average and said minor average are greater than said selected power limit;

(j) means for computing a first power availability number representative of the difference between the selected power limit and said major average; and (k) means for comparing a stored power consumption number of the one of said controlled loads not presently electrically connected to the power line and having the highest cumulative priority value with said first power availability number and electrically connecting that controlled load to the power line if the power consumption of that controlled load is less than said first power availability number and both said major average and said minor average are less than said power limit.

26. The system of claim 25 including, if said minor average is above said power limit and said major average is below said power limit, means for computing a first running sum of the amounts by which said monor average exceeds said power limit and also means for computing a second running sum of the amounts by which said minor average is less than said power limit over a predetermined time interval, means for determining whether electrically disconnecting the one of said controlled loads presently connected to the power line and having the lowest cumulative priority value from the power line would increase said second running sum enough to ensure that said second running sum would exceed said first running sum, for at least a predetermined amount of time, and means for electrically disconnecting said controlled load having the lowest cumulative priority value from the power line if the determination is affirmative.

27. The system of claim 25 wherein said power limit is a floating power limit and including means for determining if the present value of said power limit is a fixed lower power limit, and if it is not, then decreasing said power limit by a first predetermined amount before said computing of said shed running sum or said restore running sum.

28. The system of claim 27 wherein said first predetermined amount is selected to cause said power limit to decrease at a rate than accurately adjusts said power limit in accordance with seasonal changes in average power usage by the user so that substantial money-saving energy curtailment occurs during seasonal periods of relatively low power usage.

29. The system of claim 28 wherein said second predetermined amount is selected to cause said power limit to increase at a rate that is great enough to avoid undue inconvenience to the user during unexpected short term increases in the daily energy usage by the user.

30. The system of claim 25 including means for determining if the present value of said power limit is a fixed upper power limit, and if it is not, then increasing said power limit by a second predetermined amount before computing said shed running sum or said restore running sum.

31. The system of claim 25 wherein said means for computing of said minor average attributes substantially more weight to the more recent power readings in said first period of time than to power readings nearer to the beginning of said first period of time.

32. The system of claim 25 wherein said means for computing of said major average attributes substantially more weight to the more recent values of said minor average in said second period of time than to said earlier values of said minor average.

* * * * *